United States Patent
Rogers et al.

(10) Patent No.: US 10,938,120 B2
(45) Date of Patent: Mar. 2, 2021

(54) PLANAR ANTENNA WITH INTEGRATED LOW NOISE RECEIVER

(71) Applicant: The Boeing Company, Chicago, IL (US)

(72) Inventors: John E. Rogers, Owens Cross Roads, AL (US); Kalsi Kwan, Madison, AL (US); Preston T. Bushey, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 267 days.

(21) Appl. No.: 16/191,231

(22) Filed: Nov. 14, 2018

(65) Prior Publication Data

US 2020/0153113 A1   May 14, 2020

(51) Int. Cl.
| | |
|---|---|
| *H01Q 1/28* | (2006.01) |
| *H01Q 21/00* | (2006.01) |
| *H01Q 9/04* | (2006.01) |
| *H01Q 1/24* | (2006.01) |
| *H01Q 21/06* | (2006.01) |
| *H01Q 1/48* | (2006.01) |
| *H04B 1/10* | (2006.01) |

(52) U.S. Cl.
CPC ......... *H01Q 21/0087* (2013.01); *H01Q 1/247* (2013.01); *H01Q 1/28* (2013.01); *H01Q 1/48* (2013.01); *H01Q 9/0421* (2013.01); *H01Q 21/0075* (2013.01); *H01Q 21/065* (2013.01); *H04B 1/10* (2013.01)

(58) Field of Classification Search
CPC .. H01Q 21/0087; H01Q 9/0421; H01Q 1/247; H01Q 21/065; H01Q 21/0075; H01Q 1/48; H01Q 1/28; H01Q 3/34; H01Q 15/12; H01Q 9/0428; H04B 1/10
See application file for complete search history.

(56) References Cited

U.S. PATENT DOCUMENTS

| | | | |
|---|---|---|---|
| 2005/0062648 A1* | 3/2005 | Ryken | H01Q 23/00 343/700 MS |
| 2009/0322643 A1* | 12/2009 | Choudhury | H01Q 1/526 343/851 |
| 2020/0099123 A1* | 3/2020 | Rogers | H01Q 3/44 |
| 2020/0099127 A1* | 3/2020 | Rogers | H01Q 3/26 |
| 2020/0099141 A1* | 3/2020 | Rogers | H01Q 1/2283 |

(Continued)

OTHER PUBLICATIONS

Pozar, D.M., "Microstrip antenna aperture-coupled to a microstrip line," Electronics Letters, Jan. 1985, pp. 49-40, vol. 21, No. 2.

(Continued)

*Primary Examiner* — Dameon E Levi
*Assistant Examiner* — David E Lotter
(74) *Attorney, Agent, or Firm* — Gates & Cooper LLP

(57) ABSTRACT

A planar antenna with an integrated receiver based on aperture coupled antenna elements with inclusive slots electrically coupled to a microstrip feed network residing above a lower ground plane is disclosed. The use of aperture coupled feed elements eliminate the need for vias, which simplifies fabrication. Further, the antenna has integrated electronics located on the same layer as the microstrip feed network to minimize any noise or unwanted parasitic effects.

20 Claims, 57 Drawing Sheets

(56) References Cited

U.S. PATENT DOCUMENTS

2020/0099420 A1* 3/2020 Rogers .................. H01Q 1/48

OTHER PUBLICATIONS

Pozar, D.M., et al., "Increasing the Bandwidth of a Microstrip Antenna by Proximity Coupling", Electronics Letters, Apr. 1987, pp. 368-369, vol. 23, No. 8.

Patterson, C.E., et al., "A Lightweight X-Band Organic Antenna Array with Integrated SiGe Amplifier", IEEE Radio and Wireless Symposium 2010, Jan. 2010, pp. 84-87.

Patterson, C.E., et al., "Implementation of a Low Cost, Lightweight X-Band Antenna With Integrated SiGe RF Electronics", IEEE Geoscience and Remote Sensing Symposium 2010, Jul. 2010, pp. 681-684.

Morcillo, C.A.D., et al., "An Ultra-Thin, High-Power, and Multilayer Organic Antenna Array With T/R Functionality in the X-Band", IEEE Transactions on Microwave Theory and Techniques, Dec. 2012, pp. 3856-3867, vol. 60, No. 12.

* cited by examiner

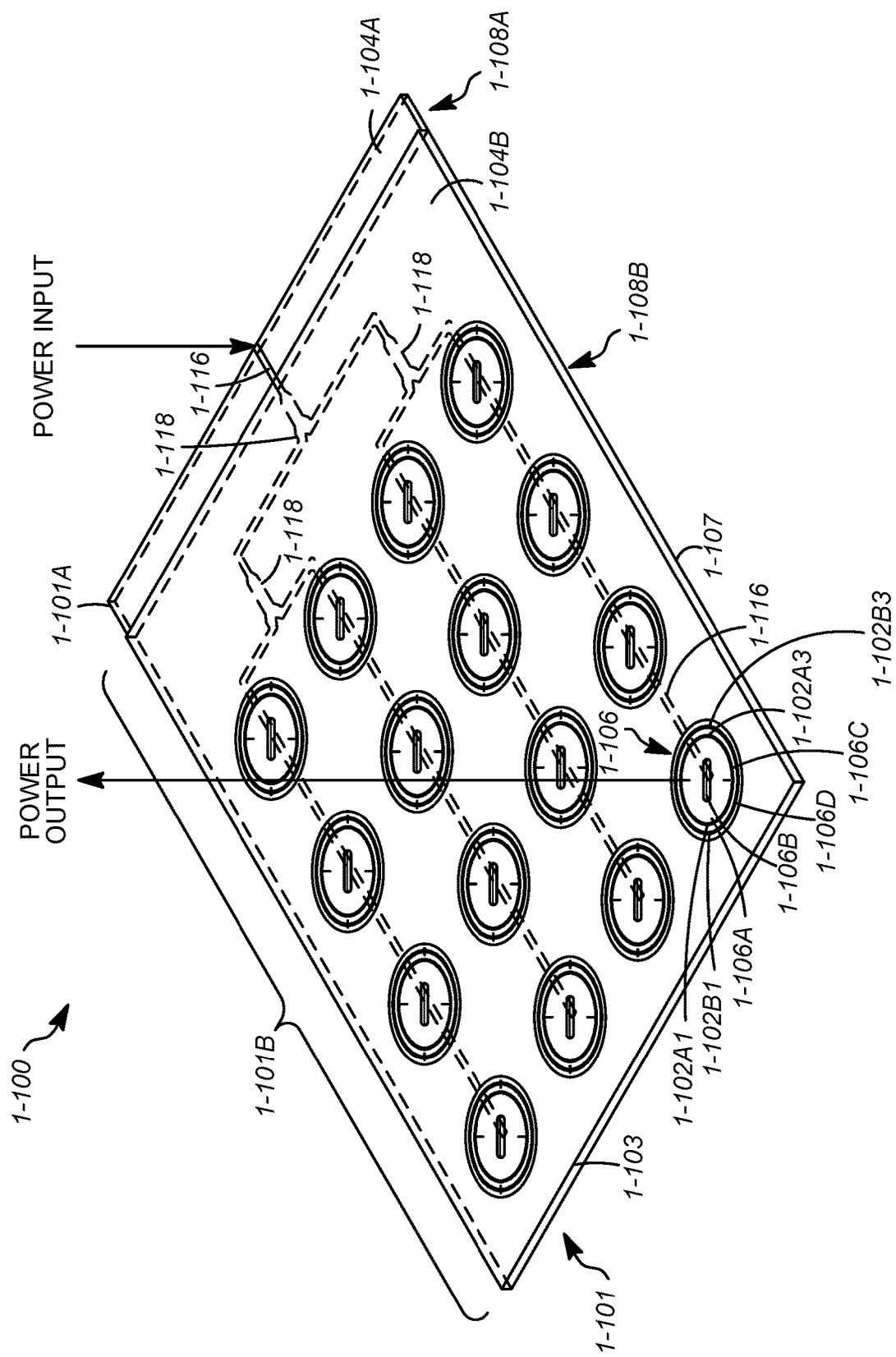

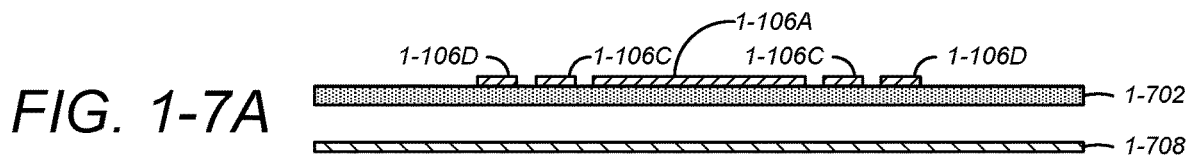
FIG. 1-7A
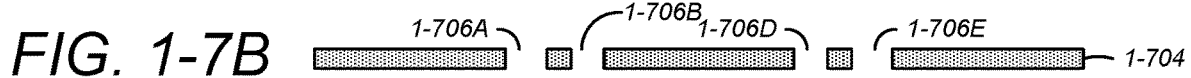
FIG. 1-7B
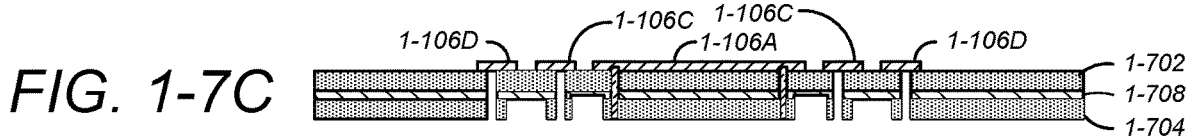
FIG. 1-7C
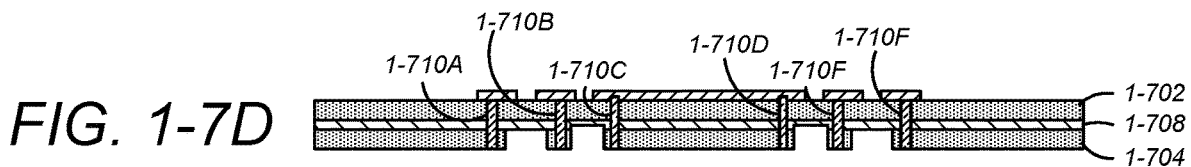
FIG. 1-7D
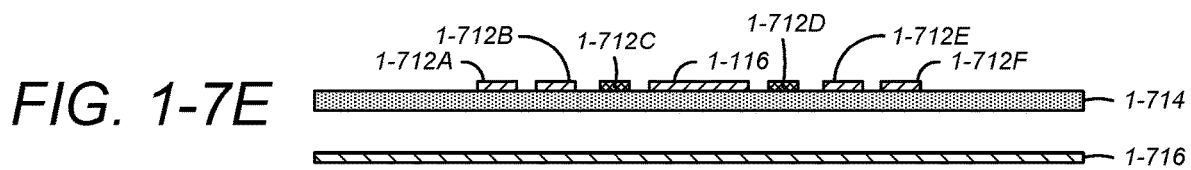
FIG. 1-7E
FIG. 1-7F
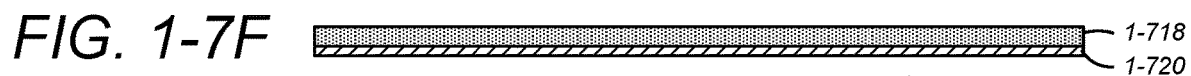
FIG. 1-7G
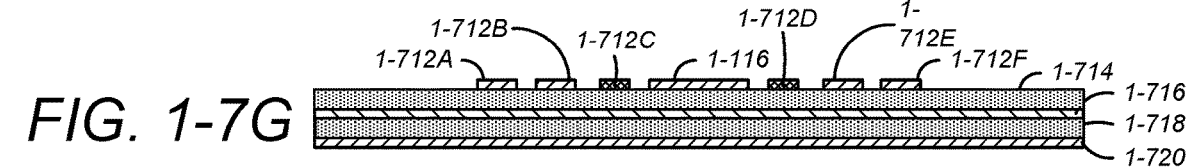
FIG. 1-7H
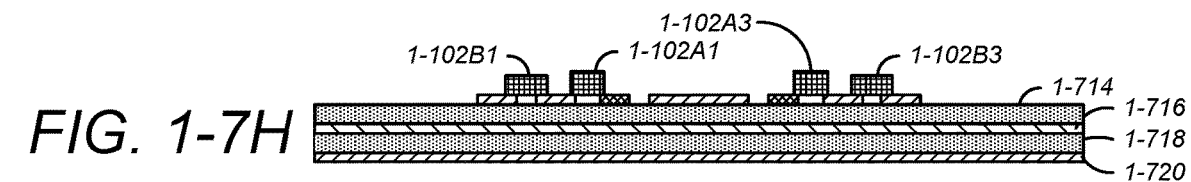
FIG. 1-7I
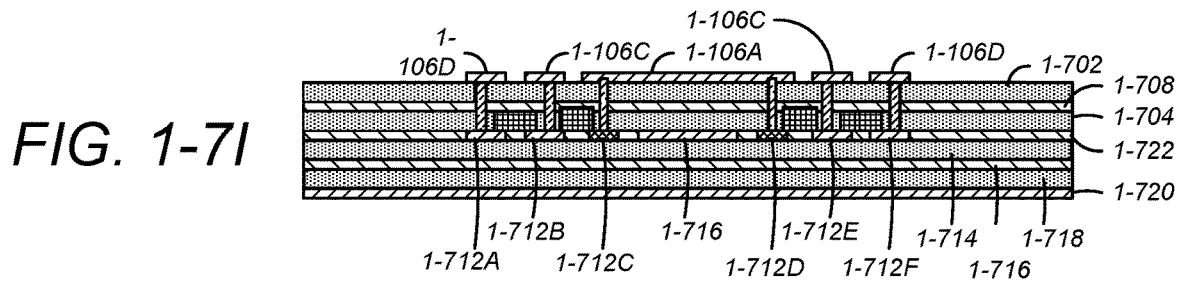

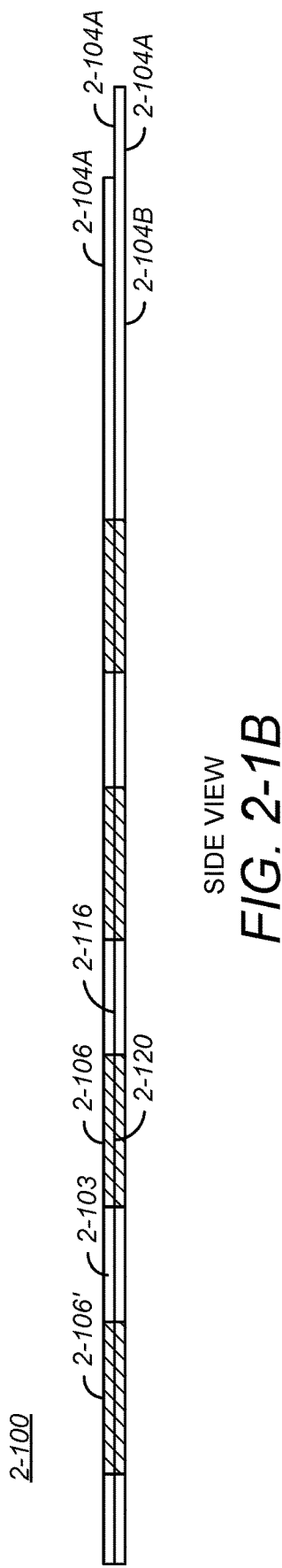
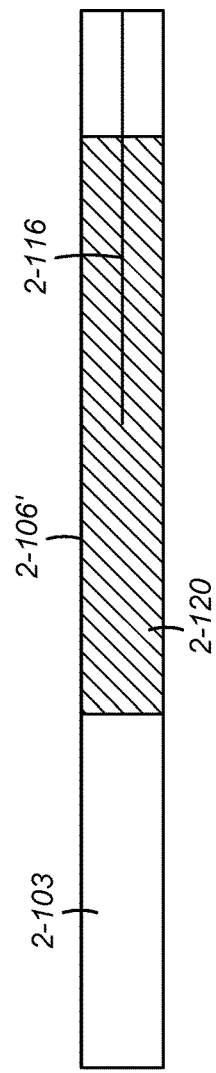
SIDE VIEW
FIG. 2-1B
SIDE VIEW
FIG. 2-1C

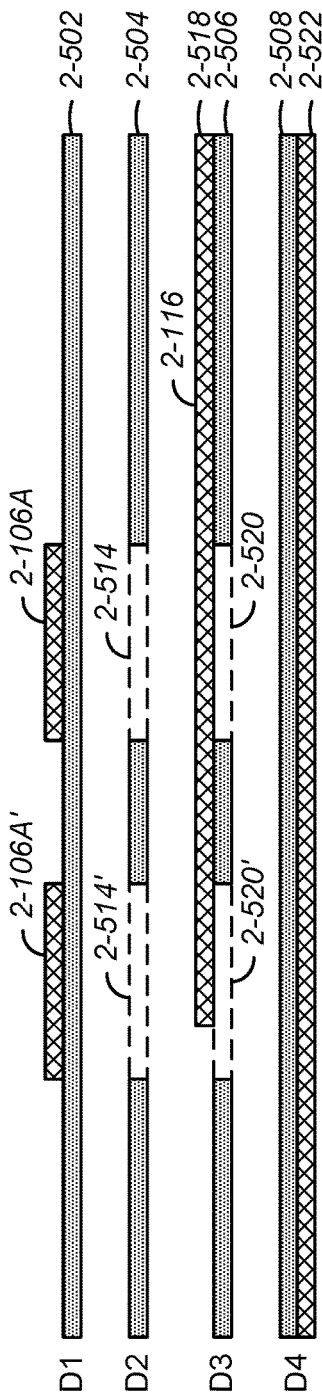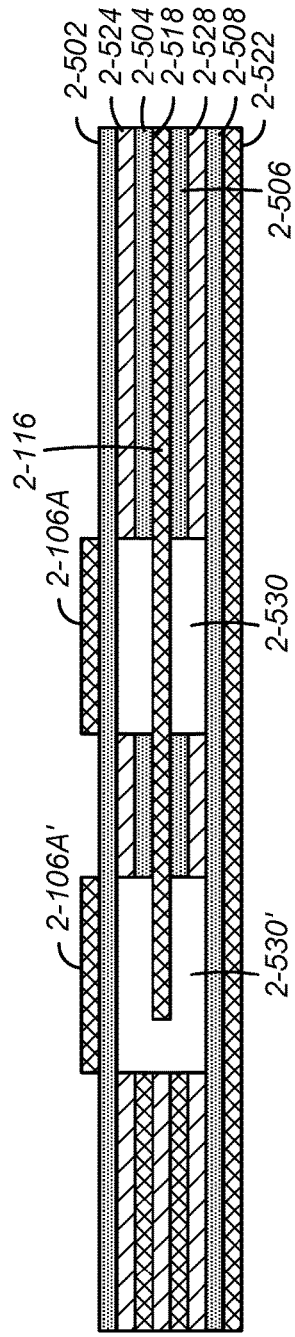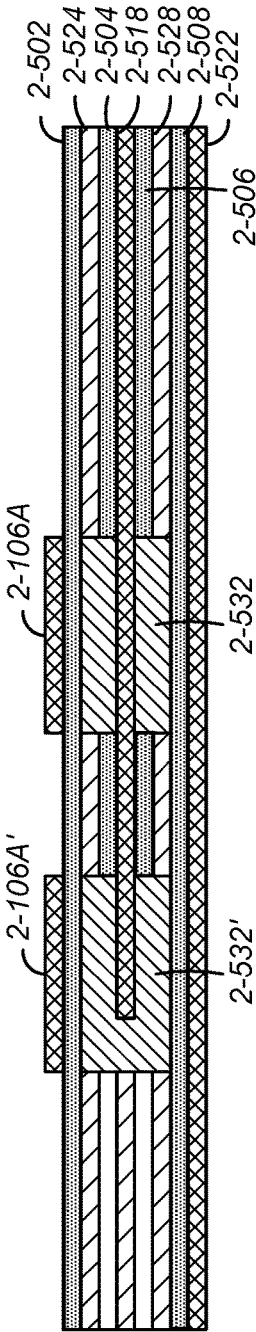
FIG. 2-7A  FIG. 2-7B  FIG. 2-7C

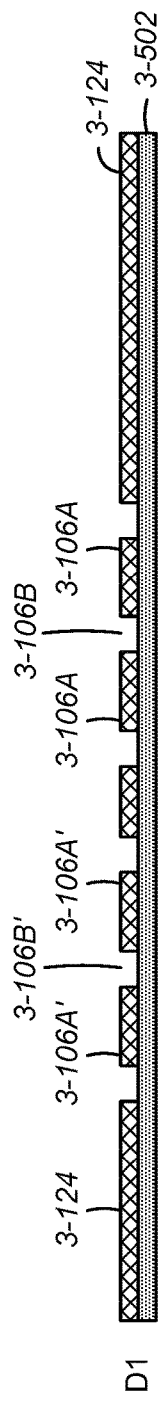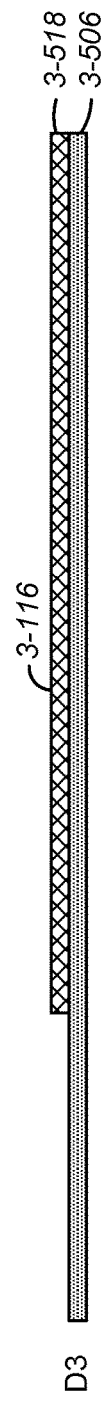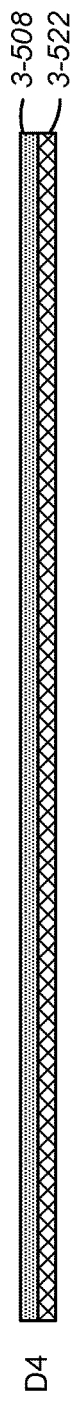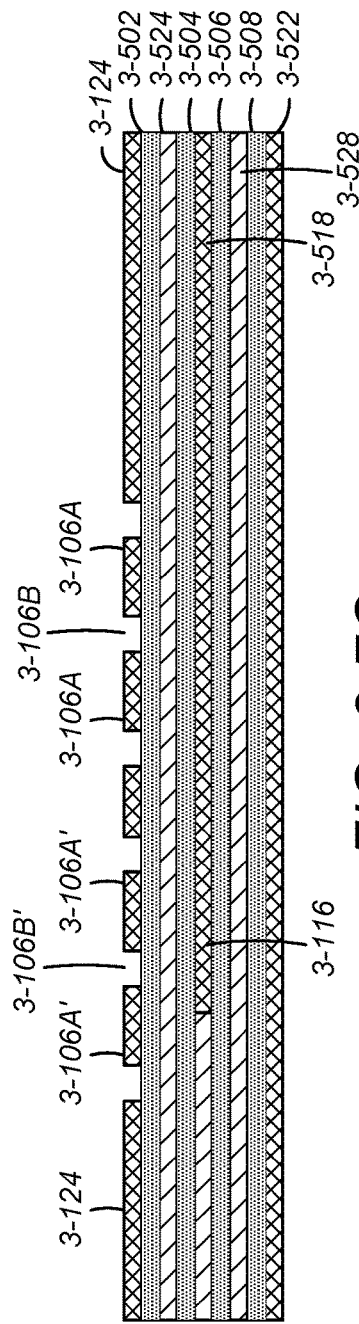
FIG. 3-7A
FIG. 3-7B
FIG. 3-7C

TOP VIEW

BOTTOM VIEW

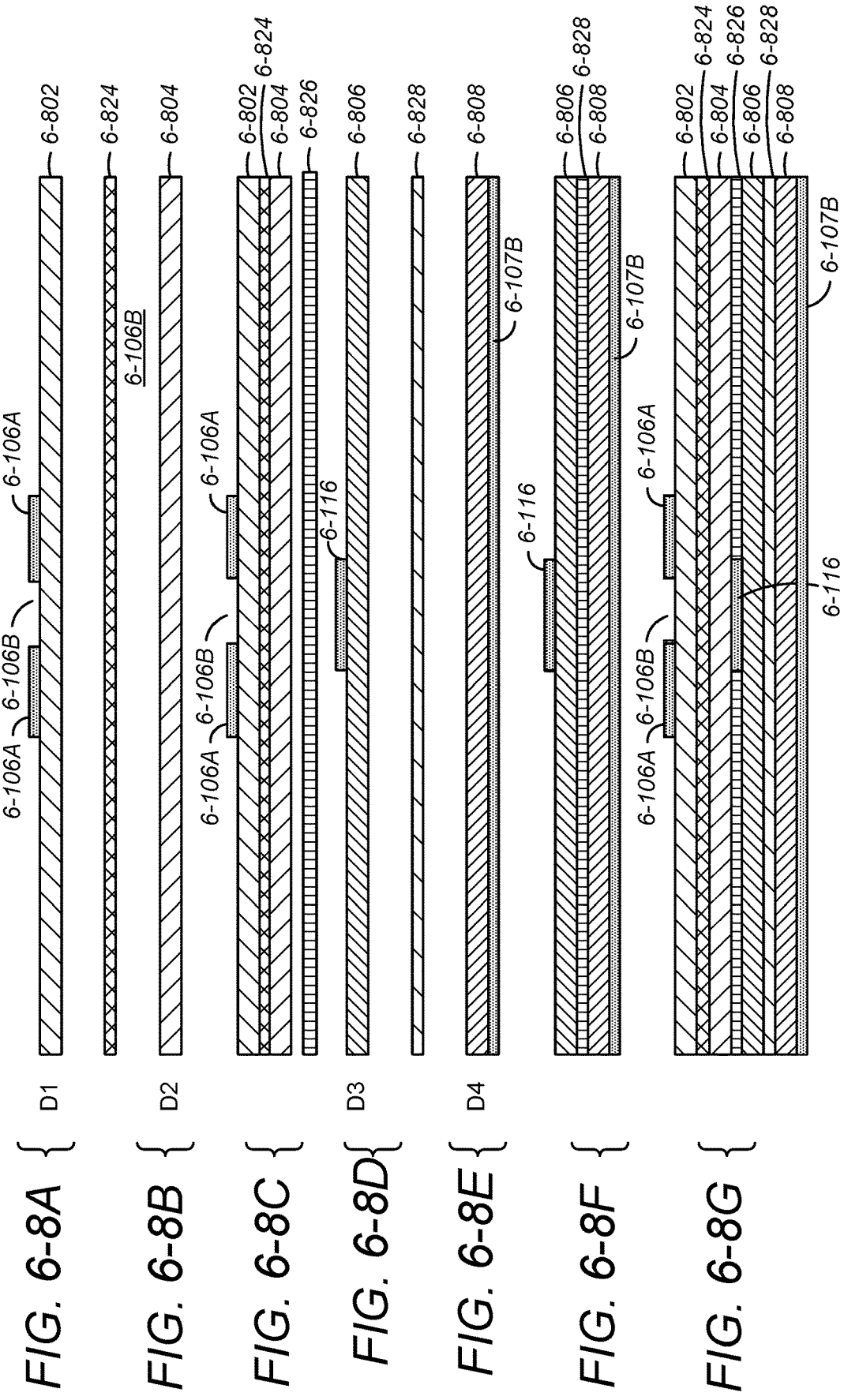

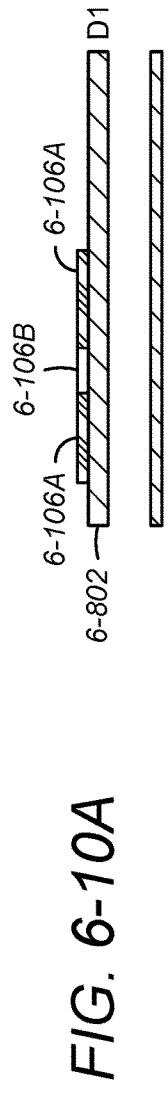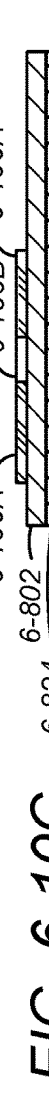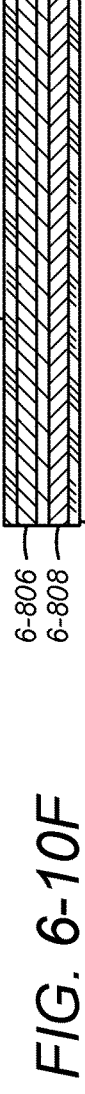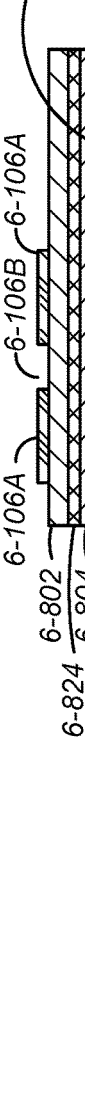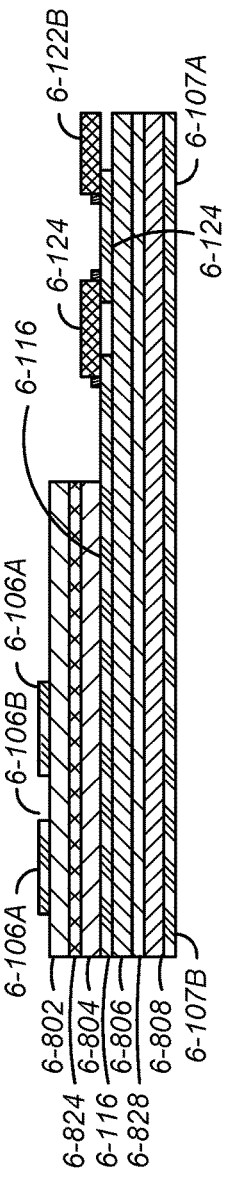
FIG. 6-10A  FIG. 6-10B  FIG. 6-10C  FIG. 6-10D  FIG. 6-10E  FIG. 6-10F  FIG. 6-10G  FIG. 6-10H

PLANAR ANTENNA WITH INTEGRATED LOW NOISE RECEIVER

BACKGROUND

1. Field

The present disclosure relates to systems for receiving and transmitting signals, and in particular to a planar antenna with an integrated electronic device and a method for producing same.

2. Description of the Related Art

There is a need for sensors capable of conforming to non-planar surfaces such as aircraft wings and fuselages. Such sensors, known as conformal sensors, substantially conform to the contours of the surface that they are mounted on or of which surface they form a part. Low profile conformal sensor nodes are useful in many applications, including structural health monitoring and diagnostic testing. With regard to structural health monitoring, conformal antennas in sensor nodes can gather information about an aircraft in real-time, including airframe characteristics (e.g., hoop stress, shear stress, compression, corrosion resistance, bending, torsion, crack growth, high local loads, longitudinal stress and impacts). With regard to diagnostic testing, conformal antennas in sensor nodes can be used for worker safety and aircraft condition monitoring on the factory floor.

Unmanned aerial vehicles (UAVs) have conformal surfaces with low radii of curvature, and typically need light weight antennas with low radar cross sections and low air drag for improved efficiency. Also, like other aircraft, UAV surfaces are typically either metallic or a carbon fiber material, which are conductive in nature and may change the behavior of an antenna. In some applications, there is a need for such antennas with integrated receivers for communications between the ground, sea, and air.

In other applications, there is a need for wideband antennas capable of being reconfigurable for operating within different frequency bands. In yet other applications, there is a need for conformable electronically steerable antennas for their ability to "point" or direct energy in a particular direction. For the above applications and others not described existing planar antenna solutions based on coplanar microstrip feed or pin feed types are inherently bandwidth-limited due to their resonant nature. The bandwidth of planar antennas has been shown to be increased using an aperture coupled feed line; however, existing aperture coupled planar antennas are fed on the backside of the antenna, which results in an antenna with electrical characteristics that vary with the characteristics (e.g., conductivity) of the surface upon which they are mounted. Pin fed planar antennas are also not recommended for conformal applications as vias are well-known to be the first failure point during flexure. Existing steerable planar antennas based on electronics have magnitude and/or phase shifting ability for each antenna element; however, they have high power consumption and are cost prohibitive for applications desiring a low-cost, low-power solution. There is a need for low-cost, low-profile, surface agnostic planar antennas with integrated electronics for transmitting, receiving, and/or beam steering.

SUMMARY

To address the requirements described above, this document discloses an integrated antenna. The integrated antenna includes a circuit board that comprises a composite dielectric having: a top planar surface and a bottom planar surface. The top planar surface has a first top surface planar portion and a second top surface planar portion.

The first top surface planar portion comprises a first top surface conductive ground plane disposed on a first section of the first top surface planar portion and a second top surface conductive ground plane disposed on a second section of the first top surface planar portion. The first and second sections of the first top surface planar portion are electrically shorted to one another by a bottom surface conductive ground plane. The second top surface planar portion has at least one planar antenna element.

The bottom planar surface of the composite dielectric has: a first bottom surface planar portion, a second bottom surface planar portion, a first bottom surface conductive ground plane disposed on the first bottom surface planar portion, and a second bottom surface conductive ground plane disposed on the second bottom surface planar portion.

The composite dielectric further comprises a conductor. The conductor: extends through the composite dielectric between the second top planar portion and the second bottom surface conductive ground plane and also extends across at least a portion of the first top surface planar portion between the first top surface conductive ground plane and the second top surface conductive ground plane. The conductor forms at least one grounded coplanar waveguide with the first top surface conductive ground plane, the second top surface conductive ground plane, and the first bottom surface conductive ground plane and also forms a microstrip extending from the planar antenna element to the grounded coplanar waveguide with the second bottom surface conductive ground plane.

The integrated antenna also includes a plurality of vias electrically shorting the first top surface conductive ground plane to the first bottom surface conductive ground plane and electrically shorting the second top surface conductive ground plane to the first bottom surface conductive ground plane. The integrated antenna also includes an electronic device, disposed on the first top surface planar portion, the electronic device having an electronic device input electrically connected to the conductor and an electronic device output.

In one embodiment, at least part of the first section of the first top surface planar portion and the second section of the first top surface planar portion comprises a power plane electrically connected to a power input of the electronic device (i.e., first electronic device).

In a further embodiment, the circuit board further comprises a second conductor, extending across another portion of the first top surface planar portion between the first top surface conductive ground plane and the second top surface conductive ground plane, the second conductor forming a further grounded coplanar waveguide with the first top surface conductive ground plane, the second top surface conductive ground plane and the first bottom surface conductive ground plane. The circuit board further comprises a second electronic device, disposed on the first top surface planar portion, the second electronic device has a second electronic device input electrically connected to the first electronic device output by the further grounded coplanar waveguide and a second electronic device input.

Another embodiment is evidenced by a method of forming an integrated planar antenna array. The method comprises disposing a planar antenna element on a top surface planar portion of a first dielectric, disposing a conductor on a top surface of a third dielectric, disposing first and second top surface conductive ground planes on the top surface of third dielectric, disposing a bottom surface conductive ground plane on a bottom surface of a fourth dielectric, the bottom surface conductive ground plane having a first bottom surface conductive ground plane portion and a second bottom surface conductive ground plane portion, and forming a composite dielectric. The composite dielectric is formed by laminating a bottom surface planar portion of the first dielectric to a top surface of a second dielectric, laminating a bottom surface planar portion of the second dielectric to a top surface planar portion of the third dielectric, and laminating a bottom surface planar portion of the third dielectric to a top surface planar portion of the fourth dielectric. Upon lamination, the conductor forms a microstrip with the second bottom surface conductive ground plane portion and an aperture coupled microstrip feed with the planar antenna element. The method further comprises disposing a plurality of vias electrically shorting the first top surface conductive ground plane to the first bottom surface conductive ground plane portion and electrically shorting the second top surface conductive ground plane to the first bottom surface conductive ground plane portion, the vias forming a grounded coplanar waveguide with the conductor, the first top surface conductive ground plane, the second top surface conductive ground plane, and the first bottom surface conductive ground plane portion. Further, an electronic device is affixed to the top surface of the third dielectric, the electronic device having an electronic device input electrically connected to the grounded coplanar waveguide. Still another embodiment is evidenced by an integrated antenna formed by performing the foregoing steps.

BRIEF DESCRIPTION OF THE DRAWINGS

Referring now to the drawings in which like reference numbers represent corresponding parts throughout:

FIGS. 1-1A and 1-1B are diagrams illustrating one embodiment of the antenna;

FIG. 1-2A is a diagram depicting one embodiment of an RF switch;

FIG. 1-2B is a diagram depicting a simplified schematic of an RF switch;

FIG. 1-2C is a diagram depicting an embodiment of a particular implementation of the RF switch;

FIGS. 1-3A and 1-3B are plots depicting the predicted performance of a 4×4 reconfigurable aperture coupled patch antenna designed to nominally operate near 10 GHz;

FIG. 1-4 is a diagram of a field plot showing the current density in vector form for the reconfigurable aperture coupled patch antenna operating at 10 GHz;

FIGS. 1-5A-1-5C are diagrams illustrating exemplary operations that can be used to produce the reconfigurable aperture coupled patch antenna;

FIG. 1-6 is a diagram of the reconfigurable aperture coupled patch antenna showing a slice depicted in FIGS. 1-7A-1-7I;

FIGS. 1-7A-1-7I, which depict the reconfigurable aperture coupled patch antenna at the different stages of the production at the slice A-A' illustrated in FIG. 1-6; and FIGS. 2-1A-2-1C are diagrams illustrating one embodiment of the electronically steerable conformal antenna;

FIGS. 2-2A and 2-2B are diagrams depicting plots of the predicted performance of a 4×4 electronically steerable conformal antenna designed to operate near 10 GHz;

FIG. 2-3 is a diagram illustrating exemplary operations that can be used to produce the electronically steerable conformal antenna;

FIG. 2-4 is a diagram illustrating the slice A-A' of the antenna 100 depicted in FIGS. 2-5A-2-5C;

FIGS. 2-5A-2-5C are diagrams depicting the electronically steerable conformal antenna at different stages of a representative production process at slice A-A' of FIG. 2-4;

FIG. 2-6 is a diagram illustrating the slice B-B' of the antenna depicted in FIGS. 2-7A-2-7C;

FIGS. 2-7A-2-7C are diagrams depicting the electronically steerable conformal antenna at the different stages of the production at the slice B-B' illustrated in FIG. 2-6;

FIGS. 2-8A-2-8C are diagrams illustrating how a DC bias voltage may be supplied to the tunable permittivity material via the RF circuit board; and FIGS. 3-1A and 3-1B are diagrams illustrating one embodiment of the stripline conformal patch antenna;

FIGS. 3-2A and 3-2B are diagrams depicting plots of the predicted performance of a 4×4 stripline conformal patch antenna designed to operate near 10 GHz;

FIG. 3-3 is a diagram illustrating exemplary operations that can be used to produce the stripline conformal antenna;

FIG. 3-4 is a diagram illustrating the slice A-A' of the antenna depicted in FIGS. 3-5A-3-5C;

FIGS. 3-5A-3-5C are diagrams depicting the stripline conformal antenna at different stages of a representative production process at slice A-A' of FIG. 3-4;

FIG. 3-6 is a diagram illustrating the slice B-B' of the antenna depicted in FIGS. 3-7A-3-7C;

FIGS. 3-7A-3-7C, which depict the stripline conformal antenna at the different stages of the production at the slice B-B' illustrated in FIGS. 3-6; and FIGS. 4-1A and 4-1B are diagrams illustrating one embodiment of the conformal antenna having a dielectric lens;

FIGS. 4-2A and 4-2B are diagrams depicting plots of the predicted performance of a 4×4 conformal antenna having a dielectric lens designed to operate near 10 GHz;

FIG. 4-3 is a diagram illustrating exemplary operations that can be used to produce the conformal antenna having the dielectric lens;

FIG. 4-4 is a diagram illustrating the slice A-A' of the antenna depicted in FIGS. 4-5A-4-5C;

FIGS. 4-5A-4-5C are diagrams depicting the conformal antenna having dielectric lenses at different stages of a representative production process at slice A-A' of FIG. 4-4;

FIG. 4-6 is a diagram illustrating the slice B-B' of the antenna depicted in FIGS. 4-7A-4-7C;

FIGS. 4-7A-4-7C, which depict the conformal antenna and dielectric lenses at the different stages of the production at the slice B-B' illustrated in FIG. 4-6; and FIGS. 5-1A and 5-1B are diagrams illustrating embodiments of an electrically small antenna;

FIG. 5-1C is a diagram illustrating a perspective view of an embodiment of an electrically small antenna comprising a plurality of antenna elements;

FIGS. 5-2A and 5-2B are diagrams depicting plots of the predicted performance of the electrically small antenna illustrated in FIGS. 5-1A and 5-1B;

FIG. 5-2C is a diagram of a field plot showing the current density in vector form for the electrically small antenna operating at 500 MHz;

FIG. 5-3 is a diagram illustrating exemplary operations that can be used to produce the electrically small antenna;

FIG. 5-4 is a diagram illustrating the slice A-A' of the antenna depicted in FIGS. 5-5A-5-5C;

FIGS. 5-5A-5-5C are diagrams depicting electrically small antenna at different stages of a representative production process at slice A-A' of FIG. 5-4;

FIG. 5-6 is a diagram illustrating the slice B-B' of the antenna depicted in FIGS. 5-7A-5-7C;

FIGS. 5-7A-5-7C, which depict the electrically small antenna at the different stages of the production at the slice B-B' illustrated in FIG. 5-6; and FIGS. 6-1A-6-1C are diagrams illustrating one embodiment of the integrated antenna;

FIGS. 6-2A and 6-2B are diagrams depicting an exemplary embodiment of the electronic device;

FIGS. 6-3A and 6-3B are diagrams depicting plots (generated with a finite element model (FEM) solver) of the predicted performance of an exemplary 4×4 conformal antenna array designed to operate near 10 GHz;

FIG. 6-4 is a field plot showing the current density (in A/m) in vector form for the 4×4 array operating at 10 GHz;

FIGS. 6-5A and 6-5B are diagrams depicting plots of performance of a circuit having exemplary electronic devices;

FIGS. 6-6A-6-6C are diagrams illustrating exemplary operations that can be used to produce the integrated antenna;

FIG. 6-7 is a diagram illustrating a cut A-A' of the antenna depicted in FIGS. 6-8A-6-8G;

FIGS. 6-8A-6-8G are diagrams illustrating one embodiment of the production of the integrated antenna;

FIG. 6-9 is a diagram illustrating a cut B-B' of the antenna depicted in FIGS. 6-10A-6-10H;

FIGS. 6-10A-6-10H are diagrams illustrating one embodiment of the production of the integrated antenna; and FIG. 6-11 is a diagram illustrating an exemplary computer system that could be used to implement processing elements of the above disclosure.

DESCRIPTION

In the following description, reference is made to the accompanying drawings which form a part hereof, and which is shown, by way of illustration, several embodiments. It is understood that other embodiments may be utilized, and structural changes may be made without departing from the scope of the present disclosure.

Reconfigurable Aperture-Coupled Patch Antenna

Overview

A low-profile reconfigurable antenna based on aperture coupled antenna elements with inclusive slots and outer coupling elements is disclosed in this specification. The antenna provides increased bandwidth and decreased axial ratio (i.e., increased cross polarization). Cross polarization reduces signal loss from transmitter to receiver due to antenna misalignment. The reconfigurable antenna also has a microstrip feed network with a lower electrical ground plane to minimize any change in the antenna's electrical behavior due to conductive surfaces, and is therefore surface agnostic.

The antenna comprises a number of features which can be characterized by a number of embodiments. Such features may also be combined in selected embodiments as disclosed further herein. For example, in one embodiment, the reconfigurable antenna has an embedded RF microstrip network electrically coupled to a lower electrical ground plane for efficient signal propagation and simplification of planar arraying. In another embodiment, the reconfigurable antenna has a lower electrical ground plane to minimize any change in the antenna's electrical behavior due to conductive surfaces. In still another embodiment, the antenna uses aperture coupled antenna elements for simplistic feeding, planar arraying, and reduction of antenna failure due to flexure. In yet another embodiment, the antenna features outer coupling elements along the same plane as the antenna elements for reducing the operating frequency of the antenna when activated by embedded RF switches. In a further embodiment, the antenna can utilize thin RF dielectrics for conformal applications due to the use of an aperture coupled feed. Also, in another embodiment, the antenna has cross polarization with increased bandwidth due to using aperture coupled antenna elements with inclusive slots, thus resulting in reduced signal loss from transmitter to receiver due to antenna misalignment.

Figures 1, 1B:
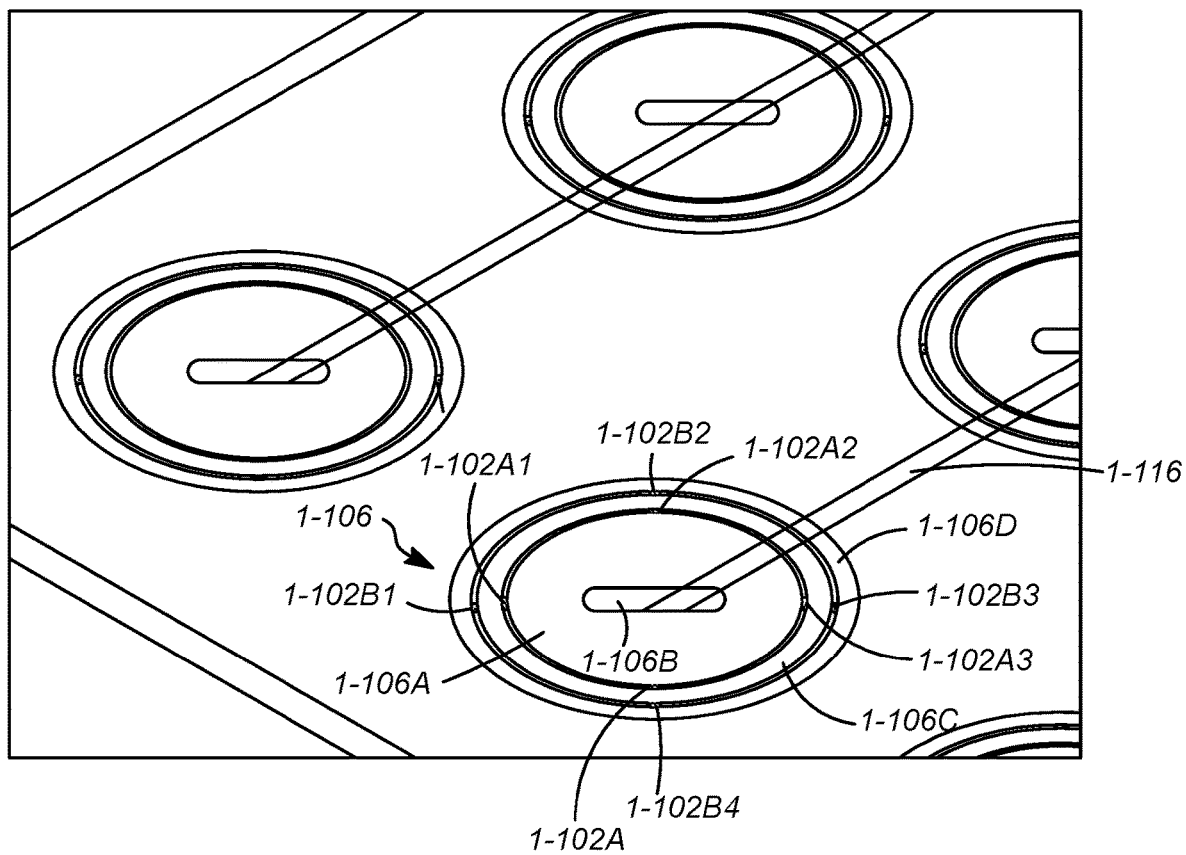
Figures 1A, 2:
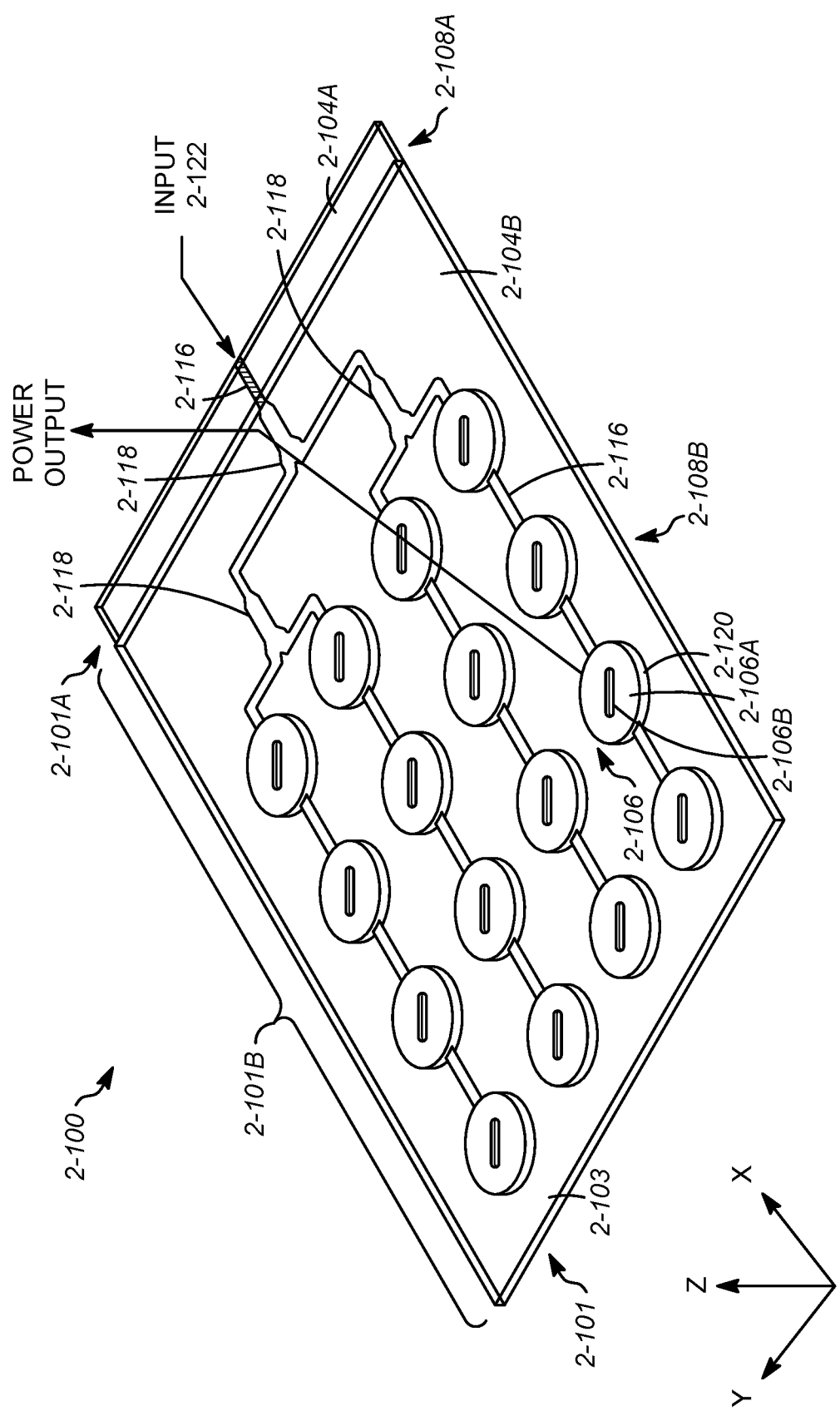
Figures 2, 2A:
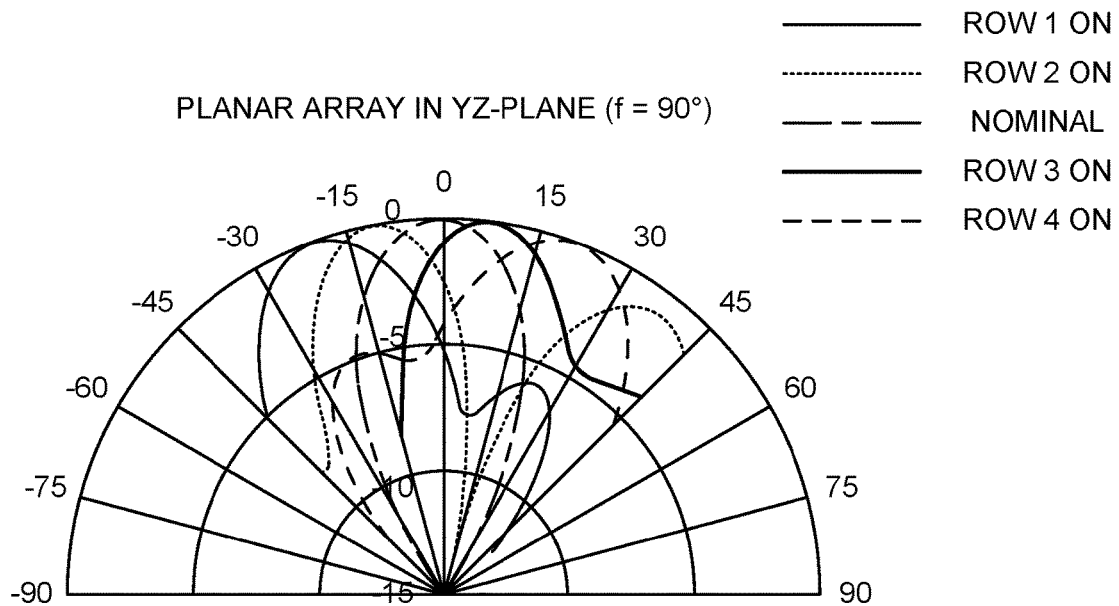
Figures 2, 2B:
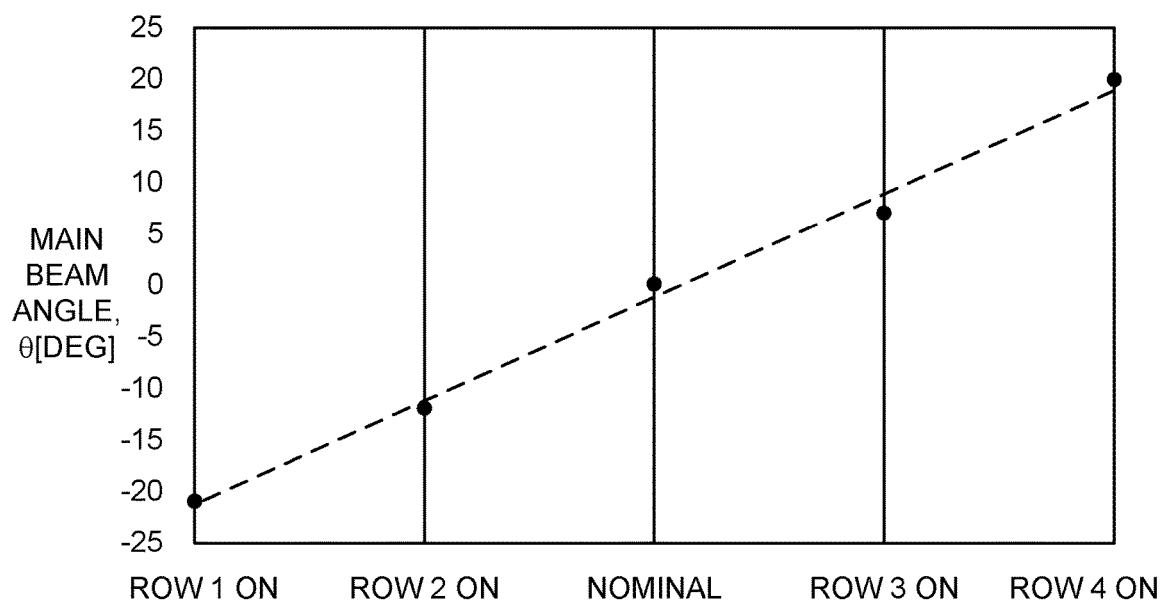
Figures 2, 3:
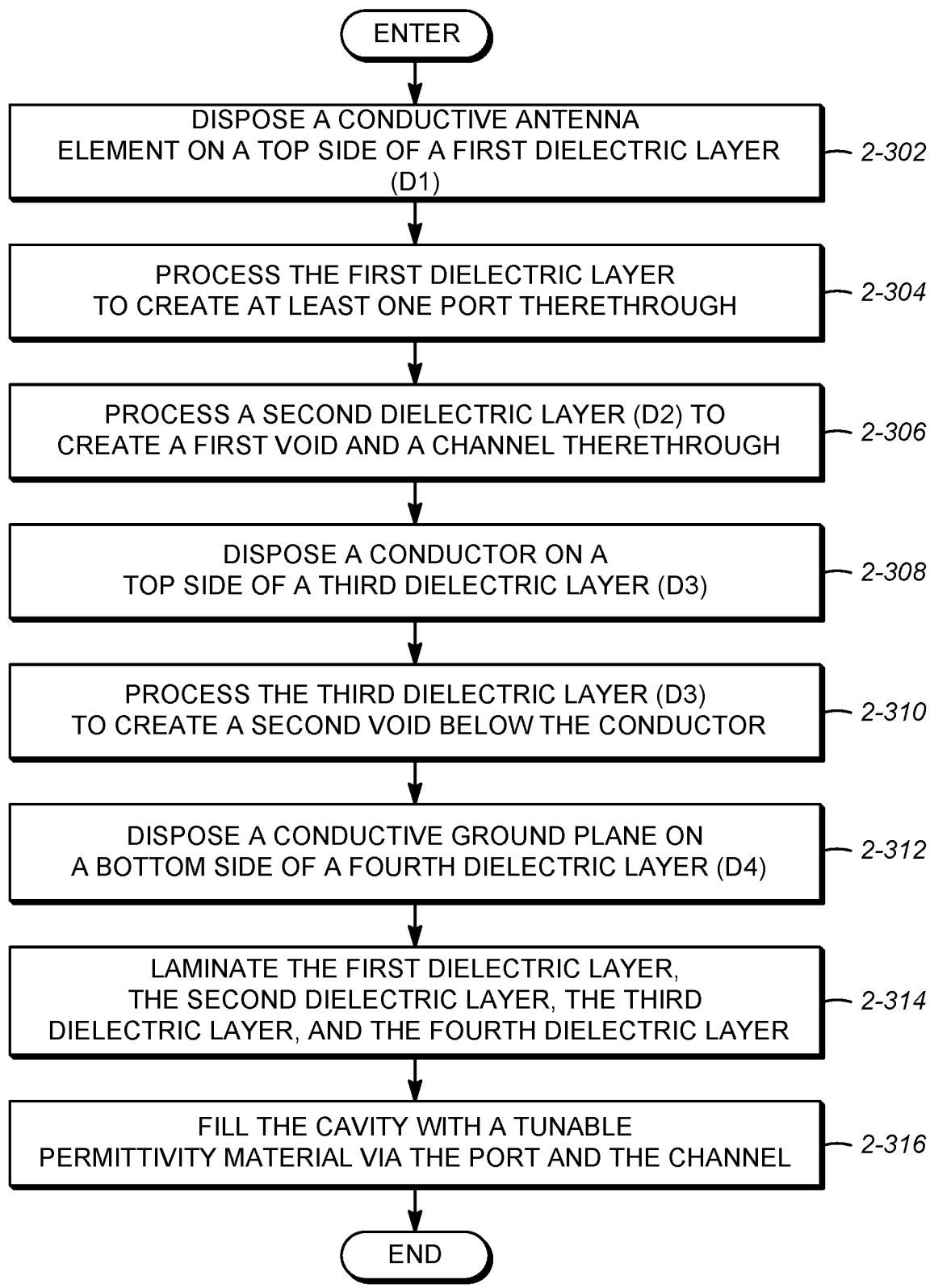
Figures 2, 3, 4:
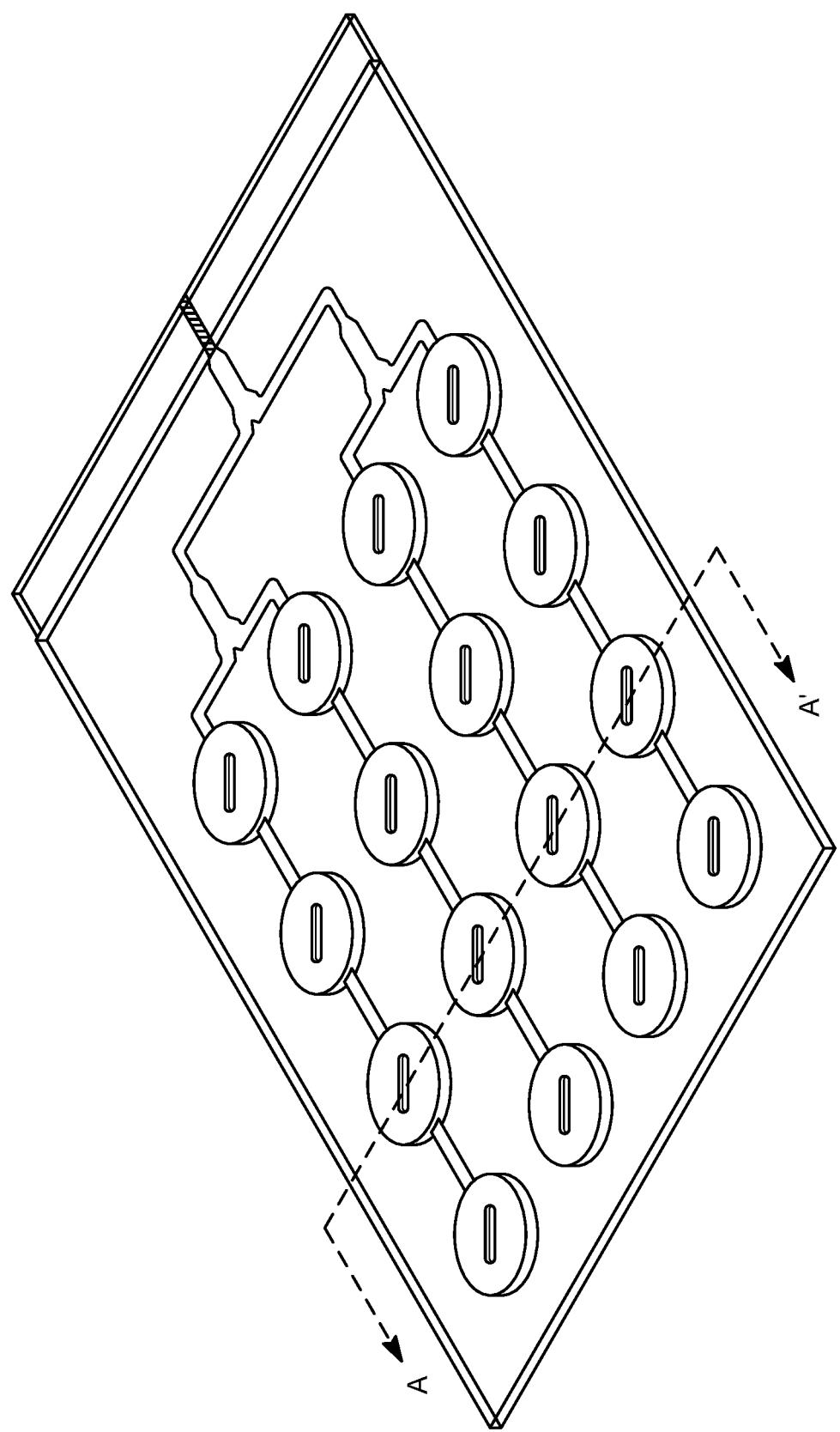
Figures 2, 3, 4, 5, 5A:
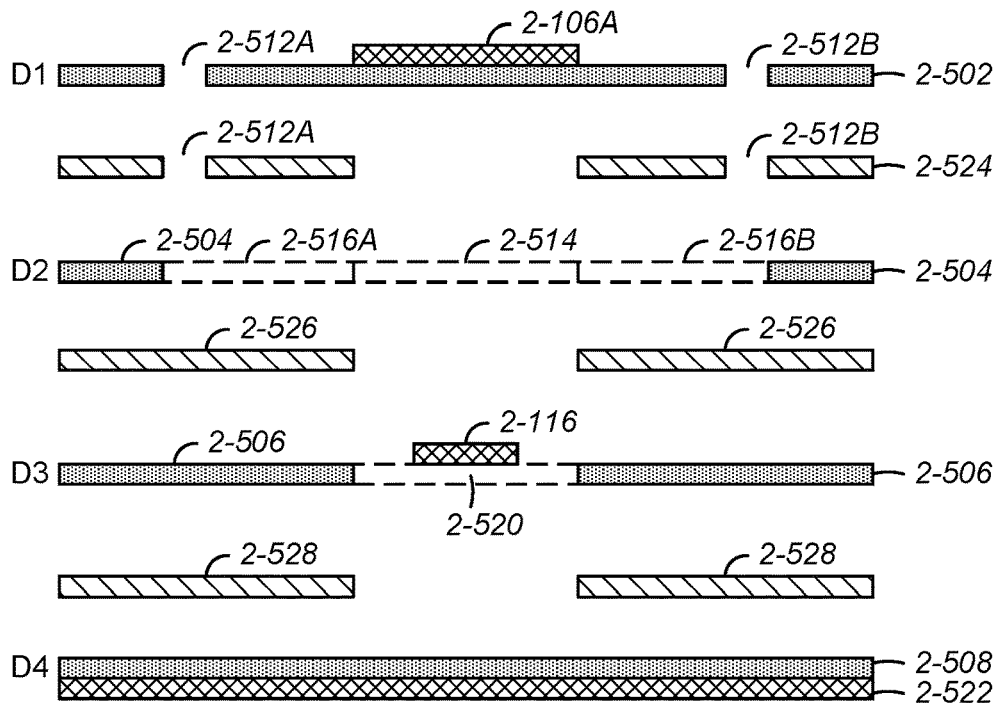
Figures 2, 3, 4, 5, 5B:
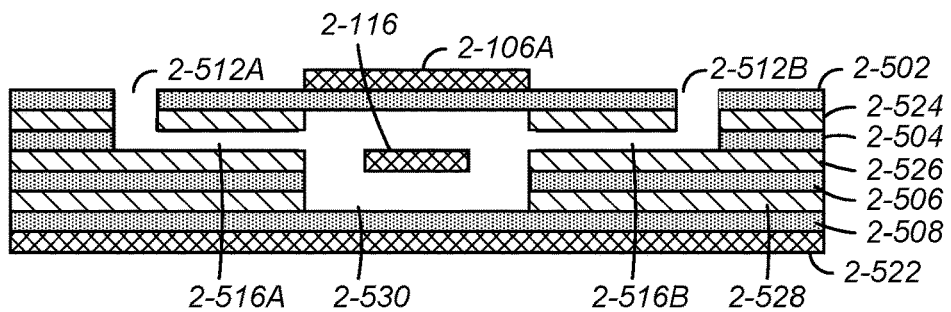
Figures 2, 3, 4, 5, 5C:
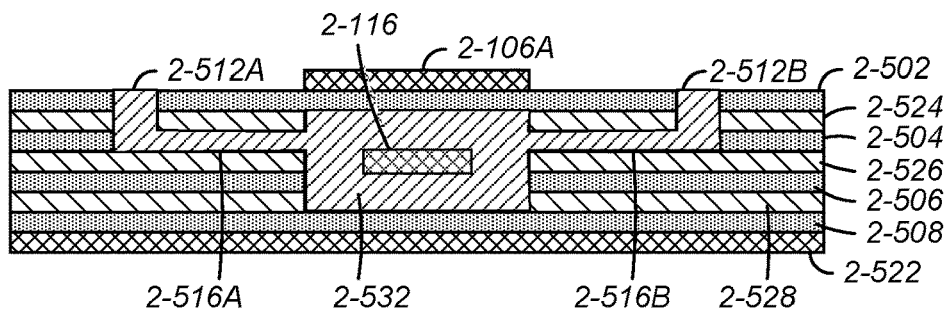
Figures 2, 3, 4, 5, 6:
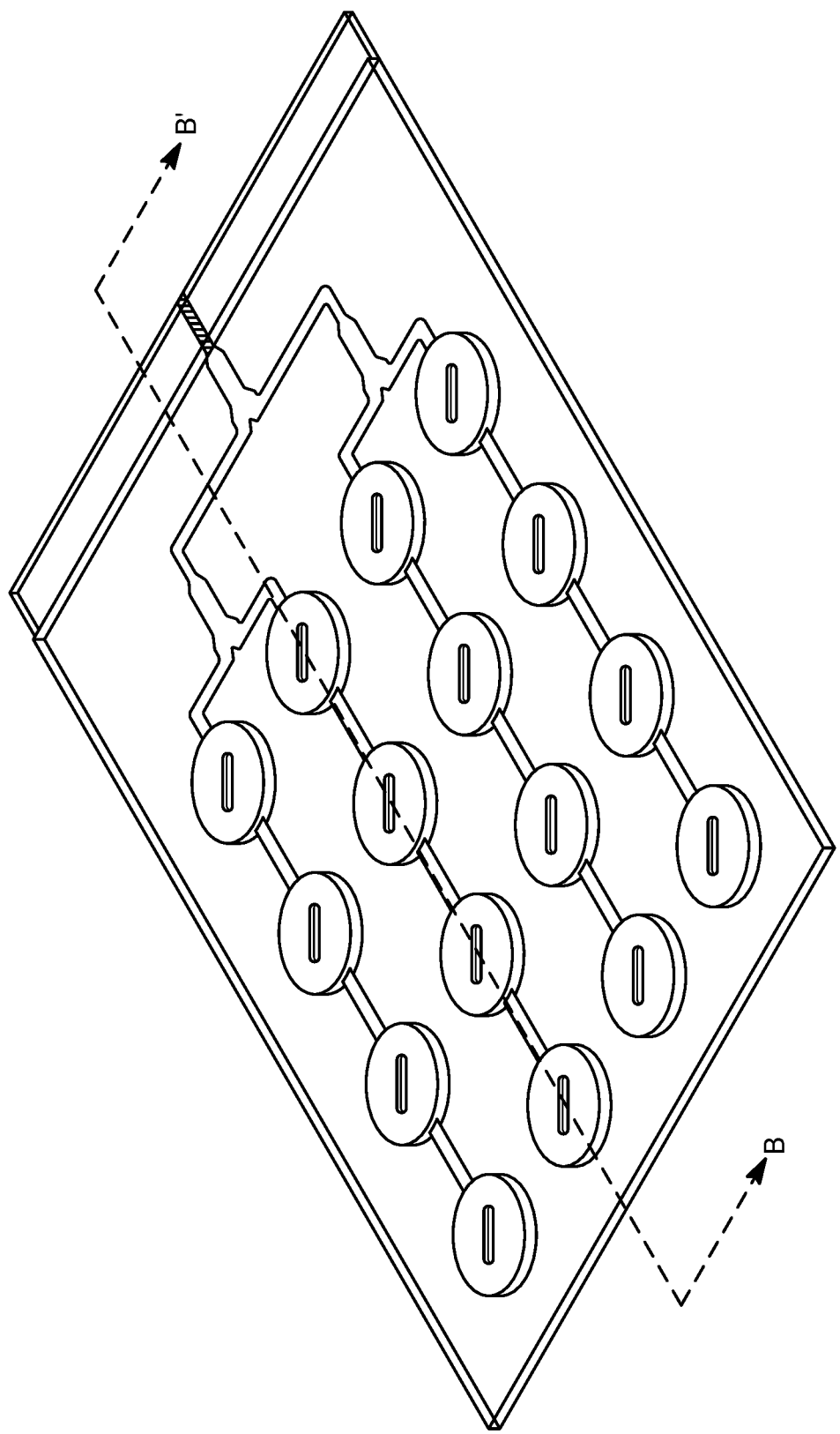

FIGS. 1-1A and 1-1B are diagrams illustrating one embodiment of the antenna 1-100. In the illustrated embodiment, the antenna 1-100 includes an RF circuit board 1-101 having a composite dielectric 1-103. The RF circuit board 1-101 includes a first RF circuit board portion 1-101A and a second RF circuit board portion 1-101B. The RF circuit board 1-101 also comprises a top planar surface 1-104 that has a first top surface planar portion 1-104A and a second top surface planar portion 1-104B. The second top surface planar portion 1-104B has at least one antenna element 1-106. In the illustrated embodiment, a 4×4 array of antenna elements 1-106 is included.

The RF circuit board 1-101 also comprises a bottom planar surface 1-108 which has a first bottom surface planar portion 1-108A and a second bottom surface planar portion 1-108B. A bottom surface ground plane 1-107 extends along the first bottom surface planar portion 1-108A and the second bottom surface planar portion 1-108B. A conductor 1-116 extending on a top surface of the circuit board first portion 1-101A and through the circuit board second portion 1-101B forms a microstrip with the bottom surface ground plane 1-107 of the first and second bottom surface planar portions 1-108A and 1-108B, respectively. The conductor 1-116 includes one or more power dividers 1-118.

Each antenna element 1-106 comprises inner antenna element component 1-106A having a conductive surface with a slot or aperture 1-106B. This aperture 1-106B couples the antenna element 1-106 to the microstrip feed formed by the conductor 1-116, the ground plane 1-107, and dielectric material therebetween.

Each antenna element 1-106 also comprises a coupling antenna element component 1-106C disposed about a periphery of and substantially coplanar with the inner antenna element component 1-106A. In the illustrated embodiment, the coupling antenna element component 1-106C is coplanar with the other elements of the antenna element 1-106. In the illustrated embodiment, the inner antenna element component 1-106A is circular and the coupling antenna element component 1-106C is an annulus concentric with the inner antenna element component 1-106A, and the coupling antenna element component 1-106C has an interior radius larger than an exterior radius of the inner antenna element component 1-106A by a distance d.

The coupling antenna element component 1-106C is selectably electrically shorted to the inner antenna element component 1-106A by one or more switches 1-102 (e.g. RF switches). Selectable activation of the one or more switches 1-102A electrically shorts the inner antenna element component 1-106A to the coupling antenna element component 1-106C, thus increasing the effective area of the antenna element 1-106.

The antenna element(s) 1-106 may also comprise additional coupling element components. For example, in the illustrated embodiment, the antenna element 1-106 also comprises a second coupling element component 1-106D disposed about a periphery of the first coupling antenna element component 1-106C and substantially coplanar with both the inner antenna element component 1-106A and the first coupling antenna element component 1-106C. The second coupling element component 1-106D is selectably electrically shorted to the first coupling antenna element component 1-106C by one or more switches 1-102B. Selectable activation of the one or more switches 1-102B electrically shorts the second coupling element component 1-106D to the first coupling antenna element component 1-106C (already coupled to the inner antenna element component 1-106A by switch(es) 1-102), thus further increasing the effective area of the antenna element 1-106.

Figures 1, 2, 2A:
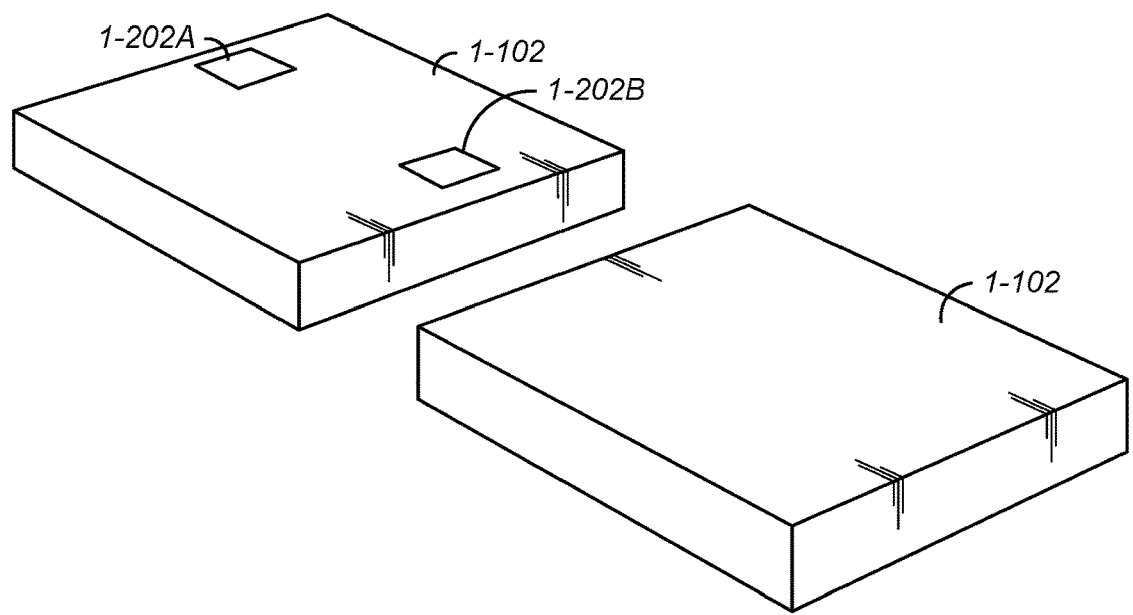

FIG. 1-2A is a diagram depicting one embodiment of an RF switch 1-102. As illustrated, the RF switch 1-102 comprises two conductive surfaces 1-202A and 1-202B, and activation of the RF switch 1-102 electrically shorts conductive surface 1-202A and conductive surface 1-202B. For example, RF switch 1-102A is mounted so that one conductive surface (e.g. 1-202A) is electrically connected to the conductive inner antenna element component 1-106A and the other conductive surface (e.g. 1-202B) is electrically connected to the coupling antenna element component 1-106C. Activation of the RF switch 1-102A, therefore electrically shorts the inner antenna element component 1-106A to the conductive coupling antenna element component 1-106C, thus increasing the effective area of the antenna element 1-106.

Figures 1, 2, 2B:
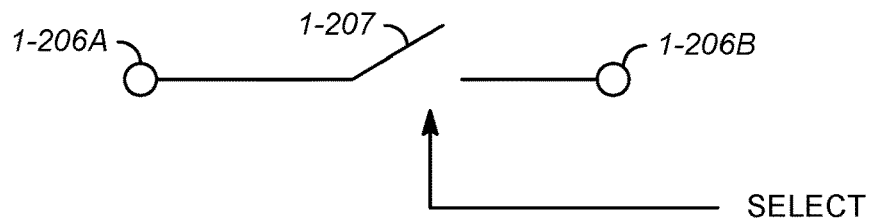

FIG. 1-2B is a diagram depicting a simplified schematic of an RF switch 1-102 in the RF circuit board 1-101. In the illustrated embodiment, the RF switch has nodes 1-206A and 1-206B, which are electrically connected to conductive surfaces 1-202A and 1-202B, respectively. Switching element 1-207 electrically shorts (upon activation) nodes 1-206A and 1-206B in accordance with the select input.

Figures 1, 2, 2C:
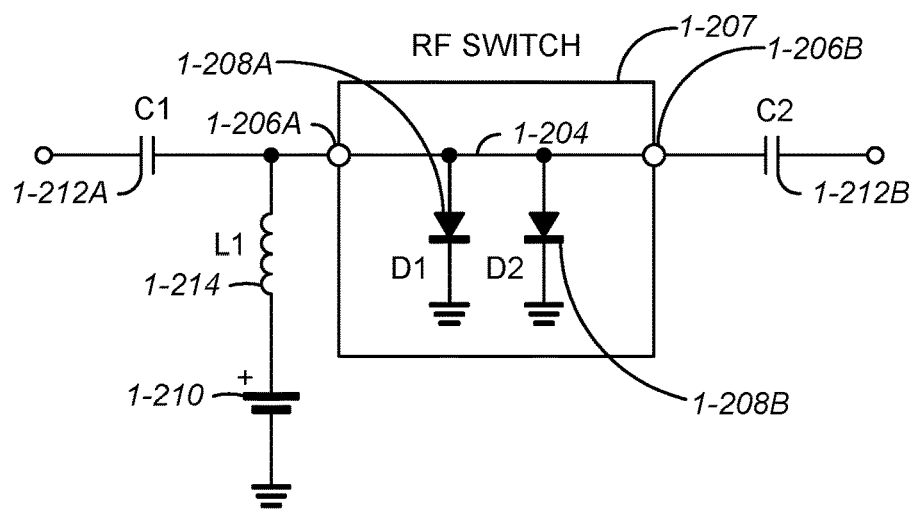

FIG. 1-2C is a diagram depicting an embodiment of a particular implementation of the RF switch 1-102. In this embodiment, the switching element 1-207 comprises two diodes D1 1-208A and D2 1-208B (i.e. embedded PIN diodes), which are in parallel and electrically connected between a conductive path 1-204 between nodes 1-206A and 1-206B and an electrical ground. This particular architecture of an RF switch 1-102 is considered a reflective single-pole single-throw (SPST) shunt switch in a normally closed position (i.e., electrically shorted). The application of an appropriate voltage from voltage source 1-210 turns diodes D1 1-208A and D2 1-208B on, thus effectively isolating node 1-206A from node 1-206B placing the switch in an open position (i.e., electrically open). Since the RF switch 1-102 may be inserted between other components that have their own impedance characteristics such as a low noise amplifier (LNA), filter, mixer, etc., capacitors C1 1-212A and C2 1-212B may be included so that such impedances from such components do not electrically load down the switch. Further, inductor L1 1-214 removes unwanted high frequency noise from voltage source 1-210 but is not necessary if a voltage source with suppressed noise is utilized.

In one embodiment, the RF switch 1-102 is embodied in a high frequency RF switch such as the model MA4AGSW1 available from the MACOM TECHNOLOGY SOLUTIONS. The MA4AGSW1 is a AlGaAs pin diode SPST RF switch designed to operate past 50 GHz with insertion losses of <0.15 dB at 1-10 GHz. The MA4AGSW1 is available in die form with die dimensions of 0.75 mm×0.62 mm×0.10 mm.

FIGS. 1-3A and 1-3B are plots depicting the predicted performance of a 4×4 reconfigurable aperture coupled patch antenna designed to nominally operate near 10 GHz. The surface dimensions of the 4×4 array are 95 mm×70 mm and the board has four 10 Mil PYRALUX layers.

The results (generated with a finite element model (FEM) solver) demonstrate that the resonant frequency of the antenna shifts down from 10 GHz to 7.7 GHz and further down to 6 GHz when the RF switches 1-102A and 1-102B are activated to electrically short the first coupling antenna element component 1-106C and the second coupling element component 1-106D to the inner antenna element component 1-106A. The antenna performance, specifically the antenna gain shown in FIG. 1-3A, naturally decreases as the resonant frequency decreases. The gain of a planar antenna for a given thickness decreases with decreasing resonant frequency due to the necessary wavelength required to maintain the antenna gain.

FIG. 1-4 is a diagram of a field plot showing the current density (in A/m) in vector form for the reconfigurable aperture coupled patch antenna 1-100 operating at 10 GHz. The current is seen to be electrically coupling (or traveling) from the microstrip line 1-116 to the patch antenna element 1-106 with inclusive slot 1-106B. The circular rotation of the current along the surface of the patch antenna element 1-106 is indicative that the slot 1-106B is forcing the current to travel around the antenna (i.e., rotate) rather than go in a linear direction, which results in circular polarization.

FIGS. 1-5A-1-5C are diagrams illustrating exemplary operations that can be used to produce the reconfigurable aperture coupled patch antenna 1-100. FIGS. 1-5A-1-5C will be discussed in conjunction with FIGS. 1-7A-1-7I, which depict the reconfigurable aperture coupled patch antenna 1-100 at the different stages of the production at the cut A-A' illustrated in FIG. 1-6.

FIG. 1-5A is a diagram illustrating exemplary operations for generating a first and second laminated portion and laminating the first and second laminated portions together to produce the antenna 1-100. In block 1-502, a first laminated portion is generated. The first laminated portion (illustrated in realized form in FIG. 1-7D) comprises a conductive inner antenna element component 1-106A having a slot 1-106B (not shown) and a coupling antenna element component 1-106C on a top surface planar portion of a first dielectric layer 1-702. The first laminated portion also comprises a second dielectric layer 1-704 having a portion 1-706B configured to accept a switch 1-102A, a conductive via 1-710C through the laminated first dielectric layer 1-702 and second dielectric layer 1-704 from a bottom of the laminated first dielectric layer 1-702 and the second dielectric layer 1-704 to the inner antenna element component 1-106A, and a second conductive via 1-710B through the laminated first dielectric layer 1-702 and second dielectric layer 1-704 from the bottom of the laminated first dielectric layer 1-702 and the second dielectric layer 1-704 to the coupling antenna element component 1-106C.

In block 1-504, a second laminated portion is generated. The second laminated portion (illustrated in realized form in FIG. 1-7H) comprises a microstrip formed by conductive ground plane 1-720 and conductor 1-116, a first conductive switch feed element 1-712C, and a second conductive switch feed element 1-712B on a top surface of a third dielectric layer 1-714, a conductive ground plane 1-720 on a bottom surface of a fourth dielectric layer 1-718, and a switch 1-102A, electrically connected between the second conductive switch feed element 1-712B and the first conductive switch feed element 1-712C.

In block 1-506, the first laminated portion and the second laminated portion are laminated such that the switch 1-102A is disposed in the portion 1-706B of the second dielectric layer 1-704, the first via 1-710C forms a conductive path from the first conductive switch feed element 1-712C and the conductive antenna element 1-106A, and the second via 1-710B forms a second conductive path from the second conductive switch feed element 1-712B and the coupling antenna element component 1-106C.

FIG. 1-5B is a diagram illustrating exemplary operations used to generate the first laminated portion illustrated in FIG. 1-7D. In block 1-508, the conductive inner antenna element component 1-106A having a slot 1-106B (not shown) and the coupling antenna element component 1-106C are disposed on the top surface planar portion of the first dielectric layer 1-702. The result is illustrated in FIG. 1-7A.

In block 1-510, the second dielectric layer 1-704 is processed to create a portion 1-706B configured to accept switch 1-102A. The result is illustrated in FIG. 1-7B. This can be accomplished, for example, by etching. In block 1-512, the first dielectric layer 1-702 and the second dielectric layer 1-704 are laminated. After lamination, the portion 1-706B is disposed in a location between the conductive inner antenna element component 1-106A and the coupling antenna element component 1-106C so as to accept switch 1-102A.

In block 1-514, a first via 1-710C is created through the first dielectric layer 1-702 and the second dielectric layer 1-704 (now laminated) from the bottom of the second dielectric layer 1-704 to the inner antenna element component 1-106A. In block 1-516, a second via 1-710B is created through the first dielectric layer 1-702 and second dielectric layer 1-704 from the bottom of the second dielectric layer 1-704 to the coupling antenna element component 1-106C. Finally, in block 1-518, the first via 1-710C and the second via 1-710B are conductively treated. The result is the first laminated portion shown in FIG. 1-7D.

FIG. 1-5C is a diagram illustrating exemplary operations used to generate the second laminated portion as shown in FIG. 1-7H. In block 1-520, a conductor 1-116 forming the microstrip, the first conductive switch feed element 1-712C, and the second conductive switch feed element 1-712B are disposed on the top surface planar portion of the third dielectric layer 1-714 as shown in FIG. 1-7E. In block 1-522, the conductive ground plane 1-720 is disposed on a bottom surface of the fourth dielectric layer 1-718 as shown in FIG. 1-7F. In block 1-524, the third dielectric layer 1-714 and the fourth dielectric layer 1-718 are laminated as shown in FIG. 1-7G. In block 1-526, the switch 1-102A is electrically connected between the second conductive switch feed element 1-712B and the first conductive switch feed element 1-712C.

The fabrication process can be accomplished using a combination of subtractive (e.g. laser etch, milling, wet etching) and additive (e.g. printing, film deposition) techniques. Different dielectric layers 1-702, 1-704, 1-714, and 1-718 of the antenna are then aligned and laminated, for example, using adhesive films 1-708, 1-716 and 1-722. The placement of conductive surfaces on dielectric layer surfaces can be accomplished for example, by patterning the conductive material (e.g., copper) or by printing conductive ink to deposit the conductive material in the desired locations.

Portions of the adhesive films 1-708, 1-716 and 1-722 that must be removed to achieve the structure shown in FIGS. 1-7A-1-7I may be removed before lamination, or processed after lamination (e.g., using an etching technique). Further, layers 1-702, 1-704, 1-714 and 1-718 may be created in any order, but unless otherwise noted, should be layered as illustrated before lamination. Nominally, dielectric layers 1-702, 1-704, 1-714 and 1-718 are composed of a dielectric material having a relative permittivity (ratio of absolute permittivity to the permittivity of a vacuum) of approximately two to four The foregoing describes the use of only one coupling antenna element component 1-106C and a single switch 1-102A to electrically short (upon activation) the conductive inner antenna element component 1-106A to the coupling antenna element component 1-106C. As shown in FIGS. 1-1A and 1-1B, the antenna 1-100 may be implemented with a second coupling element component 1-106D (or more coupling elements), which are fabricated as shown in FIGS. 1-7A-1-7I. Further, multiple switching elements (102A1-102A4) can be used to electrically short (upon activation) the conductive inner antenna element component 1-106A to the coupling antenna element component 1-106C and multiple switching elements (102B1-102B4) may be used to electrically short (upon activation) coupling antenna element component 1-106C to further coupling element component 1-106D. In these embodiments, the first laminated portion also includes a second coupling element component 1-106D, and the second dielectric layer has additional portions 1-706A, 1-706D and 1-706E for accepting additional switches. Further, the first laminated portion also includes vias 1-710A and 1-710F, with via 1-710 electrically shorting (upon activation) additional conductive switch feed elements 1-712A and 1-712F to the second coupling element component 1-106D via additional switches 1-102B1 and 1-102B3. The foregoing structure for supporting two coupling element components 1-106C and 1-106D can be extended to as many coupling elements are desired.

Signal Transception

The foregoing antenna 1-100 can be used to transmit and/or receive (transceive) signals. In transmission, signals provided to the feed created by conductor 1-116 are transformed into a transmitted RF signal by antenna elements 1-106 and associated structures. In reception, RF signals are provided to the antenna elements 1-106 and associated structures and transformed into a received signal at the conductor 1-116.

For example, referring again to FIG. 1-1A, when used for transmission, the antenna 1-100 receives a signal at power input, and this signal is provided by the conductor 1-116 to the aperture coupled antenna elements 1-106 for transmission as an RF signal. The aperture coupled antenna elements 1-106 are electrically altered to change an operating frequency (or frequency range) of the antenna 1-100 as required for the desired RF signal frequency. This is accomplished by selectably activating at least a portion of the switches 1-102 to electrically couple one or more of the coupling antenna element components (1-106B and 1-106C) to the inner antenna element components 1-106A.

Electronically Steerable Conformal Antenna

Overview

In this disclosure, an electronically steerable antenna with a low profile is presented. Each antenna element is individually tuned by applying a DC bias voltage to a tunable permittivity material such as a liquid crystal. The antenna elements have inclusive slots and are aperture coupled to a microstrip line residing above an electrically conductive ground plane. The tunable permittivity material is placed between each antenna element and the lower ground plane. A change in the permittivity results in a shift in the resonant frequency of each antenna element. The steerable antenna also has a microstrip feed network with a lower ground plane to minimize any change in the antenna's electrical behavior due to conductive surfaces. This renders the antenna surface agnostic.

The antenna comprises a number of features which can be characterized by a number of embodiments. Such features may also be combined in selected embodiments as disclosed further herein. One feature is that the antenna has tunable permittivity material placed between each antenna element and the lower ground plane such as to control the resonant frequency of each antenna element. Another feature is that the antenna has an embedded RF microstrip feed network with a lower ground plane for minimizing any change in the antenna's electrical behavior due to conductive surfaces as well as simplifying planar arraying. Still another feature is that the antenna uses an aperture coupled feed for simplistic feeding, planar arraying, and reduction of antenna failure due to flexure. Yet another feature is that the antenna can utilize thin RF dielectrics for conformal applications due to the use of an aperture coupled feed. Finally, the antenna is circularly polarized with increased bandwidth by using aperture coupled antenna elements with inclusive slots.

Figures 1A, 5:
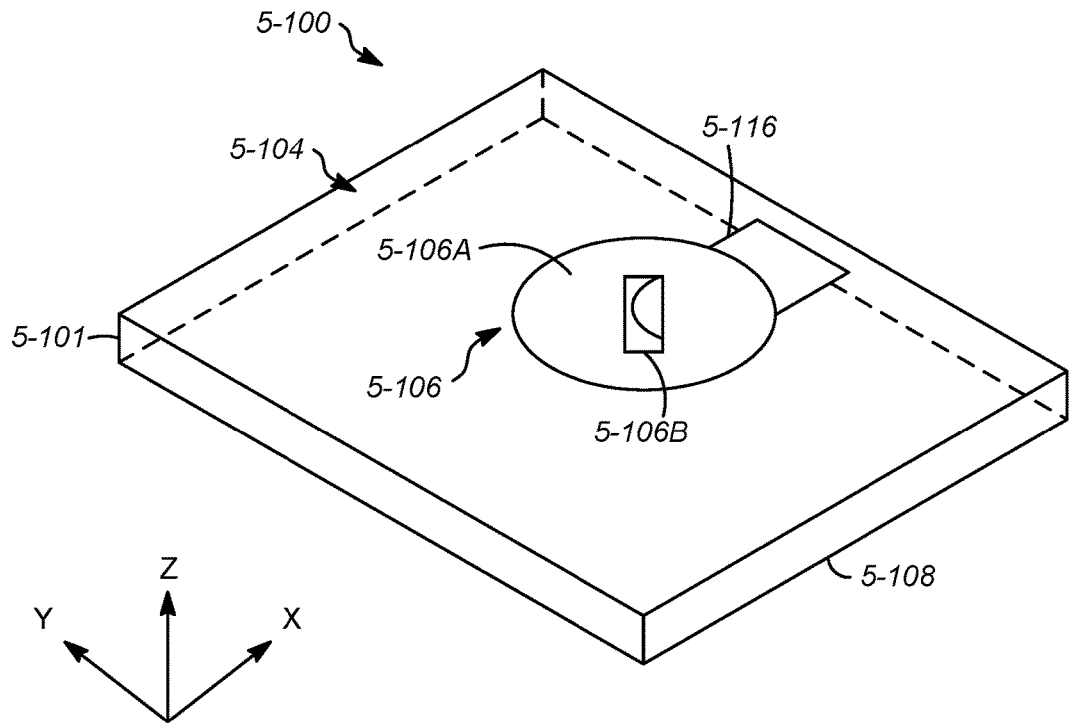
Figures 1B, 5:
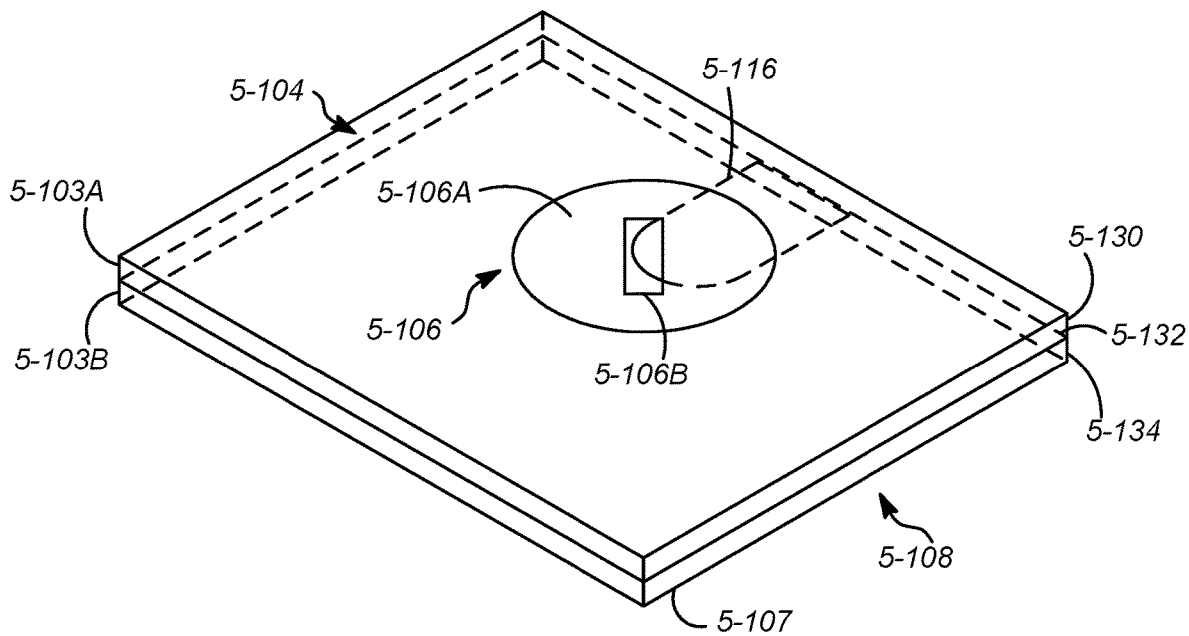
Figures 1C, 5:
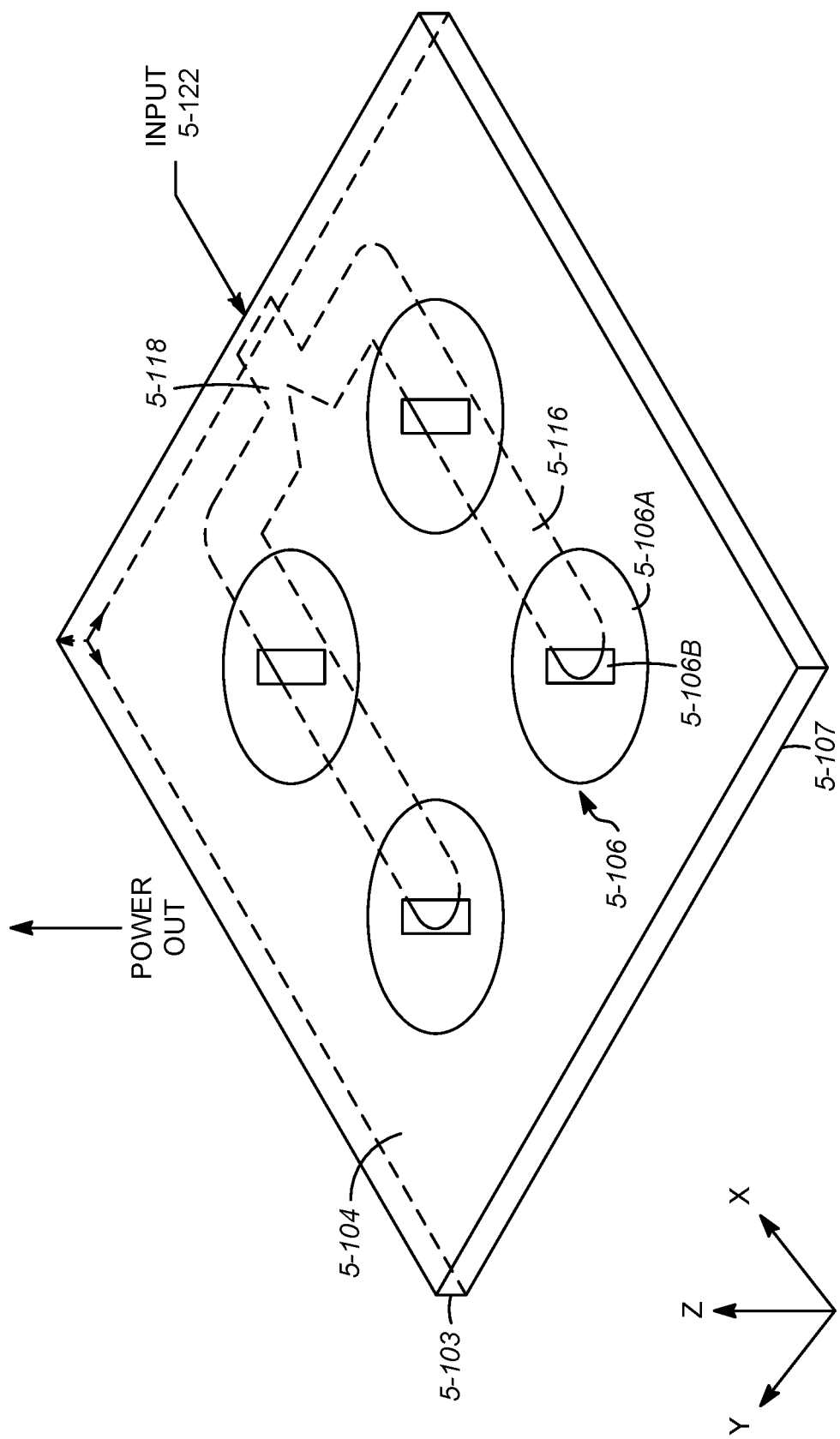
Figures 2A, 5:
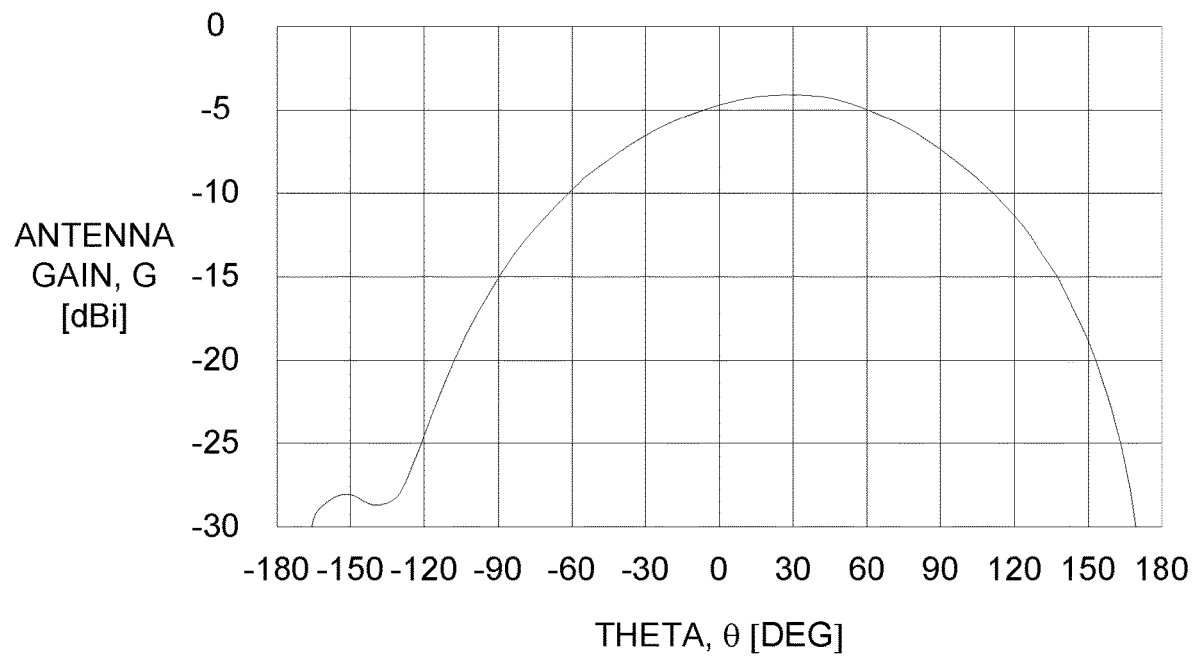
Figures 2B, 5:
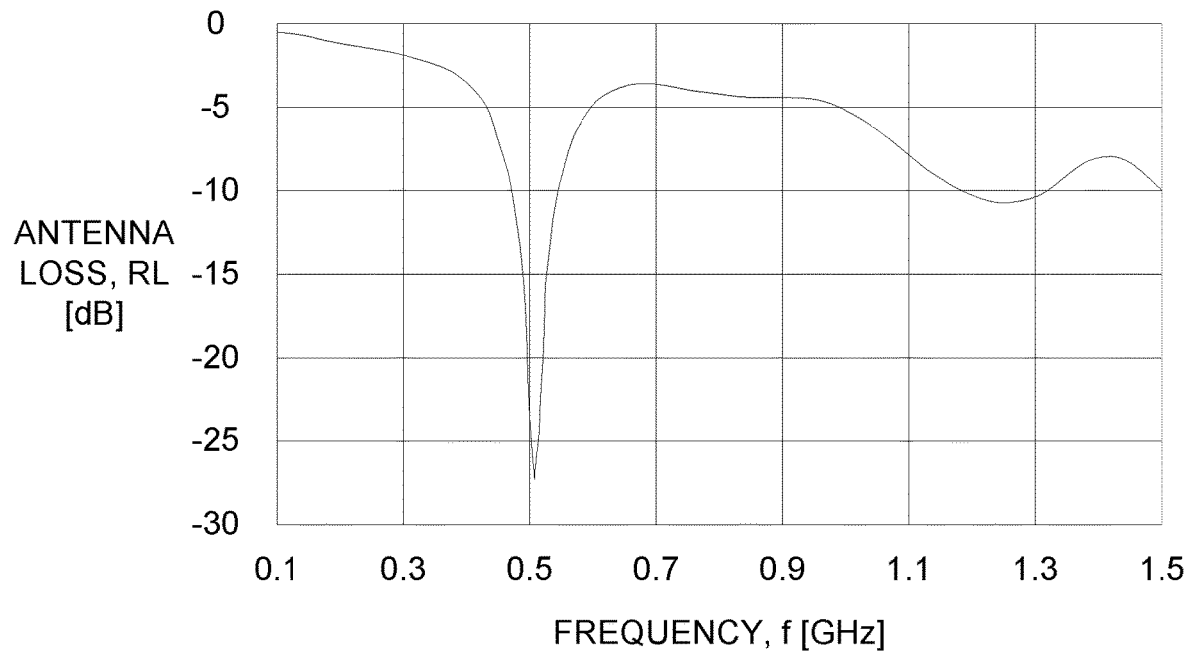
Figures 2C, 5:
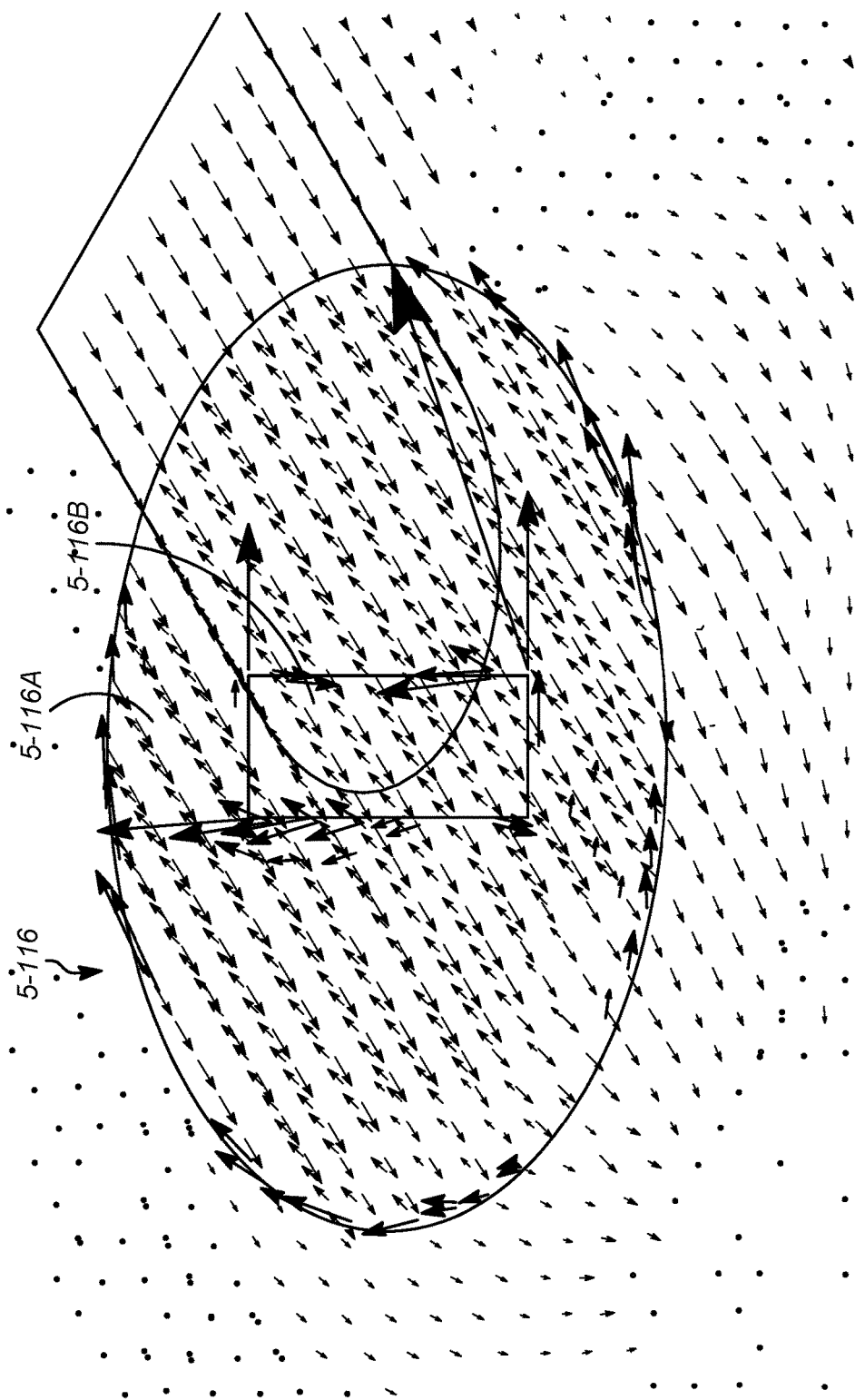
Figures 3, 5:
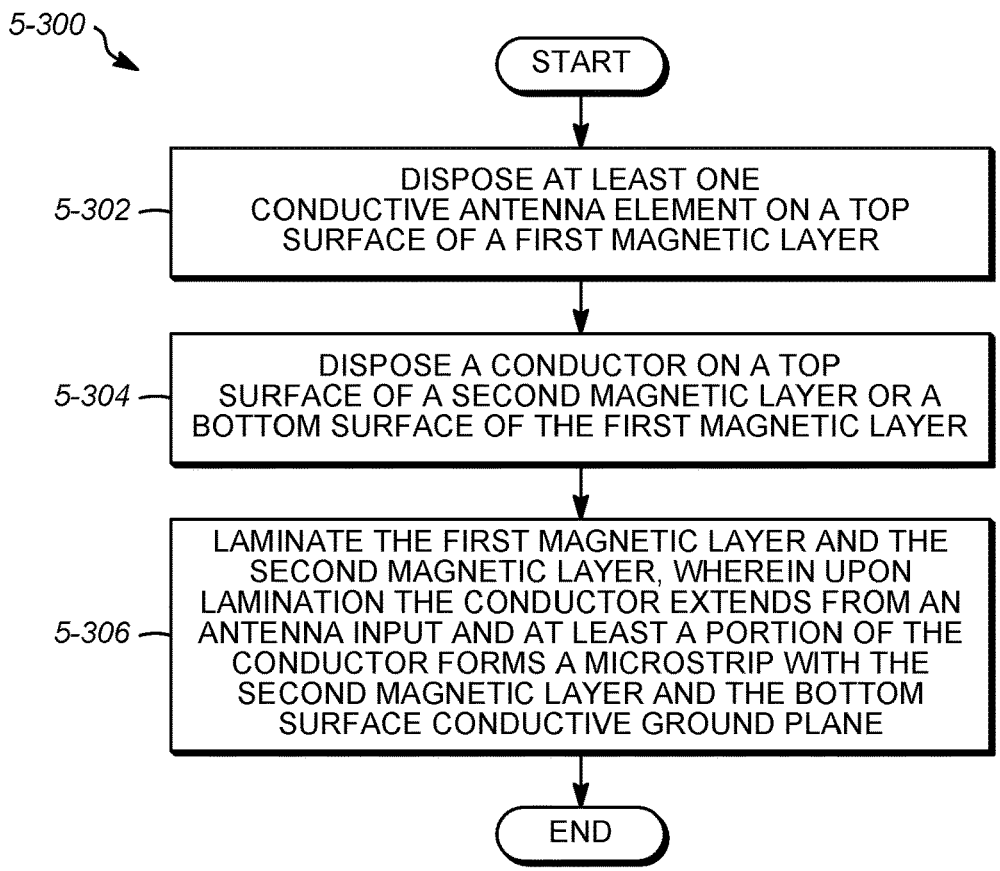
Figures 4, 5:
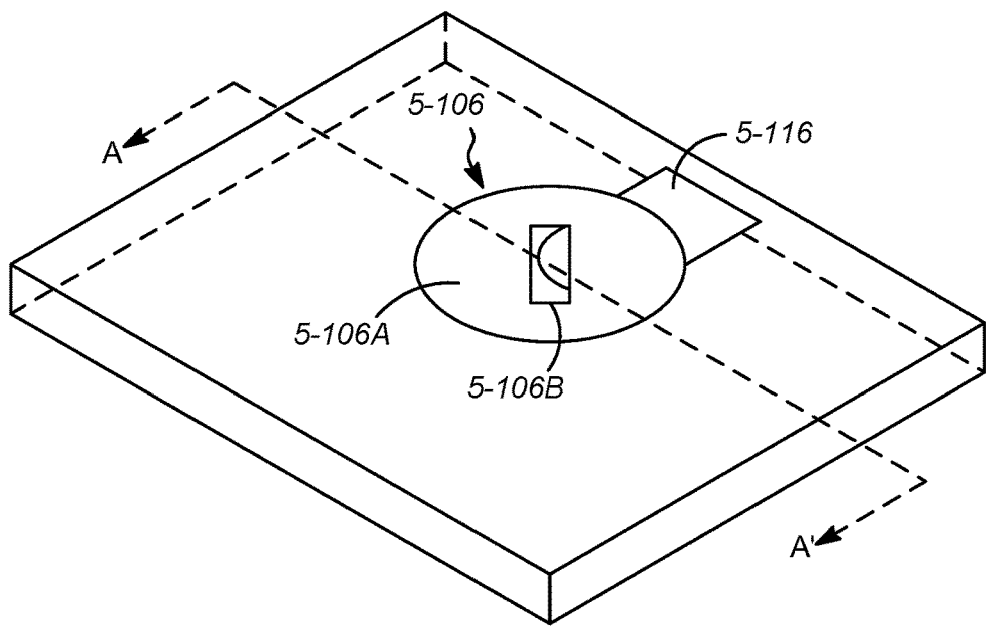
Figures 5, 5A:
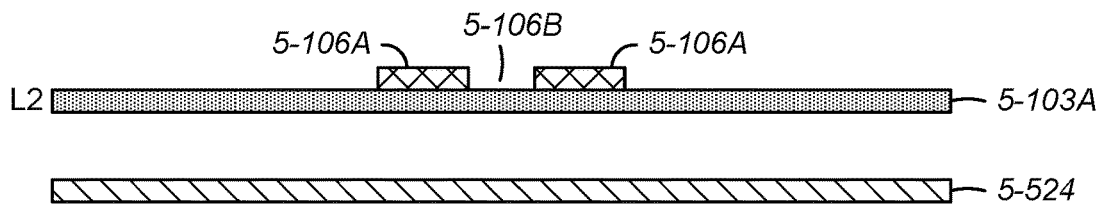
Figures 5, 5B:
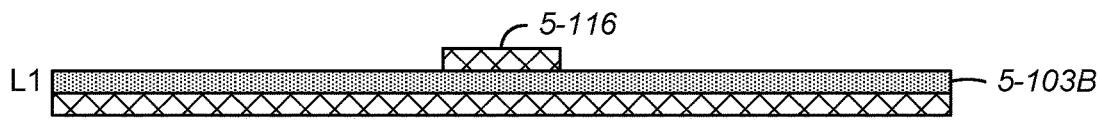
Figures 5, 5C:
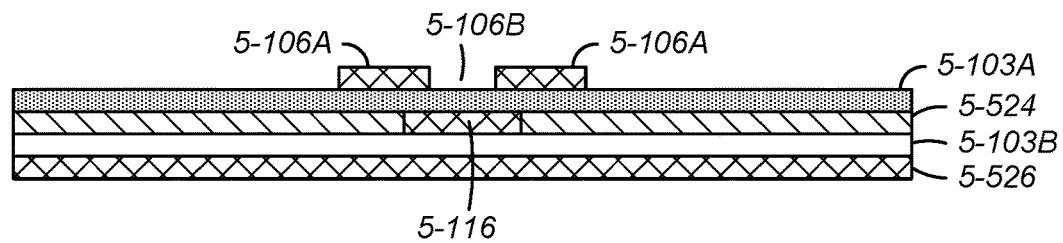
Figures 5, 6:
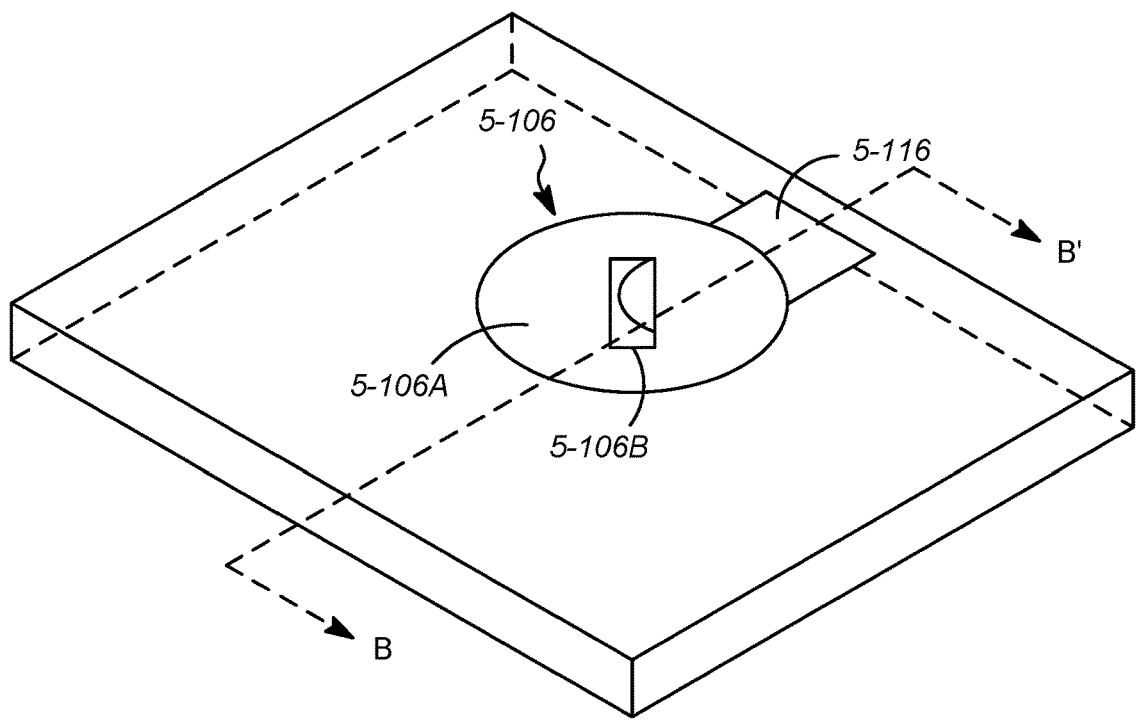
Figures 5, 6, 7, 7A:
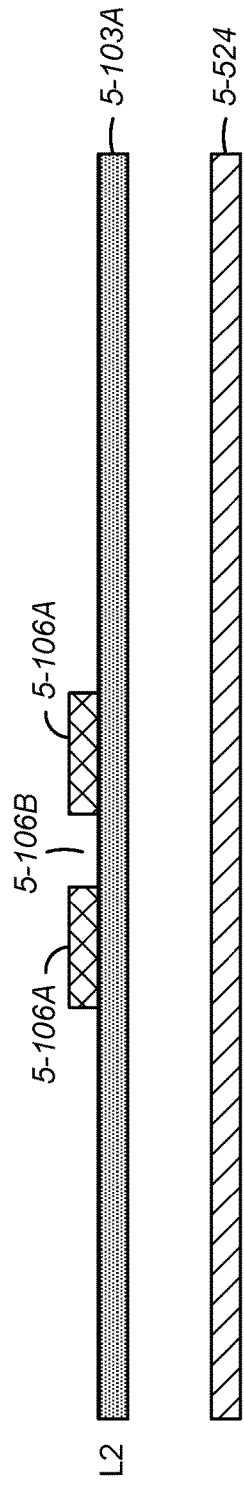
Figures 5, 6, 7, 7B:
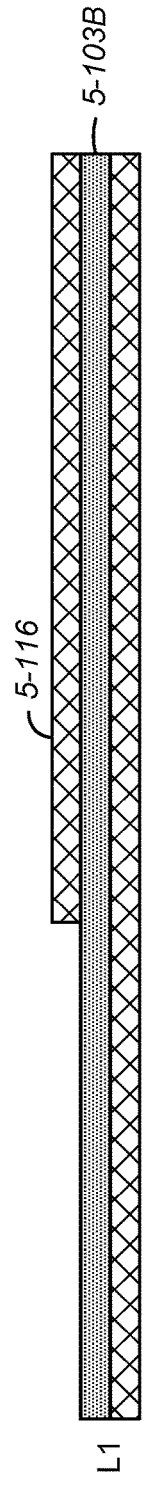
Figures 5, 6, 7, 7C:
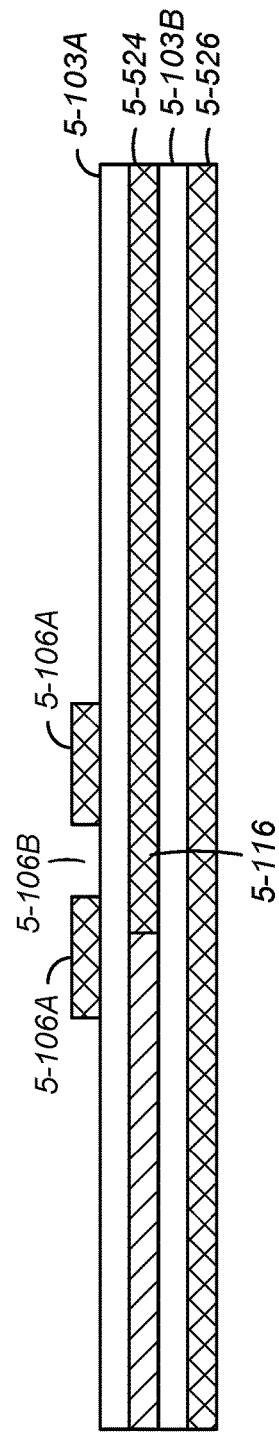

FIGS. 2-1A-2-1C are diagrams illustrating one embodiment of the electronically steerable conformal (e.g. conforming to the surface to which it is applied) antenna 2-100 (hereinafter alternatively referred to simply as antenna 2-100). In the illustrated embodiment, antenna 2-100 includes an RF circuit board 2-101 having a composite dielectric 2-103. The RF circuit board 2-101 includes a circuit board first portion 2-101A and a circuit board second portion 2-101B. The RF circuit board 2-101 also comprises a top planar surface 2-104 that has a first top surface planar portion 2-104A and a second top surface planar portion 2-104B. The second top surface planar portion 2-104B has at least one antenna element 2-106. In the illustrated embodiment, a 4×4 array of antenna elements 2-106 is included.

The RF circuit board 2-101 also comprises a bottom planar surface 2-108 which has a first bottom surface planar portion 2-108A and a second bottom surface planar portion 2-108B. A bottom surface ground plane 2-107 extends along the first bottom surface planar portion 2-108A and the second bottom surface planar portion 2-108B. A conductor 2-116 extending on a top surface of the circuit board first portion 2-101A and through the circuit board second portion 2-101B forming a microstrip feed network with the bottom surface ground plane 2-107 of the first and second bottom surface planar portions 2-108A and 2-108B, respectively. In the illustrated embodiment, the conductor 2-116 includes one or more power dividers 2-118 disposed between the antenna input 2-122 and the antenna elements 2-106. The power dividers 2-118 divide (or split) the antenna input into equivalent signals of reduced power that are then fed to antenna elements 2-106.

Each antenna element 2-106 comprises a conductive antenna element component 2-106A having a conductive surface with a slot (or aperture) 2-106B. This aperture 2-106B electrically couples the antenna element 2-106 to the microstrip feed network formed by conductor 2-116, the ground plane 2-107, and dielectric material therebetween.

The antenna 2-100 also comprises a tunable cavity 2-120 disposed between the associated antenna element 2-106 and ground plane 2-107, with the conductor 2-116 extending at least partially through the cavity 2-120 to a centroid of the cavity 2-120. In the illustrated embodiment, the antenna element 2-106 and tunable cavity 2-120 are of the same (or substantially similar) dimensions and are both of circular cross sections in the XY plane shown in FIG. 2-1A. However, the antenna 2-100 may be implemented in other embodiments in which the antenna element 2-106 and/or tunable cavity 2-120 are of different dimensions or cross sections.

In one embodiment, each tunable cavity 2-120 comprises a tunable permittivity material. In a particular embodiment, the tunable permittivity material comprises a liquid crystal having a permittivity that can be tuned by application of a DC bias voltage. In one embodiment, the permittivity of each tunable cavity 2-120 is individually tuned via a DC bias voltage applied between each antenna element 2-106 and the ground plane 2-107. For example, liquid crystal material is available from MERCK in which the relative permittivity (ratio of the absolute permittivity to the permittivity of a vacuum) can be changed from 2.3 to 2.8 by application of 10 volts.

In the illustrated embodiment, the antenna 2-100 comprises a 4×4 array of antenna elements 2-106. The 4×4 array has aperture coupled antenna elements 2-106 with inclusive slots 2-106B, an embedded microstrip feed formed by conductor 2-116 with power dividers 2-118, a lower ground plane 2-107, and tunable cavities 2-120 between each antenna element 2-106 and the lower ground plane 2-107.

As is discussed further below, the antenna 2-100 includes three conductive layers separated by four dielectric layers. The dimensions of the antenna elements 2-106 (i.e., diameter of conductive antenna element component 2-106A, slot 2-106B length, slot 2-106B width) and the dimensions (i.e., diameter) of the tunable cavities 2-120 are determined to maximize radiated power at the desired operating frequency.

FIGS. 2-2A and 2-2B are diagrams depicting plots of the predicted performance of a 4×4 electronically steerable conformal antenna designed to operate near 10 GHz. The surface dimensions of the 4×4 array are 80 mm×55 mm and the board has four 10 Mil PYRALUX layers. FIG. 2-2A is a diagram illustrating the radiation pattern of the 4×4 array in the Y-Z plane (a nominal configuration, with a first row of antenna elements 2-106 "on", with a second row of antenna elements 2-106 "on", with a third row of antenna elements 2-106 "on", and with a fourth row of antenna elements 2-106 "on" (e.g. the appropriate bias voltage is applied such that the dielectric constant is changed to a desired value). The results (generated with a finite element model (FEM) solver) show a steerability of about 41 degrees. FIG. 2-2B is a diagram illustrating the angle of the main beam of the radiation pattern, illustrating how activation of different rows allows the main beam to be steered.

Figures 1, 2, 3, 3A:
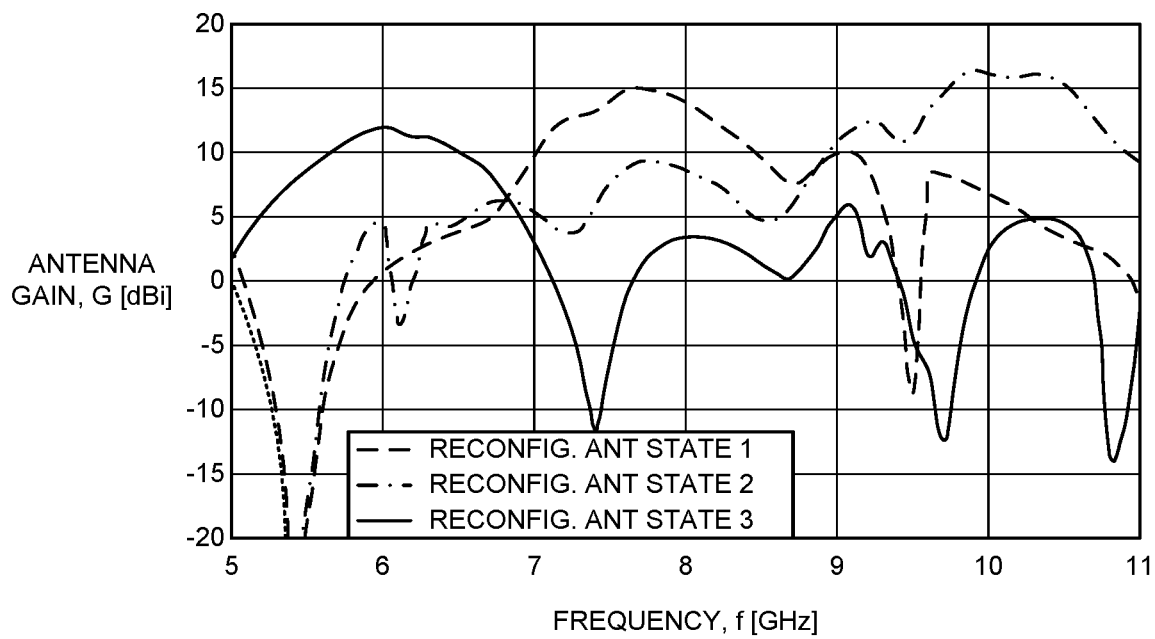

FIG. 2-3 is a diagram illustrating exemplary operations that can be used to produce the electronically steerable conformal antenna 2-100. FIG. 2-3 will be discussed in conjunction with FIGS. 2-4, 2-5A-2-5C, 2-6, and 2-7A-2-7C, which are diagrams depicting the electronically steerable conformal antenna at different stages of a representative production process. FIG. 2-4 is a diagram illustrating the cut A-A' of the antenna 2-100 depicted in FIGS. 2-5A-2-5C, while FIG. 2-6 is a diagram illustrating the cut B-B' of the antenna 2-100 depicted in FIGS. 2-7A-2-7C.

Turning now to FIG. 2-3, in block 2-302, a conductive antenna element component 2-106A is disposed on a top surface of a first dielectric layer 2-502 (also labeled D1). In block 2-304, the first dielectric layer 2-502 is processed to create at least one port 2-512A therethrough. In the embodiment illustrated in FIG. 2-5A, the first dielectric layer 2-502 is also processed to create a second port 2-512B. The second port 2-512B is located at a place diametrically opposed to the first port 2-512A and offset from the conductive antenna element 2-106A by a second horizontal distance approximating that of the horizontal distance from the conductive antenna element 2-106A to the first port 2-512A.

In block 2-306, a second dielectric layer 2-504 (also labeled D2) is processed to create a first void 2-514 and a channel 2-516A. In the illustrated embodiment in FIG. 2-5A, a second channel 2-516B is also created for access to the second port 2-512B. The second port 2-512B and second channel 2-516B assist in the fluidic insertion of dielectric material into the antenna 2-100 structure.

In block 2-308, a conductor 2-116 is disposed on the top surface of a third dielectric layer 2-506 (also labeled D3). In block 2-310, the third dielectric layer 2-506 is processed to create a second void 2-520 below the first void 2-514 and the conductor 2-116 with the conductor 2-116 disposed between the first void 2-514 and the second void 2-520. In block 2-312, a conductive ground plane 2-522 is formed on a bottom surface of a fourth dielectric layer 2-508 (also labeled D4).

In block 2-314, the first dielectric layer 2-502, the second dielectric layer 2-504, the third dielectric layer 2-506, and the fourth dielectric layer 2-508 are aligned and laminated together. Upon lamination of the dielectric layers 2-502, 2-504, 2-506 and 2-508, the first void 2-514 is disposed between the conductive antenna element component 2-106A and the conductive ground plane 2-522, and the first void 2-514 and the second void 2-520 together form a cavity 2-530 disposed between the conductive antenna element component 2-106A and the conductive ground plane 2-522, and the conductor 2-116 is disposed through the cavity 2-530, between the first void 2-514 and the second void 2-520 as illustrated in FIG. 2-5B. Also, upon lamination of the dielectric layers 2-502, 2-504, 2-506 and 2-508, and the port 2-512A and channel 2-516A are in fluid communication (e.g. they are coupled to allow free passage of fluids including air) within the cavity 2-530. This fluid communication is used to fill the cavity with a tunable permittivity material via the port 2-512A and the channel 2-516A, as shown in block 2-316 and illustrated in FIG. 2-5C. After such filling, the ports 2-512A and 2-512B may be sealed with an epoxy.

The foregoing steps illustrate the creation of one antenna element 2-106 on the RF circuit board 2-101. Typically, the antenna 2-100 comprises an array of elements such as the 4×4 array of elements illustrated in FIG. 2-1A. In such case, the operations disclosed above include analogous operations as applied to any other desired antenna elements in the array. For example, FIGS. 2-7A-2-7C illustrate the electronically steerable conformal antenna 2-100 at different stages of production along the cut B-B' depicted in FIG. 2-6. Note that a second conductive antenna element component 2-106A' is disposed on the top surface of the first dielectric layer, and the second dielectric layer 2-504 is also processed to create another void 2-514.' Although not illustrated, a second port and channel are also created using analogous techniques. FIGS. 2-7A-2-7C also illustrate disposing the conductor 2-116 such that the conductor 2-116 extends through the cavity 2-530 and at least partially through the adjacent cavity 2-530'.

In one embodiment, the aforementioned processing to create the ports, voids, and channels is accomplished by a subtractive technique such as laser etching, milling, or wet etching. Furthermore, the disposition of conductive material on the dielectric may be accomplished by additive methods such as dispense printing or film deposition of suitable conductive materials (e.g., silver, copper, etc.) to the appropriate surface of the dielectric. The lamination of the first dielectric layer 2-502, the second dielectric layer 2-504, the third dielectric layer 2-506, and the fourth dielectric layer 2-508 can be accomplished by disposing a first adhesive film 2-524 between the first dielectric layer 2-502 and the second dielectric layer 2-504, disposing a second adhesive film 2-526 between the second dielectric layer 2-504 and the third dielectric layer 2-506, and disposing a third adhesive film 2-528 between the third dielectric layer 2-506 and the fourth dielectric layer 2-508. Portions of the adhesive films 2-524, 2-526, and 2-528 that must be removed to achieve the structure shown in FIGS. 2-5A-2-5C may be removed before lamination, or processed after lamination (e.g., using an etching technique). Further, layers 2-502, 2-504, 2-506 and 2-508 may be created in any order, but unless otherwise noted, should be layered as illustrated before lamination. Nominally, dielectric layers 2-502, 2-504, 2-506 and 2-508 are composed of a dielectric material having a relative permittivity (ratio of absolute permittivity to the permittivity of a vacuum) of approximately two to four.

FIGS. 2-8A-2-8C are diagrams illustrating how a DC bias voltage may be supplied to the tunable permittivity material 2-532 via the RF circuit board 2-101. A conductor 2-802 for carrying the DC bias voltage can be added to the top surface of the third dielectric layer 2-506 as illustrated in location allowing contact with the tunable permittivity material 2-532. This conductor 2-802 may be then routed in the RF circuit board 2-101 to a source of the DC bias voltage. If the antenna 2-100 is to permit beam steering in only one axis, the same conductor 2-802 may be routed to all of the antenna elements 2-106 in a row (or column) of antenna elements 2-106, with a different conductor routed to all of the antenna elements 2-106 of a different row (or column) of antenna elements 2-106. If the antenna 2-100 is to permit beam steering in two axes (e.g. about both the X and Y axes), the tunable permittivity material 2-532 of each conductor 2-802 needs to be separately controlled, requiring a dedicated trace in the RF circuit board 2-101 to the conductor 2-802 associated with each tunable permittivity material 2-532. Further, while the conductor 2-802 is illustrated as being disposed adjacent to the cavity 2-530 and on the third dielectric layer 2-506, other embodiments that allow the DC bias voltage to be applied to the tunable permittivity material 2-532 can also be used. For example, the conductor 2-802 may be disposed on a top (or bottom) surface of the first dielectric layer 2-502, on a top (or bottom) surface of the second dielectric layer 2-504 (but not interfering with the channel 2-516), on a bottom surface of the third dielectric layer 2-506, or on a top surface of the fourth dielectric layer 2-508.

Signal Transception

The foregoing antenna 2-100 can be used to transmit and/or receive (transceive) signals. In transmission, signals provided to the feed created by conductor 2-116 are transformed into a transmitted RF signal by antenna elements 2-106 and associated structures. In reception, RF signals are provided to the antenna elements 2-106 and associated structures and transformed into a received signal at the conductor 2-116.

For example, referring again to FIG. 2-1A, when used for transmission, the antenna 2-100 receives a signal at power input, and this signal is provided by the conductor 2-116 to the aperture coupled antenna elements 2-106 for transmission as an RF signal. The permittivity of the dielectric material disposed in a tunable cavity 2-120 between the plurality of antenna elements 2-106 and the ground plane is selectively controlled by application of a DC bias voltage, thus controlling the resonant frequency of the plurality of antenna elements 2-106.

Stripline Conformal Patch Antenna

Overview

In this disclosure, a polarization bandwidth-enhanced conformal antenna is presented. Polarization bandwidth is enhanced by using an aperture coupled antenna element with an inclusive slot, a ground plane coplanar to the aperture coupled antenna element, an embedded stripline feed network, and a lower ground plane below the stripline feed network. The slot and coplanar ground decrease the axial ratio thereby increasing the circular polarization bandwidth. Circularly polarized antennas, in comparison to linearly polarized antennas, are generally desired as they have less power loss from transmitter to receiver due to antenna misalignment. Furthermore, the disclosed antenna has a lower ground plane that minimizes any change in the antenna's electrical behavior due to the presence of conductive surfaces (e.g., airplane wing, fuselage, etc.); better known as "surface agnostic" behavior.

The antenna comprises a number of features which can be characterized by a number of embodiments. Such features may also be combined in selected embodiments as disclosed further herein. One feature is an embedded RF stripline residing between a top surface ground plane (also known as coplanar ground plane) that is electrically shorted to a bottom surface ground plane (also known as lower ground plane). Another feature is that the antenna uses an aperture coupled feed network to simplify antenna feeding, planar arraying, and reduce failure due to antenna flexure. Still another feature is that the antenna can utilize thin RF dielectrics for conformal applications due to the use of an aperture coupled feed. Finally, the antenna is circularly polarized with increased polarization bandwidth by using aperture coupled antenna elements with inclusive slots and a coplanar ground plane.

FIGS. 3-1A and 3-1B are diagrams illustrating one embodiment of the stripline conformal (i.e., conforming to the surface to which it is applied) patch antenna 3-100 (hereinafter alternatively referred to simply as antenna 3-100). In the illustrated embodiment, the antenna 3-100 includes an RF circuit board 3-101 having a composite dielectric 3-103. The RF circuit board 3-101 includes a circuit board first portion 3-101A and a circuit board second portion 3-101B. The RF circuit board 3-101 also comprises a top planar surface 3-104 that has a first top surface planar portion 3-104A and a second top surface planar portion 3-104B. The second top surface planar portion 3-104B has at least one antenna element 3-106. In the illustrated embodiment, a 4×4 array of antenna elements 3-106 is included, although the array may be non-square and may have a greater or lesser number of antenna elements 3-106.

The RF circuit board 3-101 also comprises a bottom planar surface 3-108 which has a first bottom surface planar portion 3-108A and a second bottom surface planar portion 3-108B. A bottom surface ground plane 3-107 extends along the first bottom surface planar portion 3-108A and the second bottom surface planar portion 3-108B. A conductor 3-116 extending on a top surface of the circuit board first portion 3-101A and through the circuit board second portion 3-101B forms a microstrip with the bottom surface ground plane 3-107 of the first bottom surface planar portion 3-108A and a stripline with a top surface conductive ground plane 3-124 (disposed on the second top surface planar portion 3-104B) and the second bottom surface planar portion 3-108B of the bottom surface ground plane 3-107.

In the illustrated embodiment in FIGS. 3-1A and 3-1B, the conductor 3-116 includes one or more stripline power dividers 3-118 disposed in the X-axis between the antenna input 3-122 and the antenna elements 3-106 and in the Z-axis between the top surface conductive ground plane 3-124 and the bottom surface ground plane 3-107. The power dividers 3-118 divide the antenna input into signals of equally reduced power that are thereafter provided to downstream antenna elements 3-106.

Each antenna element 3-106 comprises a conductive antenna element component 3-106A having a conductive surface with a slot (or aperture) 3-106B therein. This aperture 3-106B couples the antenna element 3-106 to the stripline feed formed by the conductor 3-116. The stripline feed is electrically coupled to both the bottom surface ground plane 3-107 and the top surface conductive ground plane 3-124.

In the illustrated embodiment, the antenna 3-100 comprises a 4×4 array of antenna elements 3-106. The 4×4 array has aperture coupled antenna elements 3-106 with inclusive slots 3-106B along with a top surface conductive ground plane 3-124 (or coplanar ground plane), a bottom surface ground plane 3-107 (or lower ground plane), and a conductor 3-116 that divides power to a stripline feed network. Also included are a plurality of electrically conductive vias 3-120 electrically shorting the top surface conductive ground plane 3-124 to the bottom surface ground plane 3-107. As is discussed further below, the RF circuit board 3-101 includes four dielectric layers separating three conductive layers. The dimensions of the antenna elements (i.e., diameter, slot length, slot width) and gap (between the coplanar ground and antenna elements) are determined to maximize radiated power at the desired operating frequency.

FIGS. 3-2A and 3-2B are diagrams depicting plots (generated with a finite element model (FEM) solver) of the predicted performance of a 4×4 electronically steerable conformal antenna designed to operate near 10 GHz. The surface dimensions of the 4×4 array are 77 mm×57 mm and the board has four 10 Mil PYRALUX layers.

FIG. 3-2A is a diagram illustrating the predicted antenna gain (dBi) as a function of frequency (GHz) for a standard 4×4 array without a coplanar ground (e.g. top surface conductive ground plane 3-124) and for a 4×4 array of identical design, but including the coplanar ground (thus implementing the stripline 4×4 array such as is illustrated in FIGS. 3-1A and 3-1B). Note that there is a decrease in gain of about 2 to 2.5 dB around 10 GHz.

FIG. 3-2B is a diagram showing the predicted axial ratio of the standard 4×4 array without the coplanar ground and for the stripline 4×4 array with the coplanar ground (illustrated in FIGS. 3-1A and 3-1B). The results show that the stripline 4×4 array with the coplanar ground improves the 2:1 axial ratio bandwidth more than 200 MHz (or about 25%).

FIG. 3-3 is a diagram illustrating exemplary operations that can be used to produce the stripline conformal antenna 3-100. FIG. 3-3 will be discussed in conjunction with FIGS. 3-4, 3-5A-3-5C, 3-6 and 3-7A-3-7C, which are diagrams depicting the electronically steerable conformal antenna at different stages of a representative production process. FIG. 3-4 is a diagram illustrating the cut A-A' of the antenna 3-100 depicted in FIGS. 3-5A-3-5C, while FIG. 3-6 is a diagram illustrating the cut B-B' of the antenna 3-100 depicted in FIGS. 3-7A-3-7C.

Turning now to FIG. 3-3, in block 3-302, one or more conductive antenna element components 3-106A having slots 3-106B and a top surface conductive ground plane 3-124 are disposed on a top surface of a first dielectric layer 3-502 (also labeled D1). The top surface conductive ground plane 3-124 is electrically isolated from each of the conductive antenna element components 3-106A. In block 3-304, a conductor 3-116 is disposed on a bottom surface of a second dielectric layer 3-504 (also labeled D2) or on a top surface of a third dielectric layer 3-506 (also labeled D3).

In block 3-306, a bottom surface conductive ground plane 3-522 is disposed on a bottom surface of a fourth dielectric layer 3-508 (also labeled D4). In block 3-308, the first dielectric layer 3-502, the second dielectric layer 3-504, the third dielectric layer 3-506, and the fourth dielectric layer 3-508 are aligned so that the conductor 3-116 is disposed between each of the antenna elements 3-106 and the bottom surface conductive ground plane 3-522 and extends from an antenna input 3-122 and forms a stripline between the top surface conductive ground plane 3-124 and the bottom surface conductive ground plane 3-522 and thereafter laminated to form the composite dielectric 3-103. Accordingly, upon lamination, the conductor 3-116 is disposed between each of the antenna elements 3-106 and the bottom surface conductive ground plane 3-522 and extends from an antenna input 3-122 and forms a stripline between the top surface conductive ground plane 3-124 and the bottom surface conductive ground plane 3-522.

In block 3-310, a plurality of electrically conductive vias 3-120 are created through the composite dielectric. This is accomplished, for example, by etching, milling or drilling the vias 3-120, and coating the inner surface of the vias 3-120 with conductive material. The plurality of electrically conductive vias 3-120 electrically short the bottom surface conductive ground plane 3-522 to the top surface conductive ground plane 3-124.

The number and location of the electrically conductive vias 3-120 electrically shorting the bottom surface conductive ground plane 3-522 to the top surface conductive ground plane 3-124 is chosen to assure that the conductor 3-116 operates as a low loss stripline. The exemplary embodiment illustrated in FIG. 3-1A illustrates a 4×4 array of antenna elements 3-106, with three rows of vias 3-120, including a first row 3-126 of vias, a second row 3-128 of vias, and a third row 3-130 of vias. The first row 3-126 and third row 3-130 of vias are disposed on opposing edges of a periphery of the RF circuit board 3-101, and the second row 3-128 of vias is disposed equidistant from and between the first row 3-126 and third row 3-130 of vias, between the second and third row of antenna elements 3-106. In another embodiment, the vias 3-120 are disposed along the entire periphery of the RF circuit board 3-101.

Other embodiments include additional rows of vias 3-120. For example, FIG. 3-5C illustrates via 3-120 and additional via 3-120' which is one of the vias in a row of vias between the first row of antenna elements 3-106 and the second row of antenna elements 3-106. Further, vias 3-120 may also be disposed in columns between the antenna elements 3-106 instead of or in addition to the rows of vias illustrated in FIGS. 3-1A and 3-1B.

The foregoing steps illustrate the creation of one antenna element 3-106 on the RF circuit board 3-101. Typically, the antenna 3-100 comprises an array of elements such as the 4×4 array of elements illustrated in FIG. 3-1A. In such case, the operations disclosed above include analogous operations as applied to any other desired antenna elements 3-106 in the array. For example, FIGS. 3-7A-3-7C illustrate the stripline conformal antenna 3-100 at different stages of production along the cut B-B' depicted in FIG. 3-6. Note that a second conductive antenna element component 3-106A' having second inclusive slot 3-106B' is disposed on the top side of the first dielectric layer 3-502. FIGS. 3-7A-3-7C also illustrate disposing the conductor 3-116 such that the conductor 3-116 extends through composite dielectric 3-103.

Furthermore, the disposition of conductive material on the dielectric may be accomplished by additive methods such as printing or film deposition of suitable conductive materials (e.g., silver, copper, etc.) to the appropriate surface of the dielectric. Deposition of conductive materials may also be accomplished by combined additive and subtractive methods such as laser etching, milling, or wet etching. Hence, the conductive materials may be deposited on the entire surface of the dielectric layer(s) and unwanted portions are subsequently etched away. For example, the top of the first dielectric layer 3-502 may be formed by disposing a conductive material along the entire top surface, then etching (or otherwise removing) the conductive material from the slot 3-106B and the area surrounding the conductive antenna element component 3-106' and the top surface conductive ground plane 3-124.

The lamination of the first dielectric layer 3-502, the second dielectric layer 3-504, the third dielectric layer 3-506, and the fourth dielectric layer 3-508 can be accomplished by disposing a first adhesive film 3-524 between the first dielectric layer 3-502 and the second dielectric layer 3-504, disposing a second adhesive film 3-526 between the second dielectric layer 3-504 and the third dielectric layer 3-506, and disposing a third adhesive film 3-528 between the third dielectric layer 3-506 and the fourth dielectric layer 3-508. Portions of the adhesive films 3-524, 3-526, and 3-528 that must be removed to achieve the structure shown in FIGS. 3-5A-3-5C may be removed before lamination, or processed after lamination (e.g., using an etching technique). Further, layers 3-502, 3-504, 3-506 and 3-508 may be created in any order, but unless otherwise noted, should be layered as illustrated before lamination. Nominally, dielectric layers 3-502, 3-504, 3-506 and 3-508 are composed of a dielectric material having a relative permittivity (ratio of absolute permittivity to the permittivity of a vacuum) of approximately two to four.

Signal Transception

The foregoing antenna 3-100 can be used to transmit and/or receive (transceive) signals. In transmission, signals provided to the feed created by conductor 3-116 are transformed into a transmitted RF signal by antenna elements 3-106 and associated structures. In reception, RF signals are provided to the antenna elements 3-106 and associated structures and transformed into a received signal at the conductor 3-116. For example, referring again to FIG. 3-1A, when used for transmission, the antenna 3-100 receives a signal at power input, and this signal is provided by the conductor 3-116 to the aperture coupled antenna elements 3-106 for transmission as an RF signal.

Conformal Antenna With Dielectric Lens

Overview

In this disclosure, a bandwidth-enhanced conformal antenna is presented. Bandwidth is enhanced by using an aperture coupled antenna element with an inclusive slot and dielectric lens on each antenna element. The slot and dielectric lens decrease the axial ratio thereby increasing the circular polarization bandwidth. Circularly polarized antennas, in comparison to linearly polarized antennas, are generally desired as they have less power loss from transmitter to receiver due to antenna misalignment. Furthermore, the disclosed antenna has a lower ground plane that minimizes any change in the antenna's electrical behavior due to the presence of conductive surfaces (e.g., airplane wing, fuselage, etc.); better known as "surface agnostic" behavior.

The antenna comprises a number of features which can be characterized by a number of embodiments. Such features may also be combined in selected embodiments as disclosed further herein. One feature is that the antenna has an embedded RF microstrip with a lower ground plane for minimizing any change in the antenna's electrical behavior due to conductive surfaces. Another feature is that the antenna uses an aperture coupled feed network to simplify antenna feeding, planar arraying, and reduce failure due to antenna flexure. Still another feature is that the antenna can utilize thin RF dielectrics for conformal applications due to the use of an aperture coupled feed. Yet another feature is that the antenna is circularly polarized with increased polarization bandwidth by using aperture coupled antenna elements with inclusive slots and printed dielectric lens. Finally, the antenna also uses additive 3D printing or deposition techniques to print non-planar dielectric lens on the surface of the antenna elements.

FIGS. 4-1A and 4-1B are diagrams illustrating one embodiment of the conformal (i.e., conforming to the surface to which it is applied) antenna 4-100 having a dielectric lens (hereinafter alternatively referred to simply as antenna 4-100).

FIG. 4-1A is a diagram presenting a perspective view of the antenna 4-100, while FIG. 4-1B is a diagram presenting a side view of the antenna 4-100. The antenna 4-100 includes an RF circuit board 4-101 having a composite dielectric 4-103. The RF circuit board 4-101 includes a circuit board first portion 4-101A and a circuit board second portion 4-101B. The RF circuit board 4-101 also comprises a top planar surface 4-104 that has a first top surface planar portion 4-104A and a second top surface planar portion 4-104B. The second top surface planar portion 4-104B has at least one antenna element 4-106. In the illustrated embodiment, a 4×4 array of antenna elements 4-106 is included, although the array may be non-square and may have a greater or lesser number of antenna elements 4-106.

The RF circuit board 4-101 also comprises a bottom planar surface 4-108 which has a first bottom surface planar portion 4-108A and a second bottom surface planar portion 4-108B. A bottom surface ground plane 4-107 extends along the first bottom surface planar portion 4-108A and the second bottom surface planar portion 4-108B. A conductor 4-116 extending on a top surface of the circuit board first portion 4-101A and through the circuit board second portion 4-101B forms a microstrip with the bottom surface ground plane 4-107 of the first bottom surface planar portion 4-108A and the second bottom surface planar portion 4-108B.

In the illustrated embodiment, the conductor 4-116 includes one or more power dividers 4-118 disposed along the X-axis between the antenna input 4-122 and the antenna elements 4-106. The power dividers 4-118 divide the antenna input into signals of equally reduced power that are thereafter provided to downstream antenna elements 4-106.

Each antenna element 4-106 comprises a conductive antenna element portion 4-106A having a conductive surface with a slot (or aperture) 4-106B therein. This aperture 4-106B couples the antenna element 4-106 to the microstrip feed formed by the conductor 4-116. The microstrip feed is electrically coupled to the bottom surface ground plane 4-107 with the dielectric material of the composite dielectric 4-103 therebetween. Each antenna element 4-106 also has an associated dielectric lens such as first dielectric lens 4-124 associated with antenna element 4-106 or second dielectric lens 4-124' associated with second antenna element 4-106'. The dielectric lenses 4-124 and 4-124' are hereinafter alternatively referred to simply as dielectric lens 4-124.

In the illustrated embodiment, this exemplary antenna 4-100 has a 4×4 array of aperture coupled antenna elements 4-106 formed by conductive antenna element portions 4-106A with inclusive slots 4-106B, a microstrip feed network formed by conductor 4-116 with power dividers 4-118, and a lower ground plane 4-107. There are four dielectric layers separating the three conductive layers. The dimensions of the antenna elements (i.e., diameter, slot length, slot width) and dielectric lens (i.e., diameter, height) are determined to maximize radiated power at the desired operating frequency.

In the exemplary illustrated embodiment, each of the dielectric lenses 4-124 comprises a right circular cone of dielectric material with the base of the cone adjacent the associated antenna element. Also, in the illustrated embodiment, at least one of the dielectric lenses has a shape different than the dielectric lenses associated in another subset of antenna elements 4-106. In the illustrated embodiment, the 4×4 array of antenna elements includes elements arranged in multiple rows or columns. As illustrated, the dielectric lenses 4-124 associated with the antenna elements in rows 4-126B and 4-126C of antenna elements differ from the dielectric lenses 4-124' associated with the antenna elements in rows 4-126A and 4-126D. Hence, if the rows 4-126B and 4-126C of antenna elements 4-106 represent a first subset of the antenna elements 4-106 of the antenna 4-100 and rows 4-126A and 4-126D of antenna elements 4-106 represent a second subset of antenna elements, dielectric lens 4-124 disposed over the antenna elements of the first subset of antenna elements 4-106 is of a shape different than dielectric lens 4-124' disposed over the antenna element 4-106' of another subset of the plurality of antenna elements, with each dielectric lens 4-124 being disposed over only one antenna element 4-106. In the illustrated embodiment, the dielectric lenses 4-124 are all right circular cones, and the dielectric lenses 4-124 associated with the first subset of antenna elements (rows 4-126B and 4-126C) have a first height greater than a second height of the dielectric lenses 4-124' associated with the second subset of antenna elements 4-106 (rows 4-126A and 4-126D).

Other lens shapes (e.g., cylinder, hemisphere, hemi-elliptical, etc.) can also be utilized for the dielectric lens 4-124. The dielectric lenses 4-124 may also comprise shapes that are asymmetric in the X and Y axes so that the performance characteristics of the antenna 4-100 differ in the X-Z and Y-Z planes. Although the outer surface of the illustrated dielectric lenses 4-124 are concave, other embodiments in which the outer surface of the dielectric lenses are convex may be employed.

Likewise, the dielectric lenses 4-124 may be of the same shape, but the dielectric lenses 4-124 associated with different subsets of antenna elements 4-106 may be comprised of dielectric materials with different electrical properties. Also, the dielectric lenses 4-124 associated with different subsets of antenna elements 4-106 may be of both different shape and made from dielectric materials having different properties. Finally, in selected embodiments, the dielectric lenses 4-124 are arranged in patterns that differ in both X and Y directions. For example, the dielectric lenses 4-124 disposed over antenna elements 4-106 closest the center of the array may be of a different shape than those dielectric lenses 4-124 disposed over antenna elements disposed a distance away from the center of the array. In one embodiment, the dielectric lenses 4-124 are characterized by a low dielectric loss tangent and a relative permittivity range of two to four.

FIGS. 4-2A and 4-2B are diagrams depicting plots (generated with a finite element model (FEM) solver) of the predicted performance of a 4×4 conformal antenna with dielectric lens designed to operate near 10 GHz. The surface dimensions of the 4×4 array are 80 mm×55 mm and the board has four 10 Mil PYRALUX layers.

FIG. 4-2A is a diagram illustrating the predicted antenna gain (dBi) as a function of frequency (GHz) for a standard 4×4 array without the dielectric lenses and for a 4×4 array of identical design, but including the dielectric lenses (such as is illustrated in FIGS. 4-1A and 4-1B). The gain of the two arrays is very similar with the dielectric lens decreasing the gain less than 0.5 dB across 9.7 to 10.3 GHz.

FIG. 4-2B is a diagram showing the predicted axial ratio (dB) of the standard 4×4 array without the dielectric lenses and for the 4×4 array with the dielectric lenses. The results show that the 4×4 array with the dielectric lenses 4-124 provides a 2:1 axial ratio bandwidth of greater than 230 MHz or a 43% improvement.

FIG. 4-3 is a diagram illustrating exemplary operations that can be used to produce the conformal antenna 4-100 having the dielectric lens 4-124. FIG. 4-3 will be discussed in conjunction with FIGS. 4-4, 4-5A-4-5C, 4-6, and 4-7A-4-7C, which are diagrams depicting the antenna 4-100 at different stages of a representative production process. FIG. 4-4 is a diagram illustrating the cut A-A' of the antenna 4-100 depicted in FIGS. 4-5A-4-5C, while FIG. 4-6 is a diagram illustrating the cut B-B' of the antenna 4-100 depicted in FIGS. 4-7A-4-7C.

Turning now to FIG. 4-3, in block 4-302, one or more conductive antenna element portions 4-106A having slots 4-106B are disposed on a top surface of a first dielectric layer 4-502 (also labeled D1). In block 4-304, a conductor 4-116 is disposed on a top surface of a third dielectric layer 4-506 (also labeled D3) or a bottom surface of a second dielectric layer 4-504 (also labeled D2). In the illustrated embodiment, the conductor 4-116 is disposed on the top surface of the third dielectric layer 4-506 (D3). In block 4-306, a bottom surface conductive ground plane 4-522 is disposed on a bottom surface of a fourth dielectric layer 4-508 (also labeled D4).

In block 4-308, the first dielectric layer 4-502, the second dielectric layer 4-504, the third dielectric layer 4-506, and the fourth dielectric layer 4-508 are aligned so that the conductor 4-116 is disposed between each of the antenna elements 4-106 and the bottom surface conductive ground plane 4-522 and extends from an antenna input 4-122 and forms a microstrip with the bottom surface conductive ground plane 4-522 and thereafter laminated to form the composite dielectric 4-103. Accordingly, upon lamination, the conductor 4-116 is disposed between each of the antenna elements 4-106 and the bottom surface conductive ground plane 4-522 and extends from an antenna input 4-122 and forms a microstrip with the bottom surface conductive ground plane 4-522.

In block 4-310, at least one dielectric lens 4-124 is disposed over only one antenna element 4-106 of the plurality of antenna elements 4-106 in the array. In one embodiment the at least one dielectric lens 4-124 is formed over the associated antenna element 4-106 by 3D printing over each antenna element 4-106 using a dielectric material (e.g., acrylonitrile butadiene styrene (ABS), polylactic acid (PLA), thermoplastic polyurethane (TPU), etc.). This can be accomplished by printing the dielectric lens 4-124 directly on the surface of the first dielectric layer 4-502 or can be accomplished by printing (or otherwise manufacturing) the dielectric lens 4-124 in a separate operation, then adhering the dielectric lens 4-124 at the desired location over the associated antenna element 4-106 of the antenna 4-100. In the exemplary illustrated embodiment in FIGS. 4-1A and 4-1B the surface of the dielectric lens 4-124 covers the entire surface of the conductive antenna element portion 4-106A. Further, in the illustrated embodiment, the dielectric lens 4-124 extends a small distance beyond the outer periphery of the antenna element itself, thus assuring that energy entering or leaving the conductive antenna element portion 4-106A passes through some portion of the dielectric lens 4-124.

The foregoing steps illustrate the creation of one antenna element 4-106 with one dielectric lens 4-124 on the RF circuit board 4-101. Typically, the antenna 4-100 comprises an array of elements with dielectric lenses such as the 4×4 array of elements illustrated in FIG. 4-1A. In such cases, the operations disclosed above include analogous operations as applied to any other desired antenna elements 4-106 in the array. For example, FIGS. 4-7A-4-7B illustrate the 4-100 at different stages of production along the cut B-B' depicted in FIG. 4-6. Note that a second conductive antenna element portion 4-106A' having second inclusive slot 4-106B' is disposed on the top side of the first dielectric layer 4-502. FIGS. 4-7A-4-7B also illustrate disposing the conductor 4-116 such that it extends through composite dielectric 4-103.

Furthermore, in any combination or all of the foregoing operations, the disposition of conductive material on the dielectric may be accomplished by additive methods such as printing, or film deposition of suitable conductive materials (e.g., silver, copper, etc.) to the appropriate surface of the dielectric. Deposition of conductive material may also be accomplished by combined additive and subtractive methods such as laser etching, milling, or wet etching. Hence, the conductive materials may be deposited on the entire surface of the dielectric layer(s) and unwanted portions etched away. For example, the top of the first dielectric layer 4-502 may be formed by disposing a conductive material along the entire top surface, then etching or otherwise removing the conductive material from the slot 4-106B and the area surrounding the conductive antenna element portion 4-106A.

The lamination of the first dielectric layer 4-502, the second dielectric layer 4-504, the third dielectric layer 4-506, and the fourth dielectric layer 4-508 can be accomplished by disposing a first adhesive film 4-524 between the first dielectric layer 4-502 and the second dielectric layer 4-504, disposing a second adhesive film 4-526 between the second dielectric layer 4-504 and the third dielectric layer 4-506, and disposing a third adhesive film 4-528 between the third dielectric layer 4-506 and the fourth dielectric layer 4-508. Portions of the adhesive films 4-524, 4-526, and 4-528 that must be removed to achieve the structure shown in FIGS. 4-5A-4-5C may be removed before lamination or processed after lamination (e.g., using an etching technique). Further, dielectric layers 4-502, 4-504, 4-506 and 4-508 may be created in any order, but unless otherwise noted, should be layered as illustrated before lamination. Nominally, dielectric layers 4-502, 4-504, 4-506 and 4-508 are composed of a dielectric material having a relative permittivity (ratio of absolute permittivity to the permittivity of a vacuum) of approximately two to four.

Signal Transception

The foregoing antenna 4-100 can be used to transmit and/or receive (transceive) signals. In transmission, signals provided to the feed created by conductor 4-116 are transformed into a transmitted RF signal by antenna elements 4-106 and associated structures. In reception, RF signals are provided to the antenna elements 4-106 and associated structures and transformed into a received signal at the conductor 4-116. For example, referring again to FIG. 4-1A, when used for transmission, the antenna 4-100 receives a signal at power input, and this signal is provided by the conductor 4-116 to the aperture coupled antenna elements 4-106 for transmission as an RF signal.

Electrically Small Antenna

Overview

In this disclosure, a bandwidth-enhanced low profile antenna is presented. Bandwidth is enhanced by using an aperture coupled antenna element with an inclusive slot, microstrip feed network, and lower ground plane. The antenna element and lower ground plane enclose a magnetic medium. The inclusive slot decreases the axial ratio and increases the circular polarization bandwidth, which is desirable for lower power loss due to misalignment between transmitter and receiver antennas. The lower ground plane minimizes any change in the antenna's electrical behavior due to the presence of conductive surfaces; better known as "surface agnostic" behavior.

The antenna comprises a number of features which can be characterized by a number of embodiments. Such features may also be combined in selected embodiments as disclosed further herein. One feature is that the antenna has an embedded RF microstrip network electrically coupled to a lower ground plane for efficient signal propagation and simplification of planar arraying. Another feature is that the antenna has a lower ground plane to minimize any change in the antenna's electrical behavior due to conductive surfaces. Still another feature is that the antenna uses aperture coupled antenna elements for simplistic feeding, planar arraying, reduction of antenna failure due to flexure, and simplified fabrication. A further feature is that the antenna utilizes a low-loss magnetic medium that results in an electrically small antenna (i.e., antenna wavelength in magnetic medium much shorter than equivalent wavelength in free-space) with high impedance bandwidth. A still further feature is that the antenna can utilize thin RF dielectrics for low profile applications due to the use of an aperture coupled feed. Still another feature is that the antenna is circularly polarized with increased bandwidth by using aperture coupled antenna elements with inclusive slots to lower power loss due to misalignment between transmitter and receiver antennas.

FIGS. 5-1A and 5-1B are diagrams illustrating embodiments of an electrically small low profile antenna 5-100. Turning first to FIG. 5-1A, the antenna 5-100 has a magnetic material 5-103 having a top surface 5-104 and a bottom surface 5-108. The bottom surface 5-108 comprises a conductive ground plane 5-107. A microstrip feed is formed by a conductor 5-116 disposed within the magnetic material 5-103 between the top surface 5-104 and the bottom surface 5-108. The top surface 5-104 has at least one an aperture coupled antenna element 5-106 that comprises a conductive antenna element portion 5-106A having a conductive surface with a slot (or aperture) 5-106B therein. This aperture 5-106B electrically couples the antenna element 5-106 to the microstrip feed, and the microstrip feed is electrically coupled to the ground plane 5-107 on the bottom surface 5-108 of the antenna 5-100.

FIG. 5-1B is a diagram illustrating the use of multiple layers in the construction of one embodiment of the antenna 5-100. As illustrated, the antenna 5-100 is implemented using layers of magnetic material 5-103 including first layer 5-103A and second layer 5-103B. Antenna element 5-106 with the inclusive slot 5-106B is disposed in metal layer 5-130 (metal layer 1), while the conductor forming the microstrip feed line is disposed in metal layer 5-132 (metal layer 2), and the bottom surface ground plane 5-107 is disposed in metal layer 5-134 (metal layer 3). Hence, two magnetic layers 5-103A and 5-103B separate three metal layers 5-130, 5-132, and 5-134. The dimensions of the antenna element 5-106 with inclusive slot 5-106B (i.e., diameter of the antenna element portion 5-106A, the length of the slot 5-106B, and the width of the slot 5-106B) are determined to maximize radiated power at the desired operating frequency of the antenna 5-100.

FIG. 5-1C is a diagram illustrating a perspective view of an embodiment of the antenna 5-100 comprising a 2×2 array of antenna elements 5-106. In this embodiment, the antenna 5-100 has an RF circuit board 5-101 formed of magnetic material 5-103. The array of antenna elements 5-106 is disposed on a top planar surface 5-104. The RF circuit board 5-101 also comprises a bottom planar surface 5-108 having a bottom surface ground plane 5-107. The conductor 5-116 extends through circuit board 5-101 and forms a microstrip with the bottom surface ground plane 5-107. The conductor 5-116 also includes one or more power dividers 5-118 disposed along the X-axis between the antenna input 5-122 and the antenna elements 5-106. The power dividers 5-118 divide the antenna input into signals of equally reduced power that are thereafter provided to downstream antenna elements 5-106.

A finite element model analysis of this 2×2 array designed to operate near 350 MHz with an antenna element 5-106 diameter of 80 mm and two layers of 250 mil thick MAGTREX 555 provides an antenna gain of −3.5 dBi and an electrical impedance bandwidth of 120 MHz (or 34%), and weighs only about 7.1 lbs. For comparison, a DPV-95 dipole antenna operating 225 to 400 MHz has a length of 177 in., 0 dBi gain, and antenna weight of ~37.5 lbs. Although the foregoing illustrates a 2×2 array, the array may be non-square and may have a greater or lesser number of antenna elements 5-106.

FIGS. 5-2A and 5-2B are diagrams depicting plots (generated with a finite element model (FEM) solver) of the predicted performance of an electrically small antenna 5-100 such as is illustrated in FIGS. 5-1A and 5-1B designed to operate near 500 MHz, with an antenna element 5-106 diameter of 56 mm, and the magnetic material 5-103 is composed of two layers of a high impedance laminate known as MAGTREX 555 having an equivalent permittivity of about 37-38, each having a thickness of 250 mil (e.g. 0.250 inches). With these design parameters, a typical antenna 5-100 will weigh approximately 0.8 lbs. For comparison, a DPV-54 dipole antenna available from the ANTENNA PRODUCTS CORPORATION operating between 400 to 500 MHz has a length of 24 in., antenna gain of 0 dBi, and weighs 4 lbs. Furthermore, unlike the DVP-54, which is largely tubular in shape, electrically small antenna 5-100 is low-profile (resulting in low air drag and low visibility) and is also surface agnostic.

Similarly, a 2×2 array such as that illustrated in FIG. 5-1C designed to operate near 350 MHz, with an antenna element 5-106 diameter of 80 mm, and the magnetic material 5-103 composed of two 250 mil thick layers of MAGTREX 555 has a weight of 7.1 lbs. For comparison, a DPV-95 dipole antenna operating between 225 to 400 MHz has a length of 177 in., antenna gain of 0 dBi, and weighs 37.5 lbs.

FIG. 5-2A is a plot of antenna gain (dBi) versus angle (degrees) in the X-Z plane. As shown in FIG. 5-2A, the results predict a peak antenna gain of about −4 dBi. FIG. 5-2B is a plot of return loss (dB) as a function of frequency (GHz). The results demonstrate an electrical impedance bandwidth (determined by the 31 10 dB loss points) of more than 15%, which is significantly higher than that of which can be achieved with existing planar antennas based on existing dielectric materials.

FIG. 5-2C is a diagram illustrating the current density (A/m) for the electrically small antenna shown in FIGS. 5-1A and 5-1B with the above physical characteristics operating at 500 MHz. The antenna element with inclusive slot electrically couples to the microstrip line, and the circular rotation of the current is indicative that the inclusive slot of the patch is forcing the current to rotate, resulting in circular polarization.

FIG. 5-3 is a diagram illustrating exemplary operations that can be used to produce the low profile antenna 5-100. FIG. 5-3 will be discussed in conjunction with FIGS. 5-4, 5-5A-5-5C, 5-6, and 5-7A-5-7C, which are diagrams depicting the antenna 5-100 at different stages of a representative production process. FIG. 5-4 is a diagram illustrating the cut A-A' of the antenna 5-100 depicted in FIGS. 5-5A-5-5C, while FIG. 5-6 is a diagram illustrating the cut B-B' of the antenna 5-100 depicted in FIGS. 5-7A-5-7C.

Turning now to FIG. 5-3, in block 5-302, at least one conductive antenna element 5-106 is disposed on a top surface of a first magnetic layer 5-103A. This is illustrated in FIGS. 5-5A and 5-7A.

In block 5-304, a conductor 5-116 is disposed on a top surface of a second magnetic layer 5-103B, or alternatively, on a bottom surface of the first magnetic layer 5-103A. This is illustrated in FIGS. 5-5B and 5-7B.

In block 5-306, the first magnetic layer 5-103A and the second magnetic layer 5-103B are laminated. Upon lamination, the conductor 5-116 extends from an antenna input to a location under the conductive antenna element 5-106 and at least a portion of the conductor 5-116 forms a microstrip with the second magnetic layer 5-103B and the bottom surface conductive ground plane 5-107. This is shown in FIGS. 5-5C and 5-7C.

The foregoing steps illustrate the creation of one antenna element 5-106 on the RF circuit board 5-101. In other embodiments, the antenna 5-100 comprises an array of antenna elements 5-106 such as the 2×2 array of antenna elements illustrated in FIG. 5-1C. In such cases, the operations disclosed above include analogous operations as applied to any other desired antenna elements 5-106 in the array.

Furthermore, in any combination or all of the foregoing operations, the disposition of conductive material on the magnetic layers 5-103A and 5-103B may be accomplished by additive methods such as printing or film deposition of suitable conductive materials (e.g., silver, copper, etc.) to the appropriate surface of the dielectric. Deposition of conductive material may also be accomplished by combined additive and subtractive methods such as laser etching, milling, or wet etching. Hence, the conductive materials may be deposited on the entire surface of the magnetic layer(s) and unwanted portions etched away. For example, the top of the first magnetic layer 5-103A may be formed by disposing a conductive material along the entire top surface, then etching or otherwise removing the conductive material from the slot 5-106B and the area surrounding the conductive antenna element portion 5-106A.

The lamination of the first magnetic layer 5-103A and the second magnetic layer 5-103B, can be accomplished by disposing an adhesive film 5-524 between the first magnetic layer 5-103A and the second magnetic layer 5-103B. Should portions of the adhesive film 5-524 be removed to achieve the structure shown in FIGS. 5-5A-5-5C, such portions may be removed before lamination or processed after lamination (e.g., using an etching technique). Further, magnetic layers 5-103A and 5-103B may be created in any order, but unless otherwise noted, should be layered as illustrated before lamination. Nominally, magnetic layers 5-103A and 5-103B are composed of a magnetic material but may also include dielectric material portions.

Signal Transception

The foregoing antenna 5-100 can be used to transmit and/or receive (transceive) signals. In transmission, signals provided to the feed created by conductor 5-116 are transformed into a transmitted RF signal by antenna elements 5-106 and associated structures. In reception, RF signals are provided to the antenna elements 5-106 and associated structures and transformed into a received signal at the conductor 5-116. For example, referring again to FIG. 5-1A, when used for transmission, the antenna 5-100 receives a signal at power input, and this signal is provided by the conductor 5-116 to the aperture coupled antenna elements 5-106 for transmission as an RF signal.

Planar Antenna With Integrated Low Noise Receiver

Overview

In this disclosure, a planar antenna with an integrated receiver based on aperture coupled antenna elements with inclusive slots electrically coupled to a microstrip feed network residing above a lower ground plane is presented. The use of aperture coupled feed elements eliminate the need for vias, which simplifies fabrication. The planar antenna also has a lower ground plane that minimizes any change in the antenna's electrical behavior due to the presence of conductive surfaces (e.g., airplane wing, fuselage, etc.); better known as "surface agnostic" behavior.

The antenna comprises a number of features which can be characterized by a number of embodiments. Such features may also be combined in selected embodiments as disclosed further herein. One feature is that it has an embedded RF microstrip feed network electrically coupled to a lower ground plane for efficient signal propagation and simplification of planar arraying. Another feature is that it has a lower ground plane to minimize any change in the antenna's electrical behavior due to conductive surfaces in the operative environment. Still another feature is that it uses aperture coupled antenna elements for simplistic feeding, planar arraying, reduction of antenna failure due to flexure, and simplifies fabrication. Yet another feature is that it has integrated electronics located on the same layer as the microstrip feed network to minimize any noise or unwanted parasitic effects. The antenna also has cross polarization with increased bandwidth due to using aperture coupled antenna elements with inclusive slots; resulting in reduced signal loss from transmitter to receiver due to antenna misalignment. Finally, the antenna also can use thin RF dielectrics for conformal applications due to the use of aperture coupled antenna elements.

FIGS. 6-1A-6-1C are diagrams illustrating one embodiment of the conformal (i.e., conforming to the surface to which it is applied) antenna 6-100 having an integrated electronic device (hereinafter alternatively referred to simply as antenna 6-100). In the illustrated examples, the antenna 6-100 has a 4×4 array of antenna elements 6-106 with one or more integrated electronic devices implementing a low noise receiver. The 4×4 array has aperture coupled conductive antenna element portions 6-106A with inclusive slots 6-106B on a first conductive layer, a microstrip feed network on a second conductive layer, and a lower ground plane on a third conductive layer. An integrated low noise receiver at least partially formed by electronic devices 6-122A-6-122D electrically connected to the 4×4 antenna array through the microstrip feed network on the second conductive layer. In the illustrated embodiments (i.e. FIGS. 6-8A-8-8G), there are four dielectric layers (D1-D4) separating the three conductive layers. The dimensions of the antenna elements (i.e., diameter, slot length, slot width) are determined to maximize radiated power at the desired operating frequency.

FIG. 6-1A presents a perspective view of the integrated antenna 6-100, while FIG. 6-1B is a diagram presenting a close up view of the integrated electronic devices. FIG. 6-1C is a diagram presenting further details regarding the mounting of integrated electronic devices on the integrated antenna 6-100.

The antenna 6-100 includes an RF circuit board 6-101 comprised of a composite dielectric 6-103. The RF circuit board 6-101 includes a circuit board first portion 6-101A having a circuit having one or more electronics devices for processing signals received by the antenna 6-100 and a circuit board section portion 6-101B. In the illustrated embodiment, the one or more electronic devices together comprise an integrated receiver that processes the received signal and provides the processed signal for output.

The RF circuit board 6-101 also comprises a top planar surface 6-104 that has a first top surface planar portion 6-104A and a second top surface planar portion 6-104B. The first top surface planar portion 6-104A comprises a first section 6-104A1 having a first top surface conductive ground plane 6-109A1 and a second section 6-104A2 having a second top surface conductive ground plane 6-109A2. The second top surface planar portion 6-104B has at least one antenna element 6-106.

In the illustrated embodiment, this exemplary antenna 6-100 has a 4×4 array of aperture coupled antenna elements 6-106 formed by conductive antenna element portion 6-106A with inclusive slots (or apertures) 6-106B therein, a microstrip feed network formed by conductor 6-116 with power dividers 6-118, and a bottom surface conductive ground plane 6-107. This aperture 6-106B couples the antenna element 6-106 to the microstrip feed formed by the conductor 6-116. The microstrip feed is electrically coupled to the bottom surface conductive ground plane 6-107 with the dielectric material of the composite dielectric 6-103 therebetween. There are four dielectric layers separating the three conductive layers.

The RF circuit board 6-101 also comprises a bottom planar surface 6-108 which has a first bottom surface planar portion 6-108A and a second bottom surface planar portion 6-108B. The RF circuit board 6-101 also comprises a bottom surface conductive ground plane 6-107 having first bottom surface conductive ground plane portion 6-107A and a second bottom surface conductive ground plane portion 6-107B that extend along the first bottom surface planar portion 6-108A and the second bottom surface planar portion 6-108B, with the first bottom surface conductive ground plane portion 6-107A disposed on the first bottom surface planar portion 6-108A and the second bottom surface conductive ground plane portion 6-107B disposed on the second bottom surface planar portion 6-108B.

A conductor 6-116 extends through the composite dielectric 6-103 between the second top surface planar portion 6-104B and the second bottom surface conductive ground plane portion 6-107B and across at least a portion of the first top surface planar portion 6-104A between and in the same plane as the first top surface conductive ground plane 6-109A1 and the second top surface conductive ground plane 6-109A2. The conductor 6-116 forms at least one grounded coplanar waveguide with the first top surface conductive ground plane 6-109A1, the second top surface conductive ground plane 6-109A2, and the first bottom surface conductive ground plane portion 6-107A. This is accomplished by use of a plurality of vias 6-120 electrically shorting the first top surface conductive ground plane 6-109A1 to the first bottom surface conductive ground plane portion 6-107A and electrically shorting the second top surface conductive ground plane 6-109A2 to the first bottom surface conductive ground plane portion 6-107A. The conductor 6-116 also forms a microstrip extending from at least one of the planar antenna elements 6-106 to the grounded coplanar waveguide with the second bottom surface conductive ground plane portion 6-107B of the second bottom surface planar portion 6-108B. In the illustrated embodiment, the vias 6-120 are disposed as close to the inner edge of the first top surface conductive ground plane 6-109A1 and the inner edge of the second top surface conductive ground plane 6-109A2.

In the illustrated embodiment, the conductor 6-116 includes one or more power dividers 6-118 disposed along the X-axis in the circuit board second portion 6-101B. The power dividers 6-118 divide the signal input into signals of equally reduced power that are thereafter provided to downstream electronic devices 6-122A-6-122D (hereinafter alternatively referred to as electronic device(s) 6-122). The electronic devices 6-122 are disposed on the first top surface planar portion 6-104A and have an electronic device input (e.g. input 6-164 shown in FIG. 6-2A) that is electrically connected to the conductor 6-116 by connector 6-154 shown in FIG. 6-1C and an electronic device output (e.g. output 6-166 shown in FIG. 6-2B) that is electrically connected to connector 6-156 as shown in FIG. 6-1C.

As shown in the details presented in FIG. 6-1B and FIG. 6-1C, at least part of the first section 6-104A1 of the first top surface planar portion 6-104A and the second section 6-104A2 of the first top surface planar portion 6-104A comprises a power plane 6-128 that is electrically connected to a power input 6-162 (shown in FIG. 6-2B) of the electronic device 6-122A via conductor 6-152. In the illustrated embodiment, the power plane 6-128 is disposed on the first top surface planar portion 6-104A.

The circuit board 6-101 may also comprise a passive circuit device 6-126 (e.g., a capacitor) that is electrically connected to the power plane 6-128. In the illustrated embodiment, the passive circuit device 6-126 is electrically connected to the power plane by connector 6-142 and to the first top surface conductive ground plane 6-109A1 by connector 6-146. Passive circuit devices 6-126 may also be electrically connected to other conductive surfaces which are at a different potential.

As described above, the illustrated embodiment of the antenna 6-100 includes a plurality of electronic devices (e.g. electronic devices 6-122A-6-122D). In this multi-electronic device embodiment, the antenna 6-100 further comprises a second conductor 6-124, extending across another portion of the first top surface planar portion 6-104A between and in the same plane as the first top surface conductive ground plane 6-109A1 and the second top surface conductive ground plane 6-109A2. This second conductor 6-124 forms a further grounded coplanar waveguide with the first top surface conductive ground plane 6-109A1, the second top surface conductive ground plane 6-109A2, and the first bottom surface conductive ground plane 6-107A by use of the nearby vias 6-120. The second electronic device 6-122B is also disposed on the first top surface planar portion, and includes a second electronic device input electrically connected to the first electronic device output via the further grounded coplanar waveguide formed by second conductor 6-124. In the embodiments illustrated in FIGS. 6-1A-6-1C, each of the electronic devices 6-122A-6-122D and their associated passive devices implement an electric circuit stage, and together, those devices process the signal provided at the conductor 6-116 to produce the signal output 6-180.

The placement of the vias 6-120 as close as possible to the interface between the conductor 6-116 and second conductor and the facing edges of the first top surface conductive ground plane 6-109A1 and the second top surface conductive ground plane 6-109A2 allows the grounded coplanar waveguide and the further grounded coplanar waveguide to have desired electrical properties. In locations where the physical layout of the electronic devices 6-122 prevents such location of the vias 6-120, the nearby vias 6-120 are disposed around a periphery of the electronic devices 6-122, and hence, as close as is practicable to the interface.

Further electrical connecting between the electronic devices 6-122 and the first top surface planar portion 6-104A can be implemented by including a pad of conductors 6-148 on the first top surface planar portion 6-104A. These conductors 6-148 interface with matching conductors 6-149 on the underside of the electronic device 6-122, thus providing other input, output, or power connection possibilities.

FIGS. 6-2A and 6-2B are diagrams depicting an exemplary embodiment of the electronic device 6-122. In this quad flat no-leads package (QFN) embodiment, the electronic device 6-122 comprises a plurality of connecting pins including an input pin 6-164, an output pin 6-166, and a power pin 6-162. Electronic devices 6-122A-6-122D may each perform different functions on the received signal. In one embodiment, electronic devices 6-122A-6-122C are low noise amplifiers, and electronic device 6-122D is a power detector.

Figures 1, 2, 3, 3B:
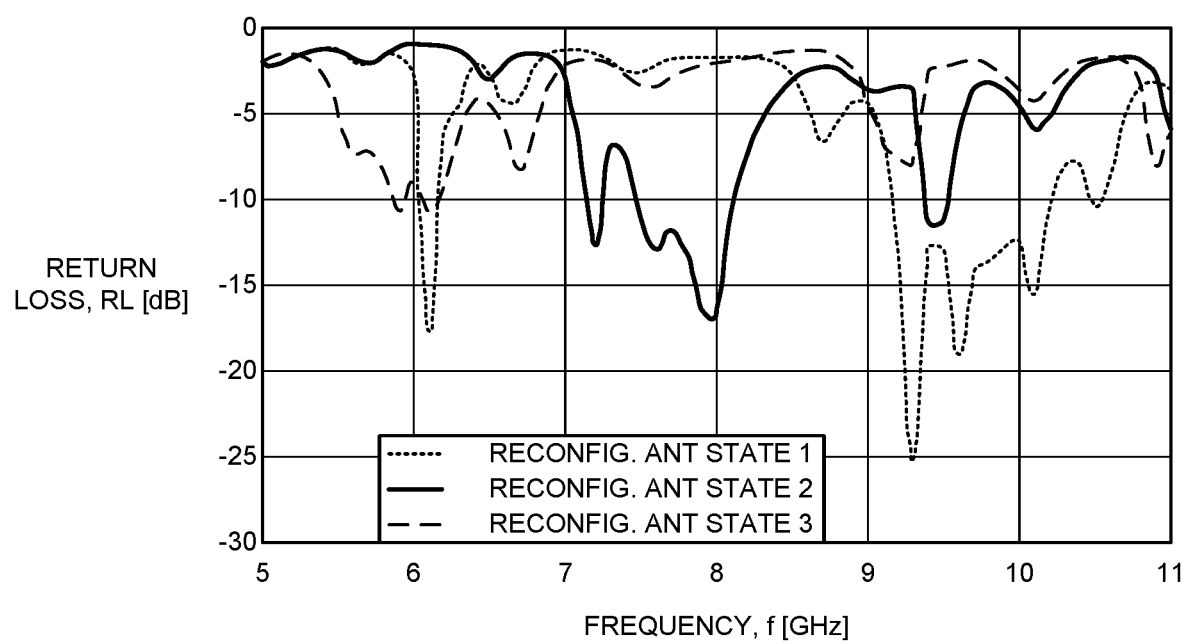
Figures 1, 2, 3, 4:
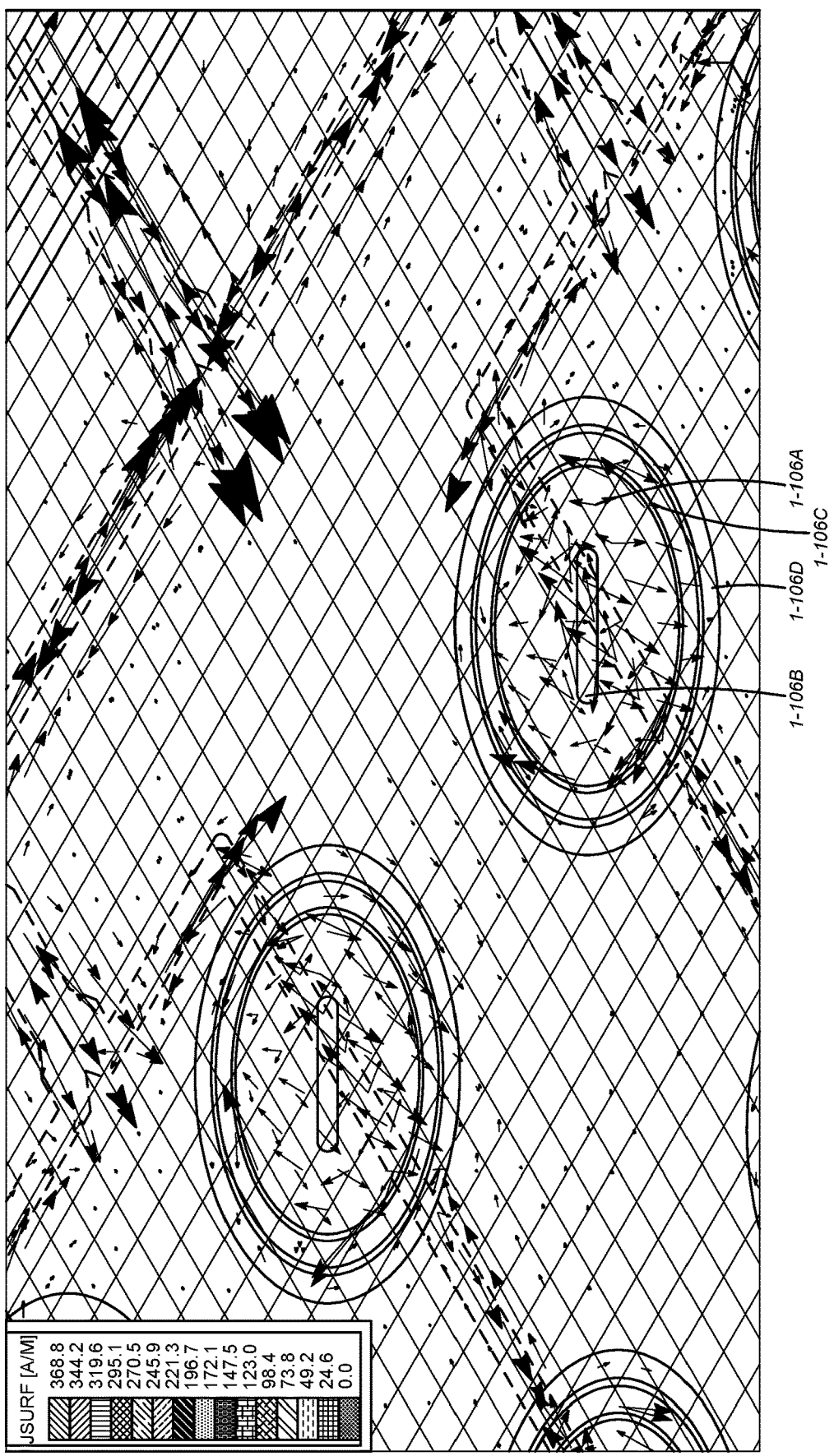
Figures 1, 2, 3, 4, 5, 5A:
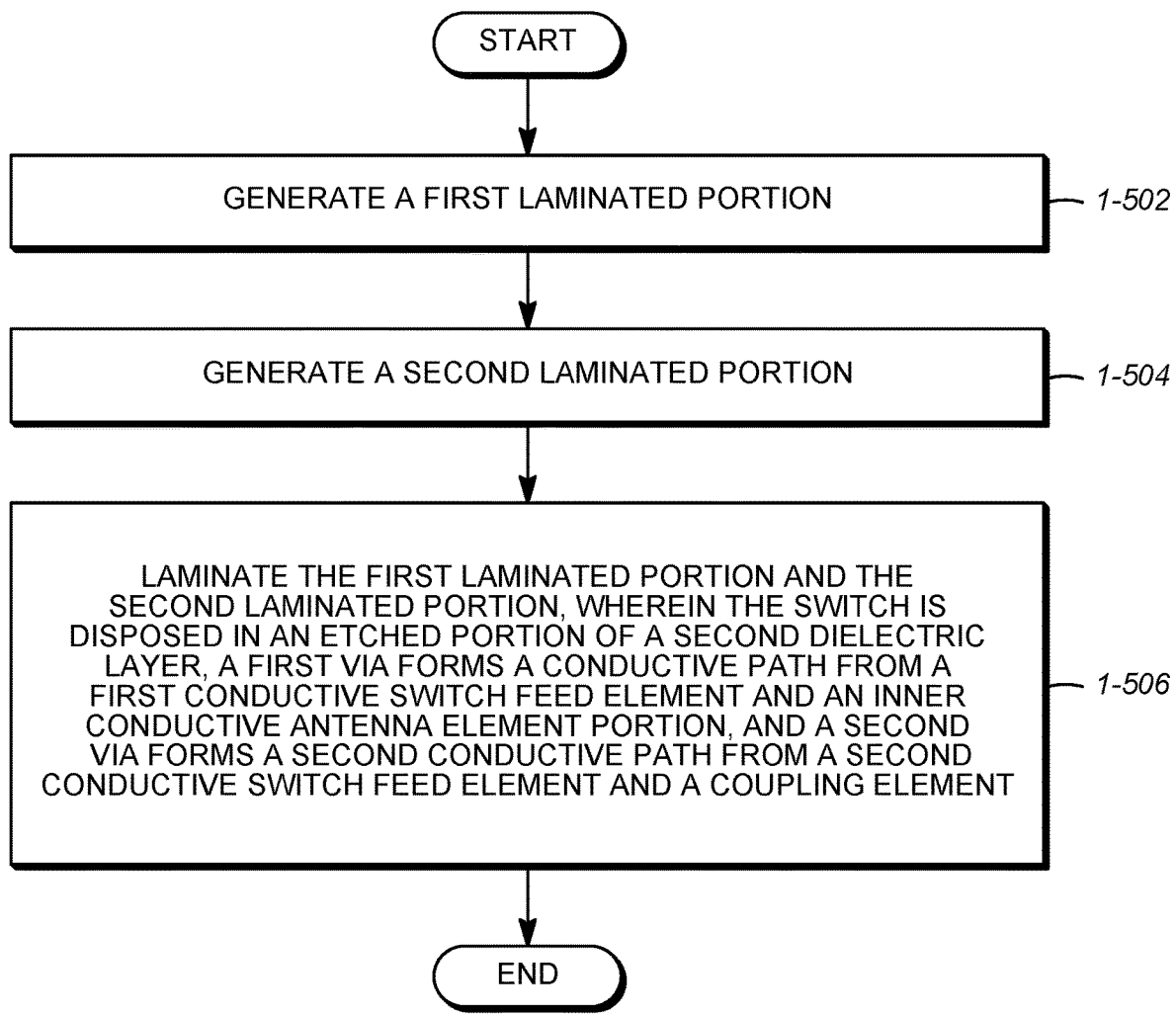
Figures 1, 2, 3, 4, 5, 5B:
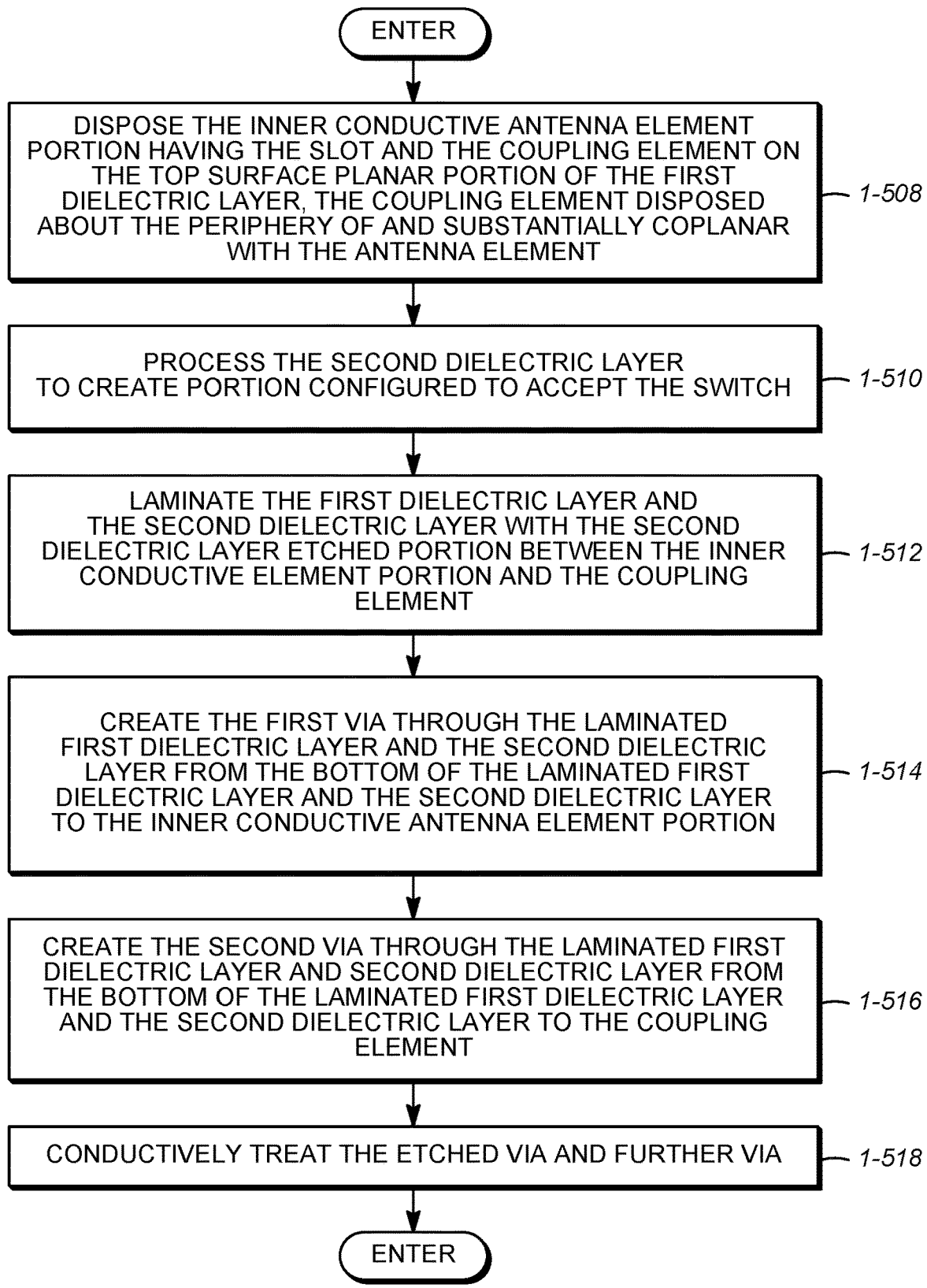
Figures 1, 2, 3, 4, 5, 5C:
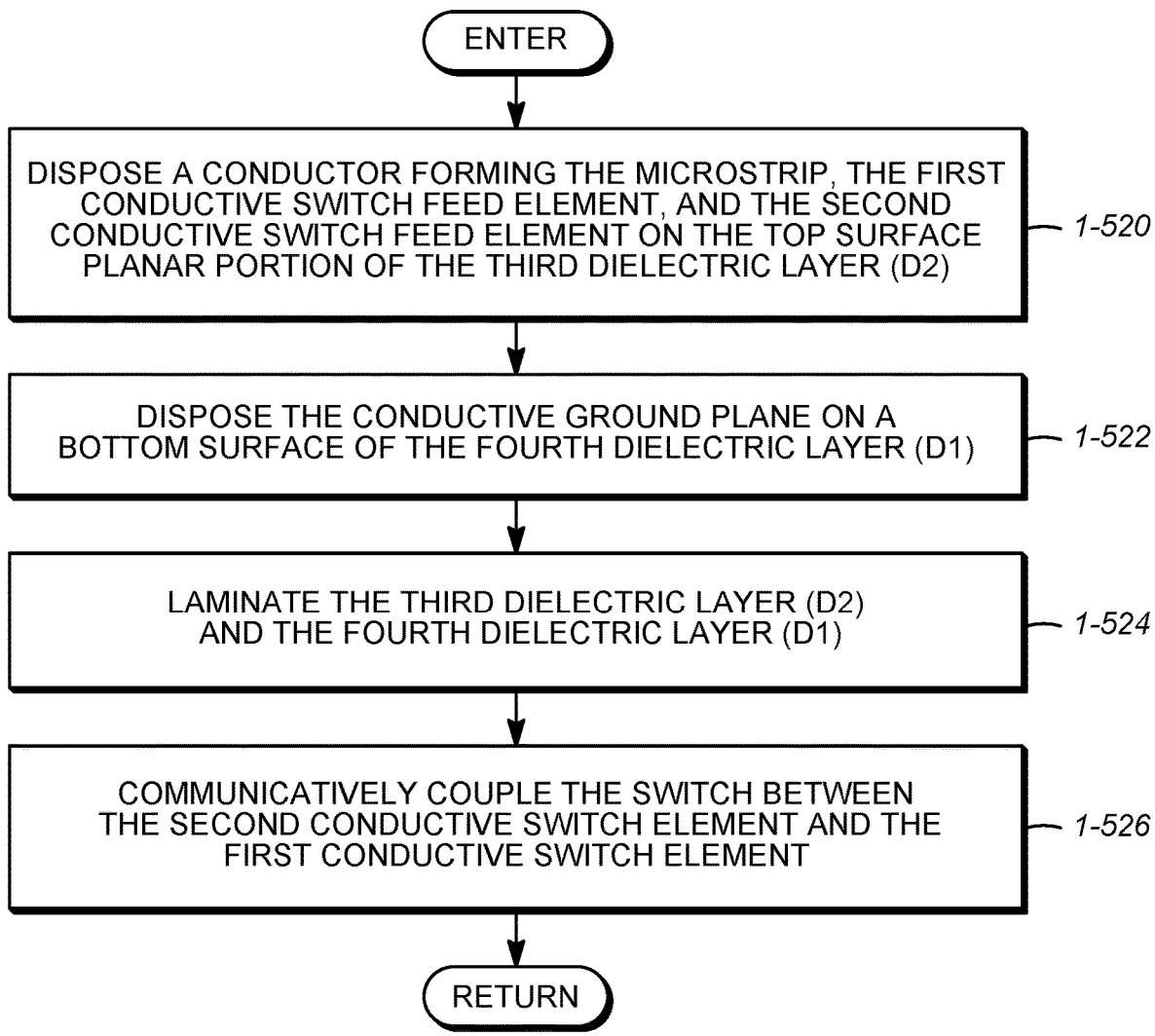
Figures 1, 2, 3, 4, 5, 6:
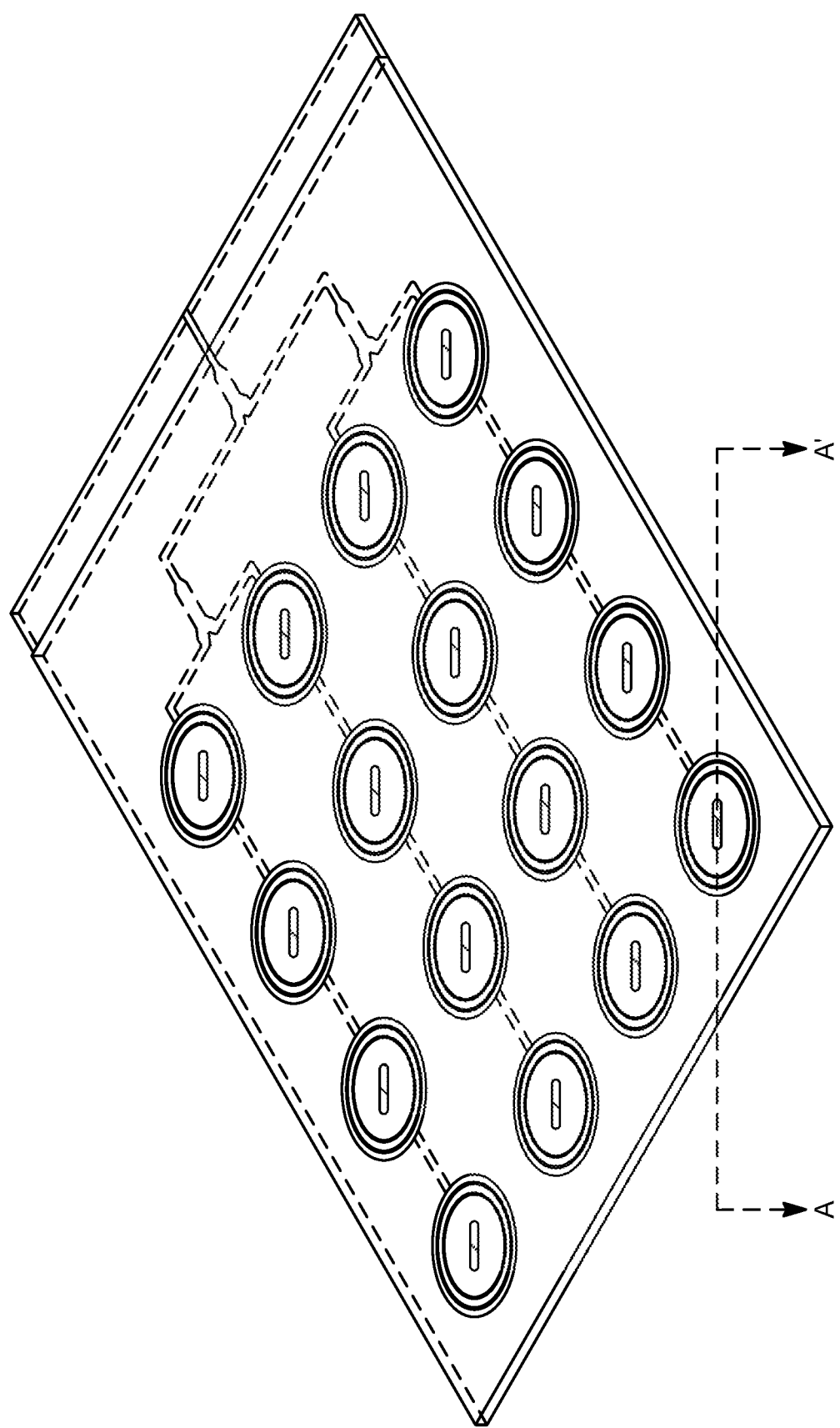

FIGS. 6-3A and 6-3B are diagrams depicting plots (generated with a finite element model (FEM) solver) of the predicted performance of an exemplary 4×4 conformal antenna array designed to operate near 10 GHz. This exemplary antenna 6-100 comprised RF circuit board 6-101 surface dimensions of the 80 mm×50 mm for the RF circuit board first portion 6-101A (without the integrated receiver) and 104 mm×55 mm for the entire RF circuit board 6-101. The RF circuit board 6-101 is further comprised of four 10 Mil PYRALUX layers. The results presented in FIG. 6-3A show a predicted gain of ~15.5 dBi and the results presented in FIG. 6-3B illustrate a 3:1 axial ratio bandwidth of ~170 MHz.

FIG. 6-4 is a field plot showing the current density (in A/m) in vector form for the 4×4 array operating at 10 GHz. The current is seen to be electrically coupling (or traveling) from the microstrip line to the patch antenna element with inclusive slot. The circular rotation of the current along the surface of the patch antenna element 6-106 is indicative that the slot is forcing the current to travel around the antenna (i.e., rotate) rather than go in a linear direction, which results in circular polarization.

FIGS. 6-5A and 6-5B are diagrams depicting plots of performance of a circuit having exemplary electronic devices 6-122. FIG. 6-5A is a diagram presenting the measured gain performance of an exemplary low noise amplifier (LNA) with printed interconnects. The LNA was attached to a two layer PYRALUX substrate with conductive ink printed interconnects on copper pads and ink filled vias 6-120. The LNA has a 4 mm×4 mm footprint in a QFN package and 24 pins disposed about the periphery of the LNA package. The measured gain performance of the LNA closely match vendor data at frequencies up to 22 GHz. FIG. 6-5B is a diagram illustrating the linearity of a power detector using the LNA. As illustrated, the power response is linear and the LNA has measurable output down to about −110 dBm.

Figures 2, 3, 4, 5, 6, 7, 8, 8A:
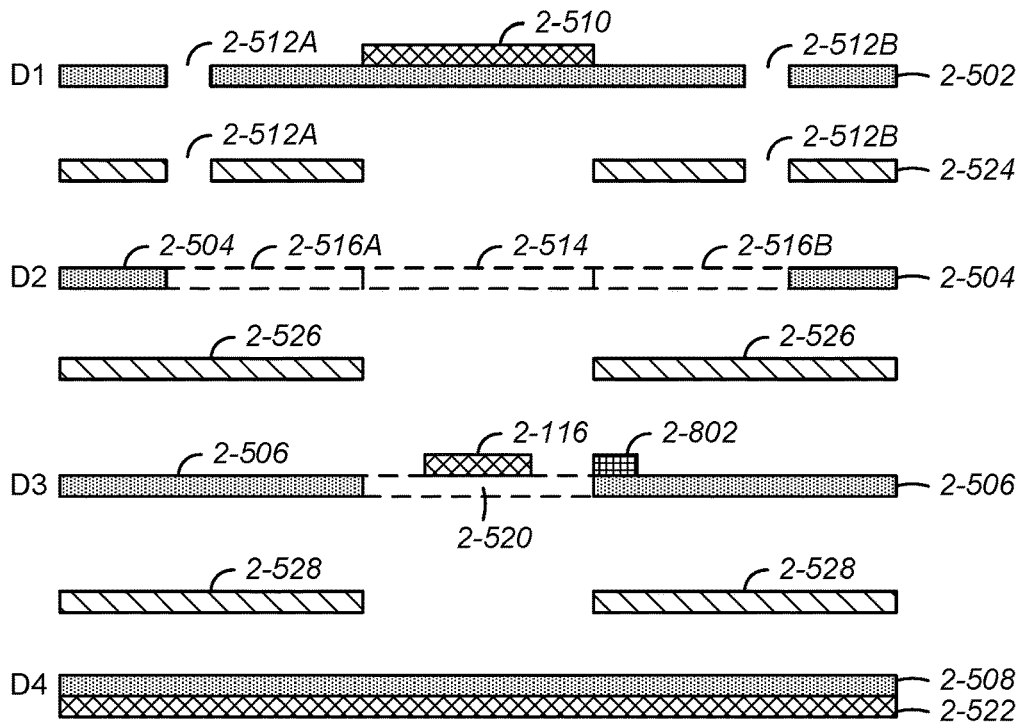
Figures 2, 3, 4, 5, 6, 7, 8, 8B:
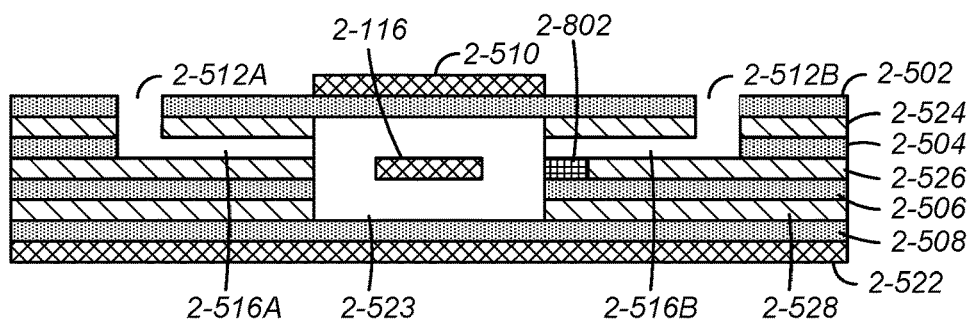
Figures 2, 3, 4, 5, 6, 7, 8, 8C:
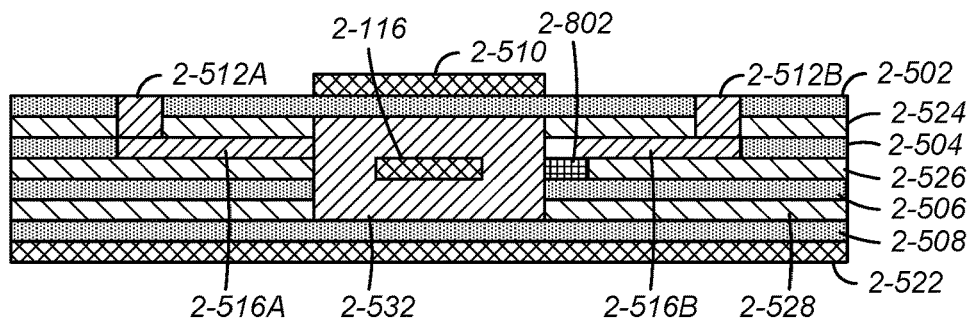
Figures 1A, 3:
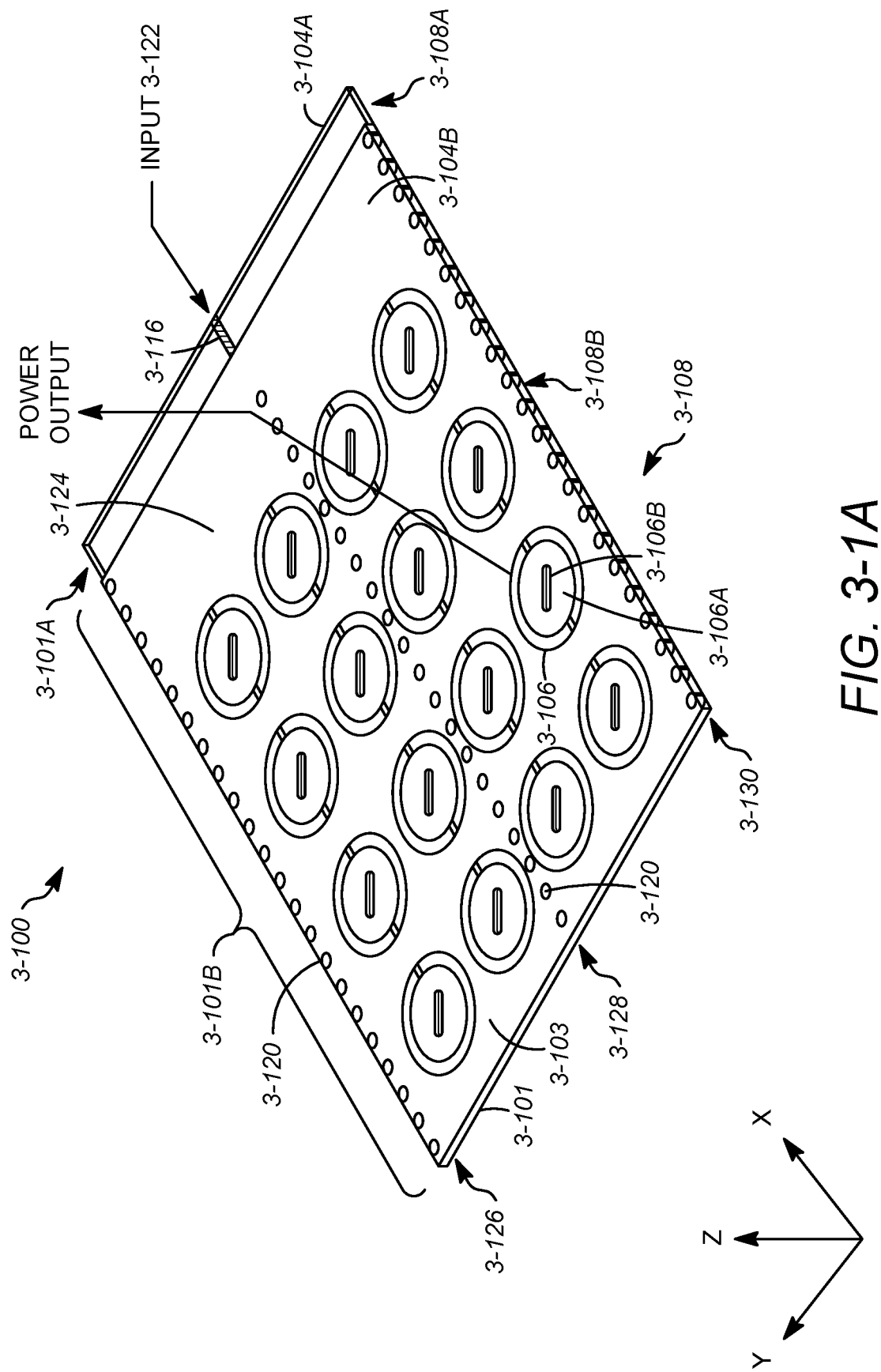
Figures 1B, 3:
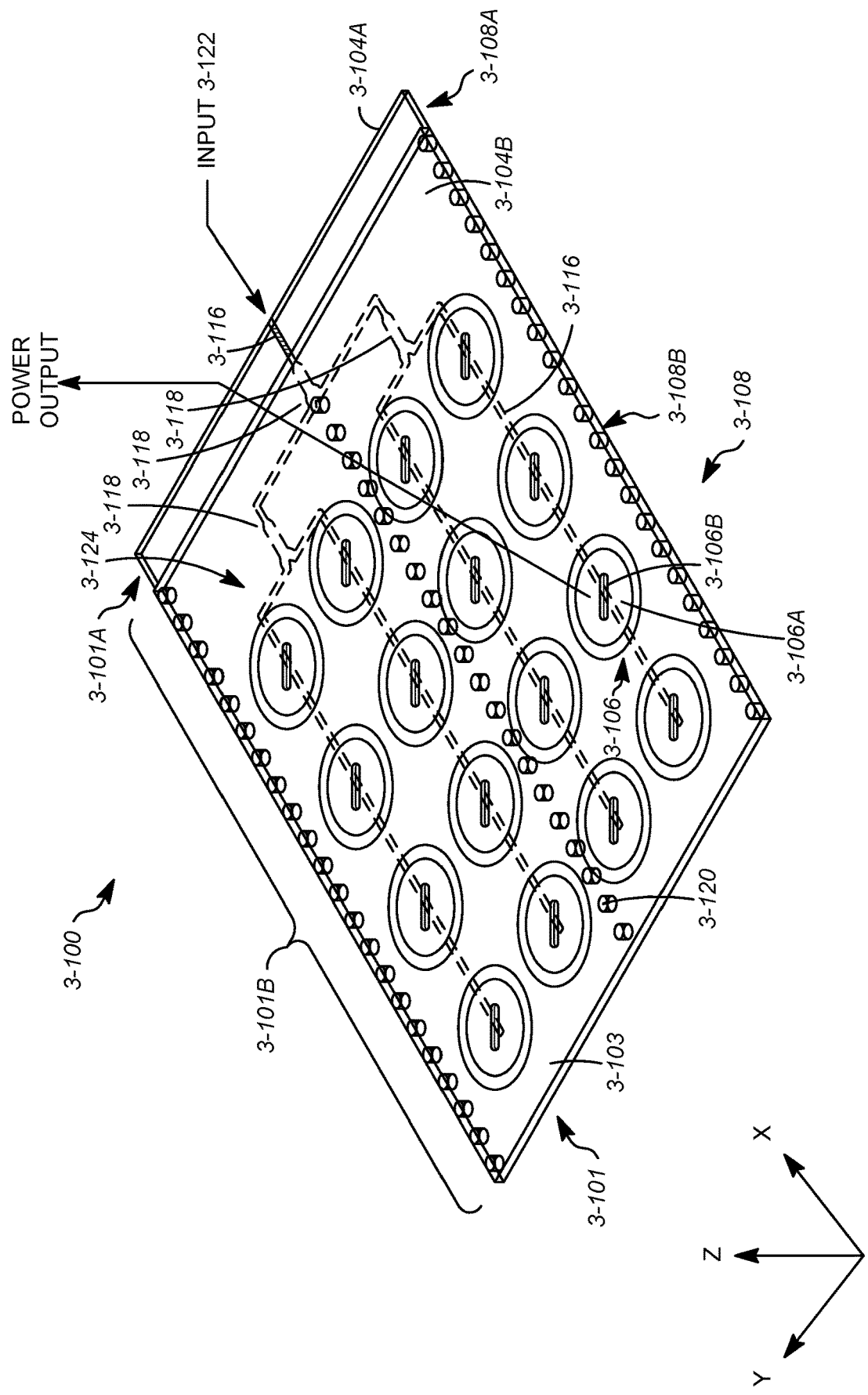
Figures 2A, 3:
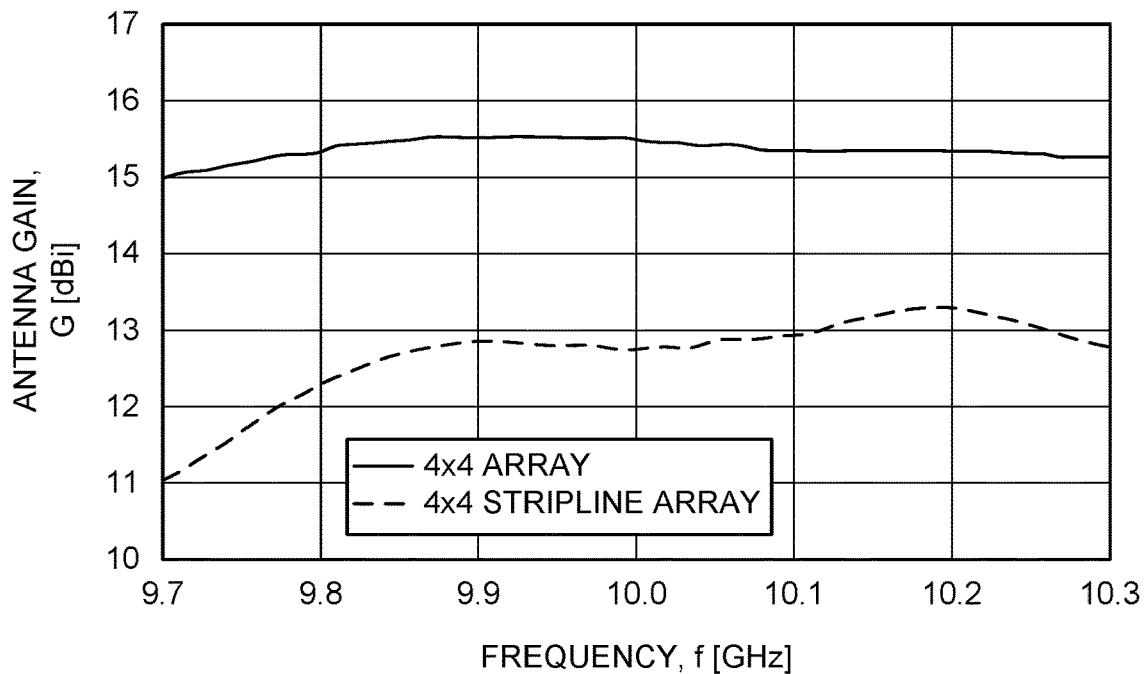
Figures 2B, 3:
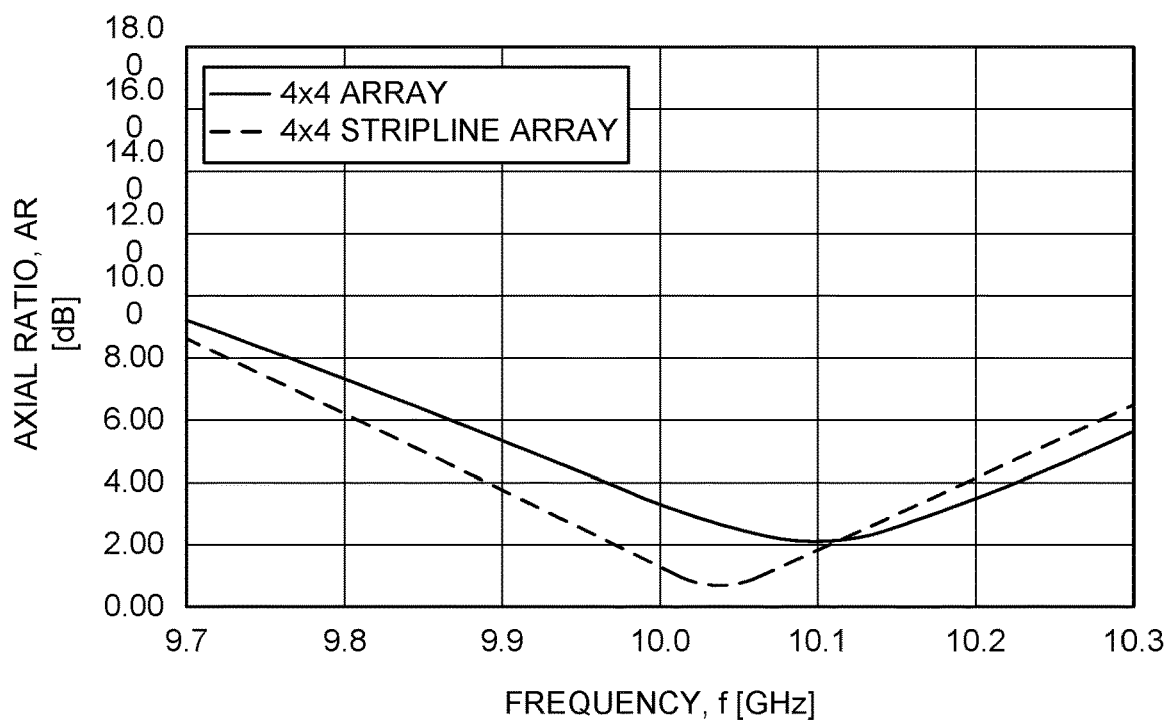
Figure 3:
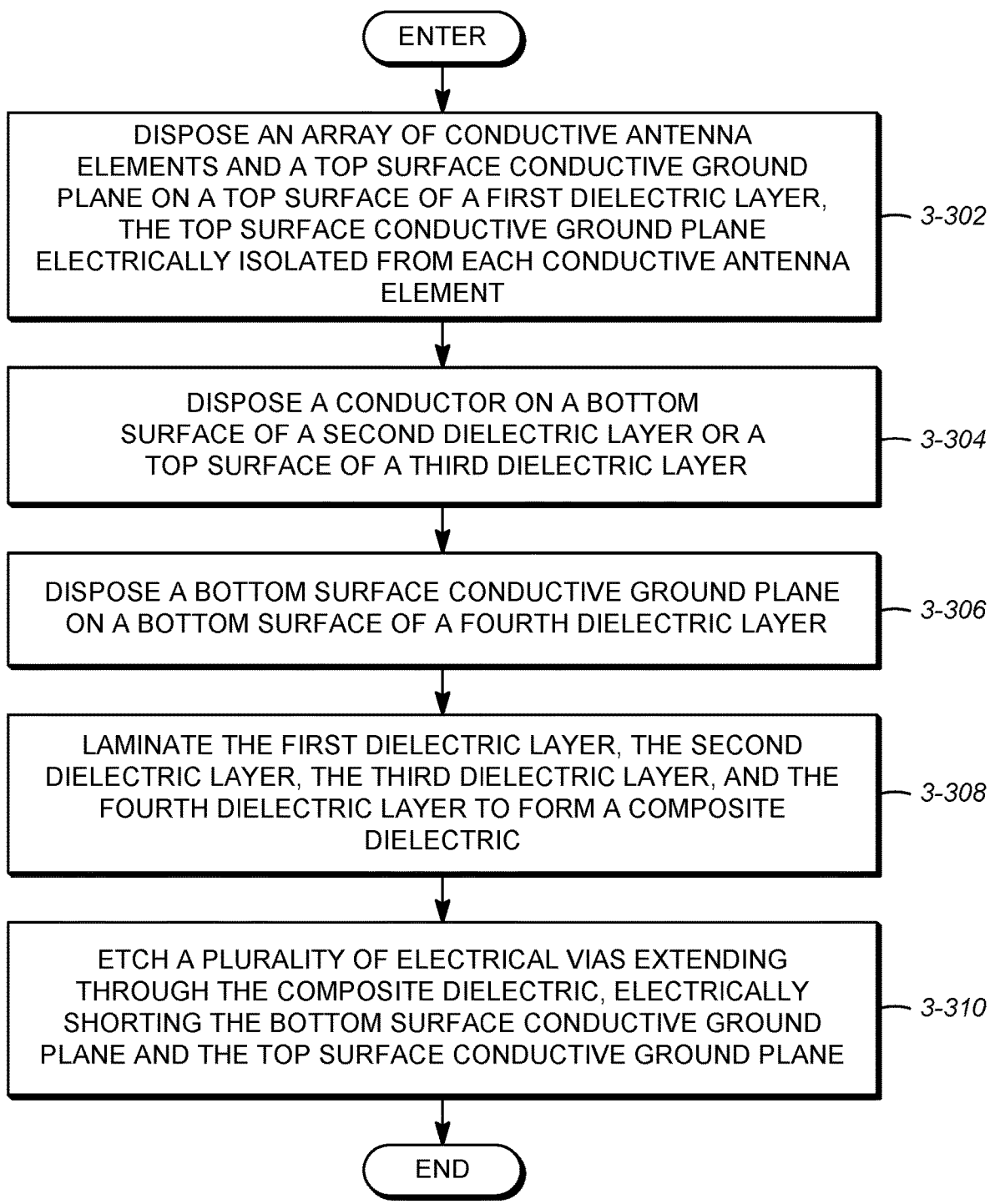
Figures 3, 4:
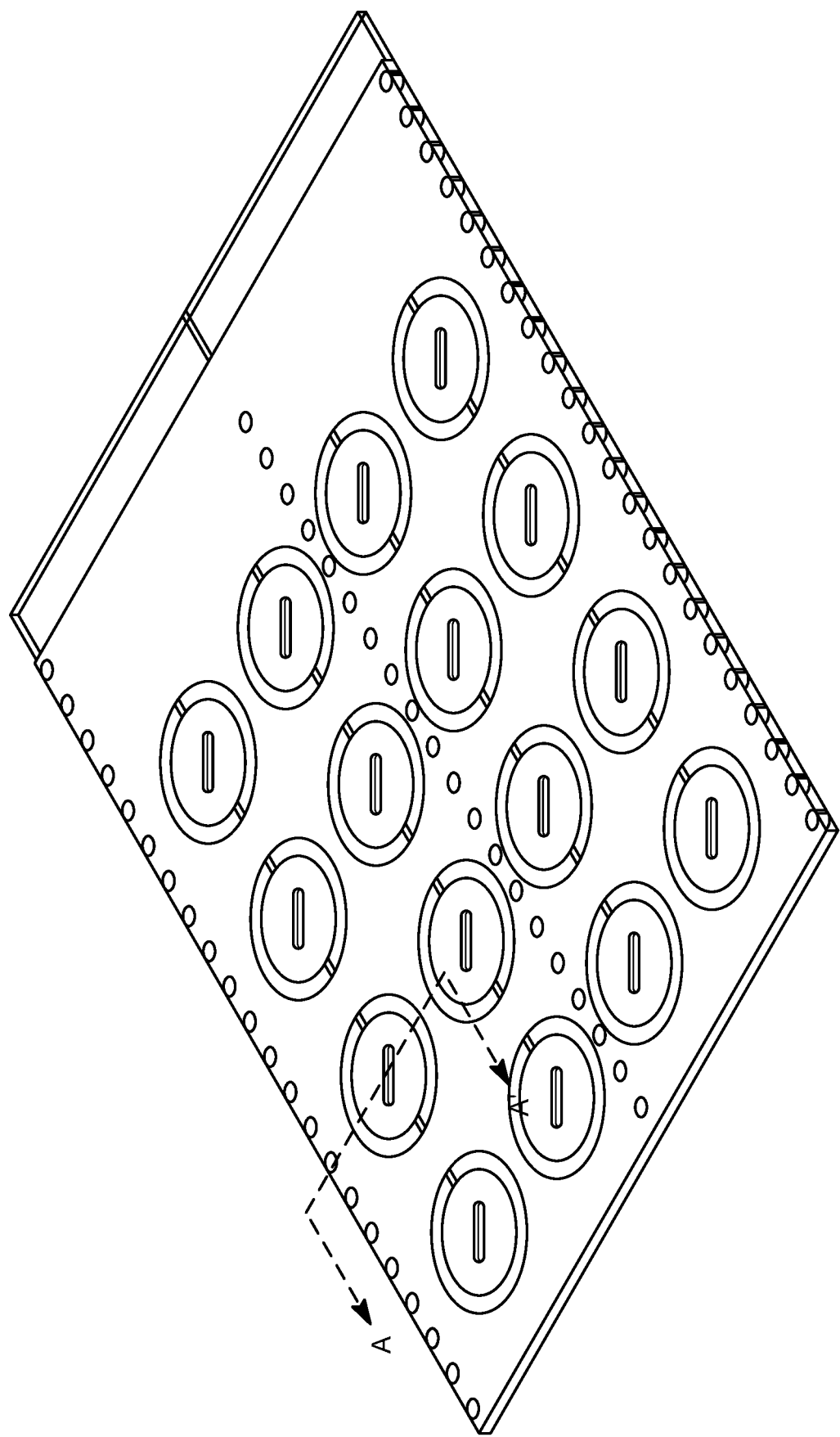
Figures 3, 4, 5, 5A:
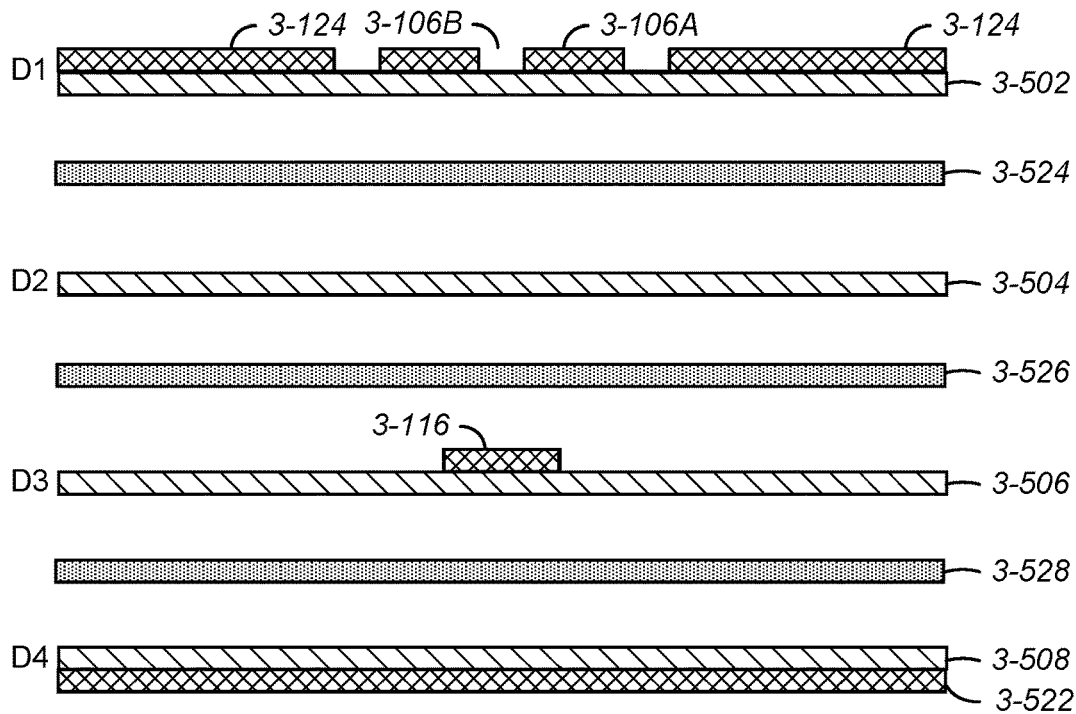
Figures 3, 4, 5, 5B:
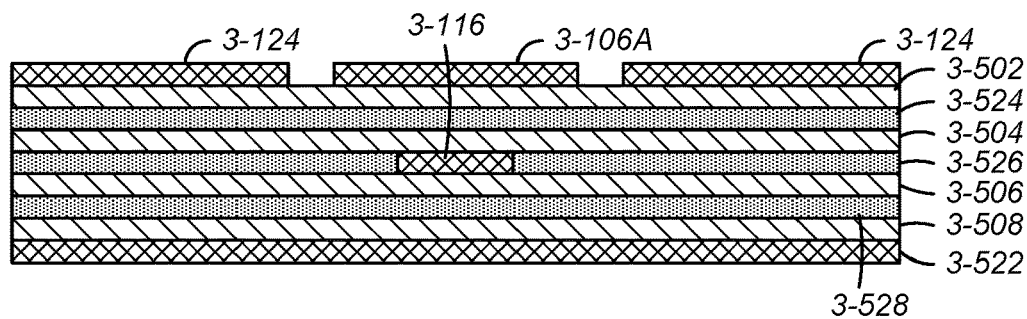
Figures 3, 4, 5, 5C:
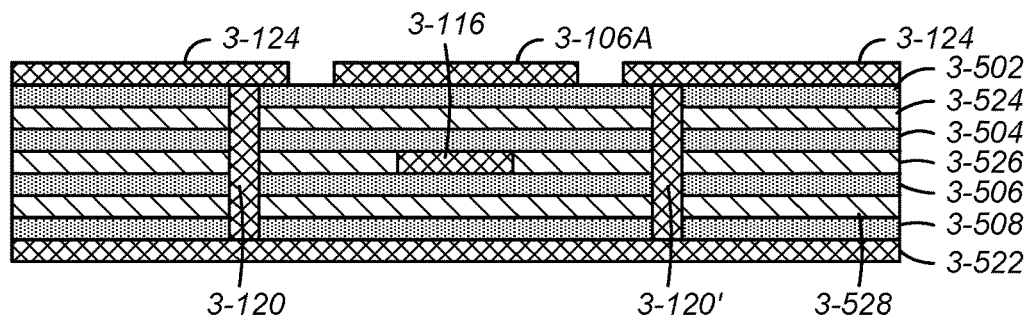
Figures 3, 4, 5, 6:
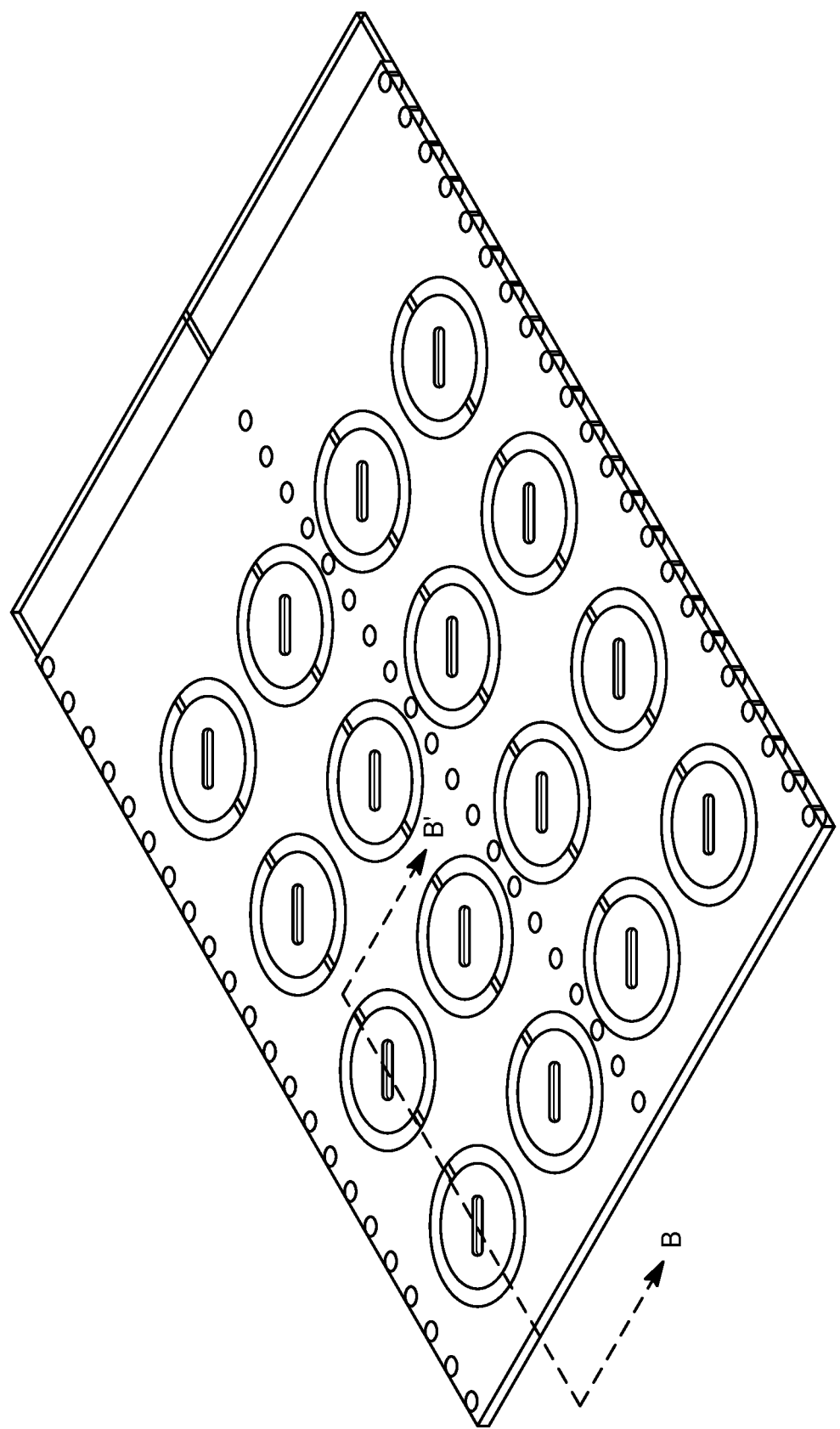
Figures 1A, 4:
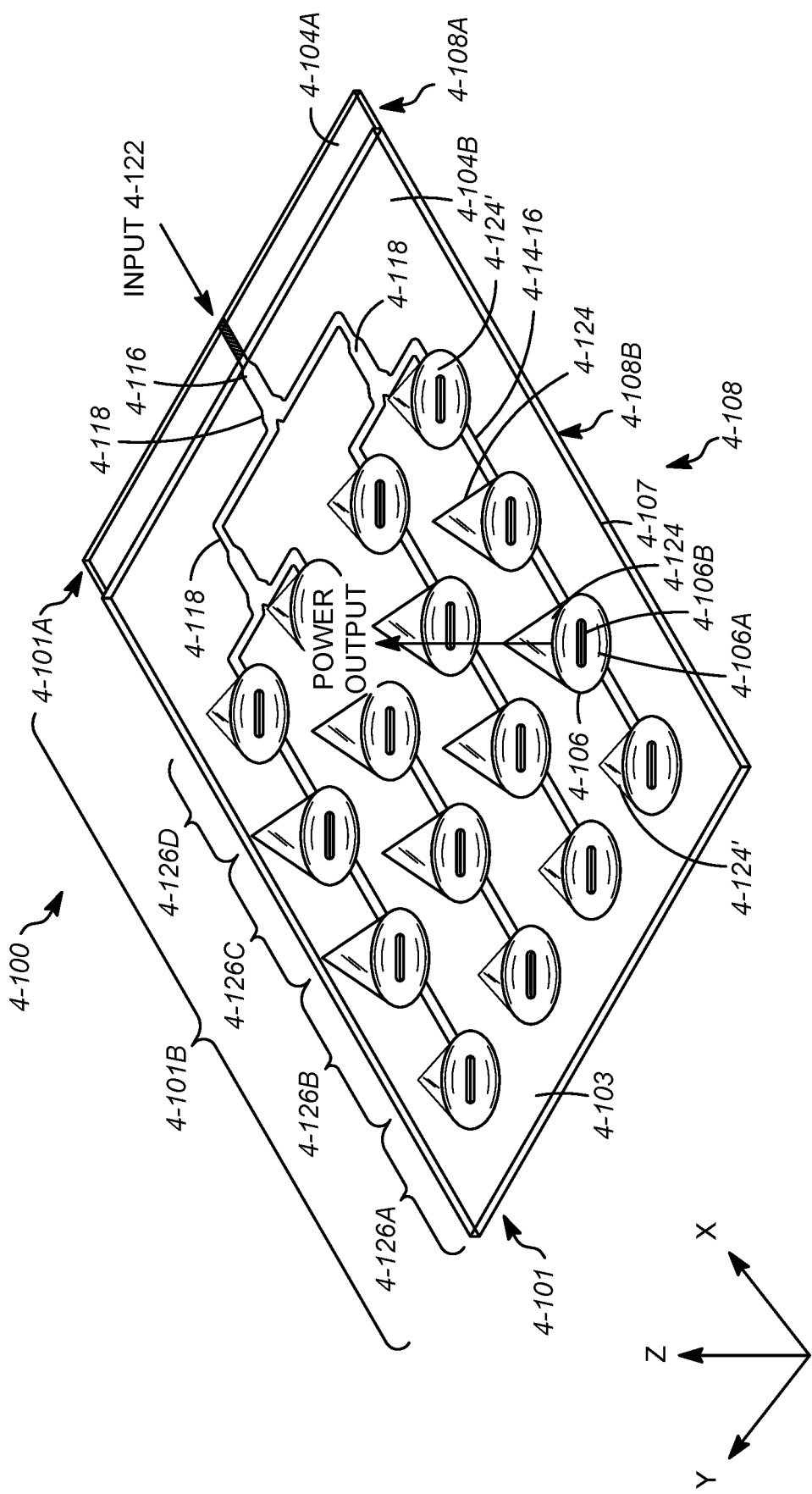
Figures 1B, 4:
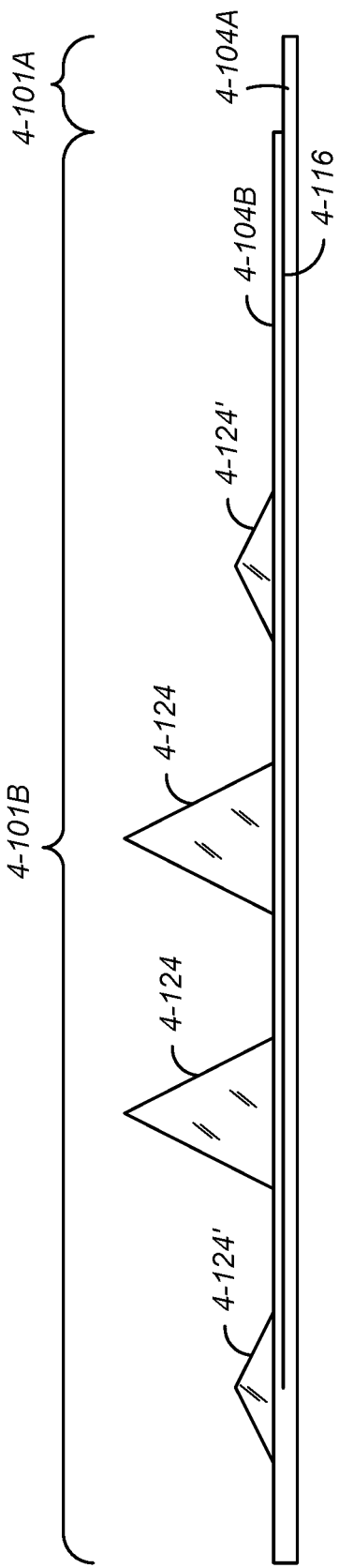
Figures 2A, 4:
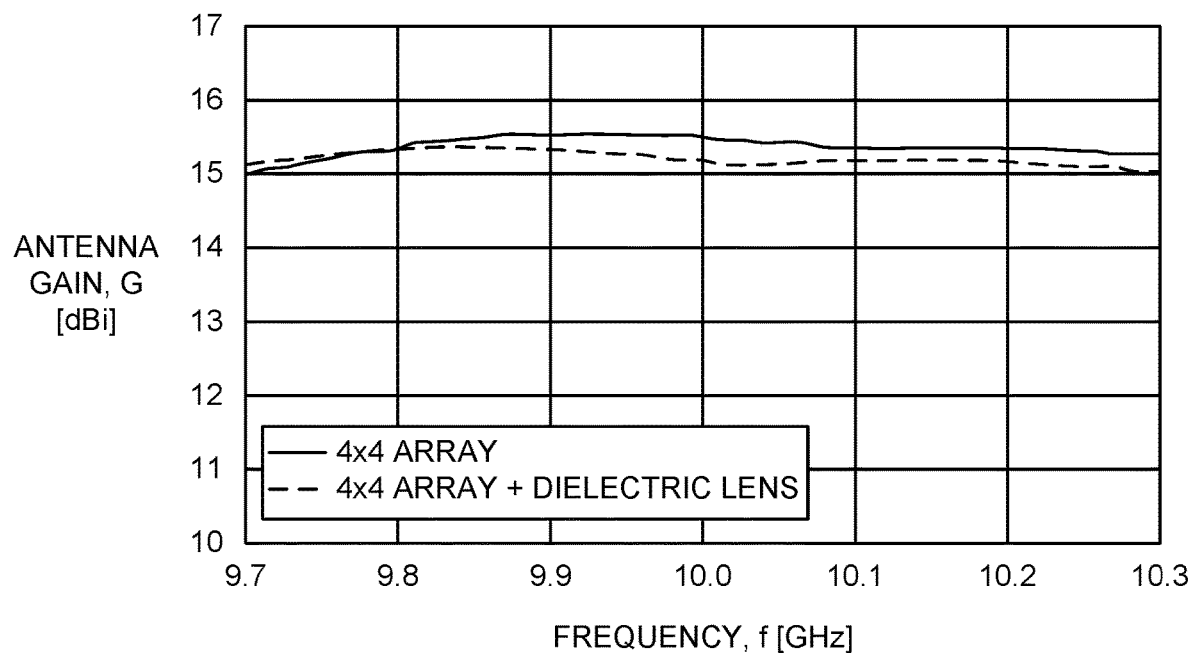
Figures 2B, 4:
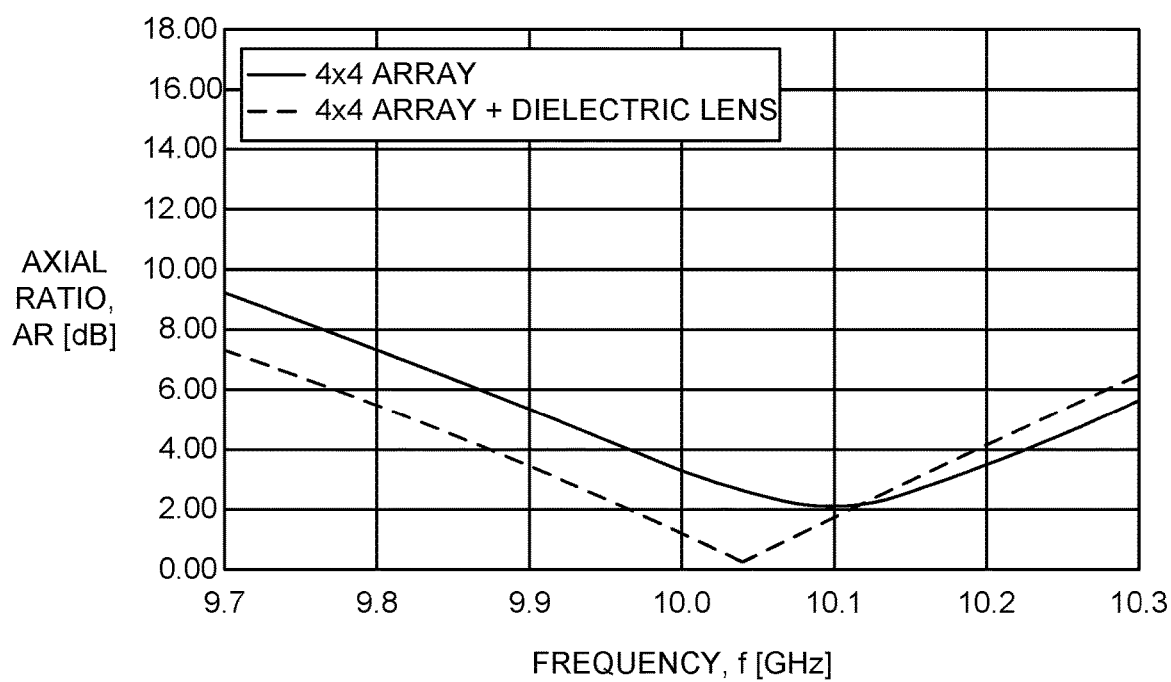
Figures 3, 4:
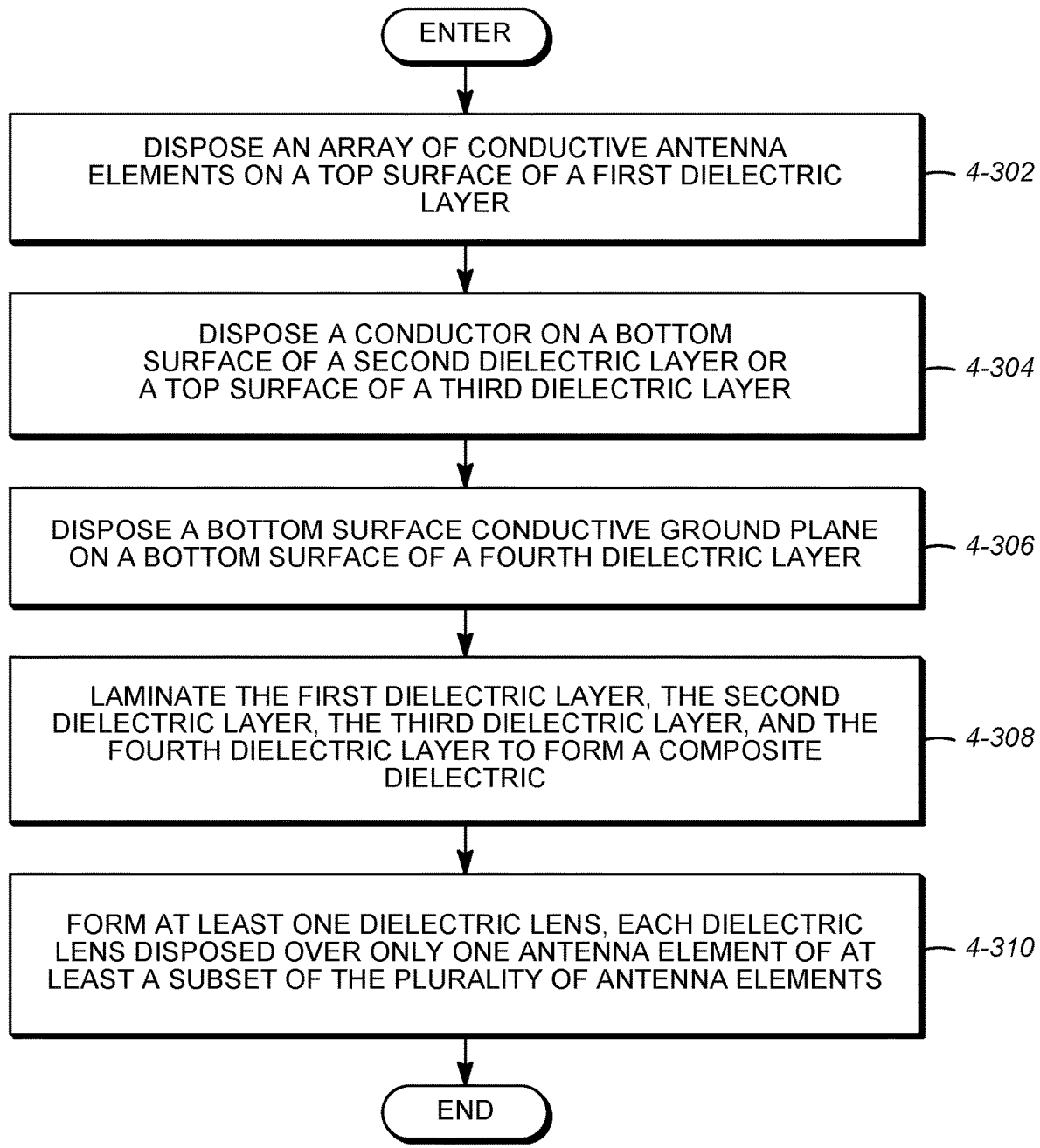
Figure 4:
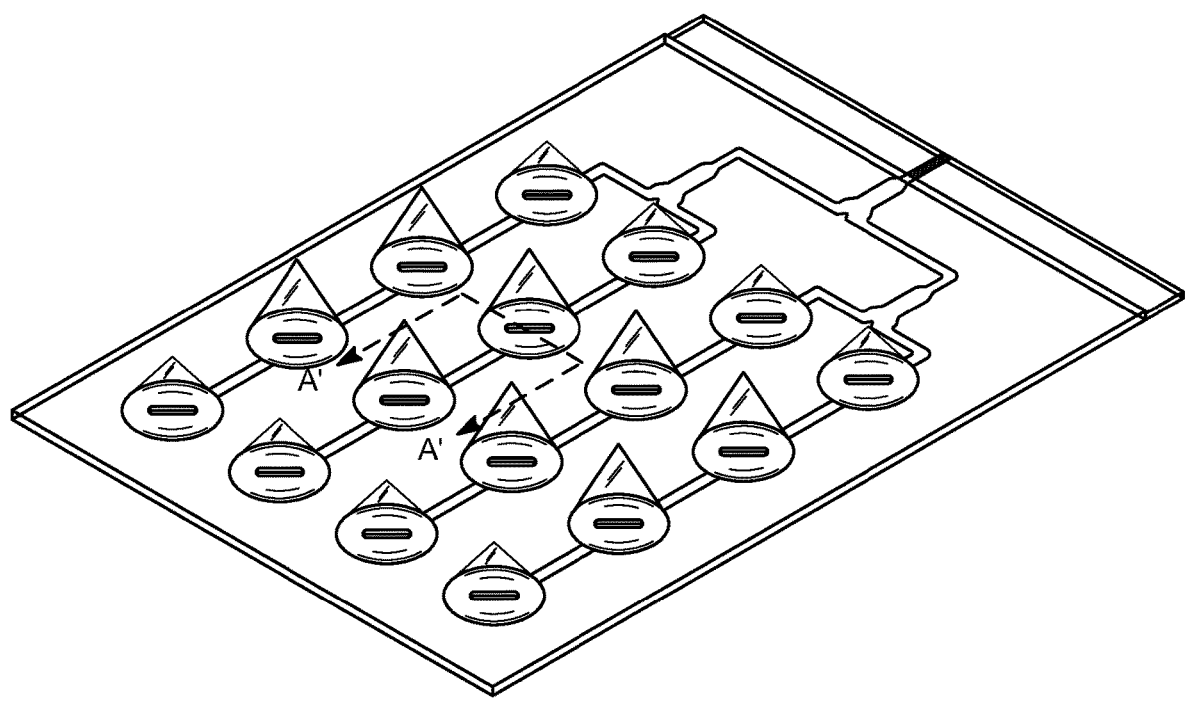
Figures 4, 5, 5A:
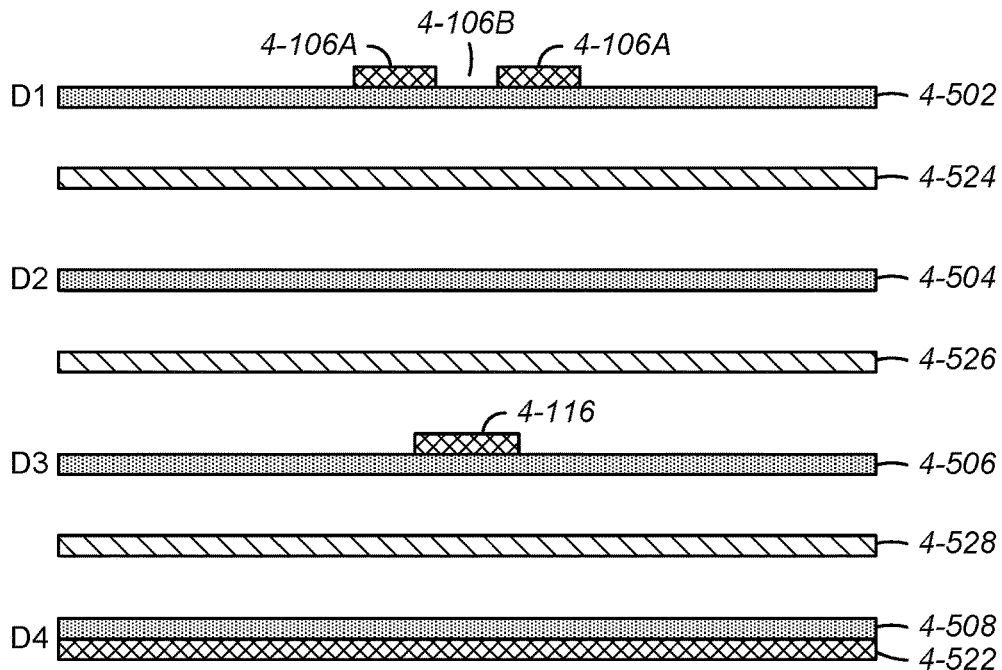
Figures 4, 5, 5B:
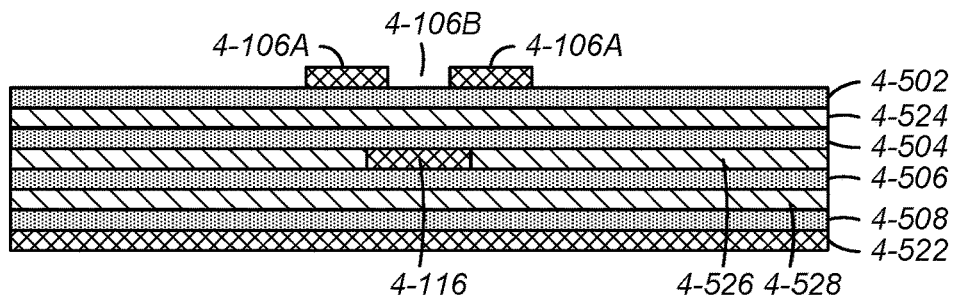
Figures 4, 5, 5C:
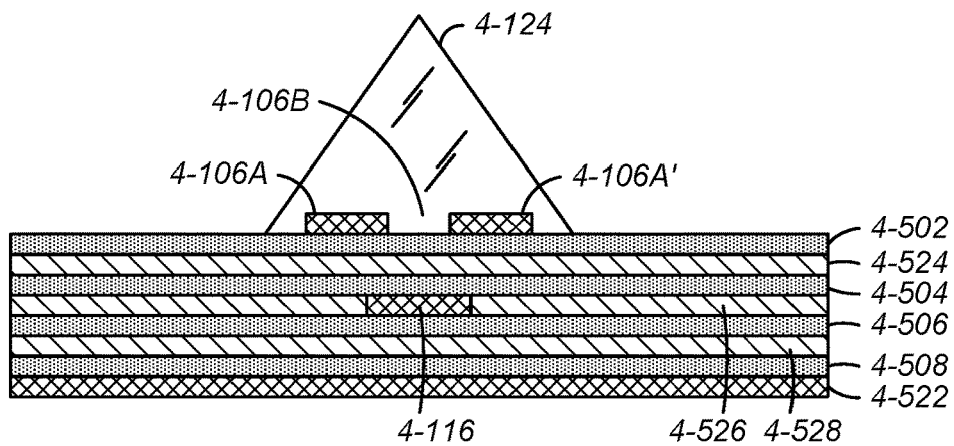
Figures 4, 5, 6:
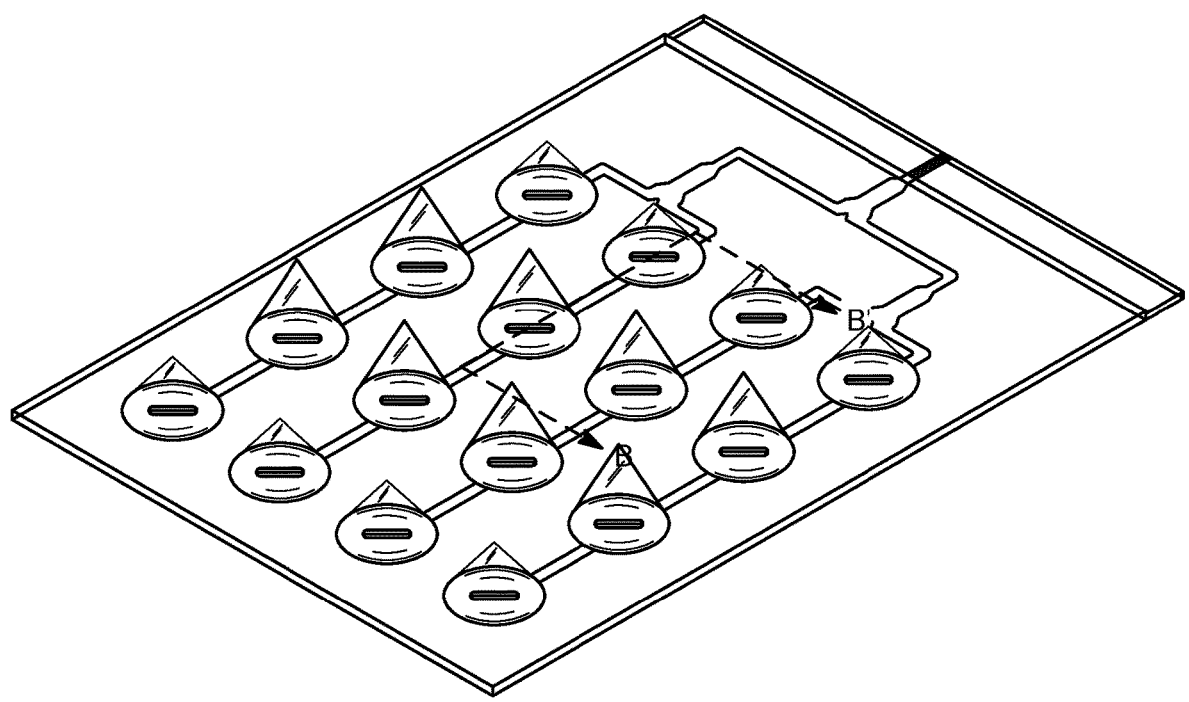
Figures 4, 5, 6, 7, 7A:
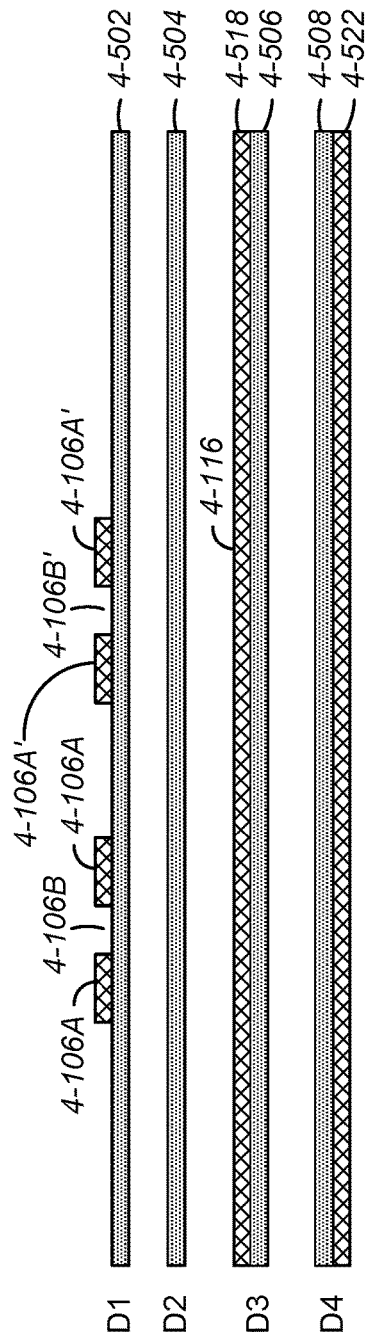
Figures 4, 5, 6, 7, 7B:
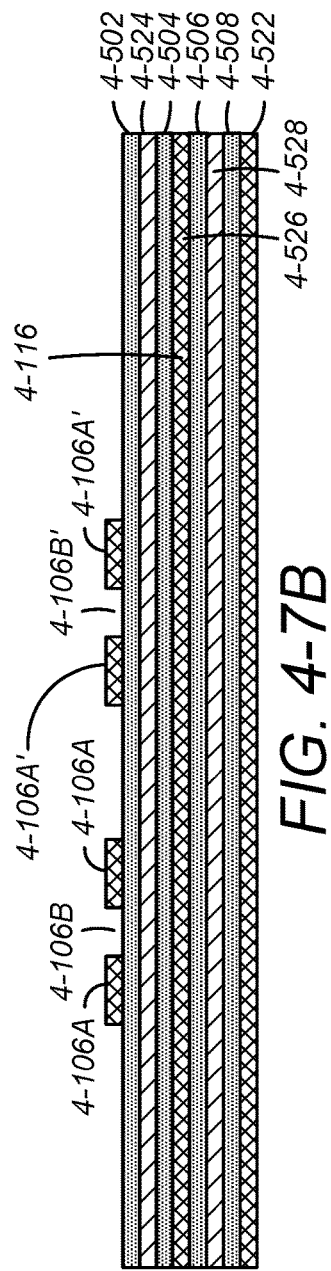
Figures 4, 5, 6, 7, 7C:
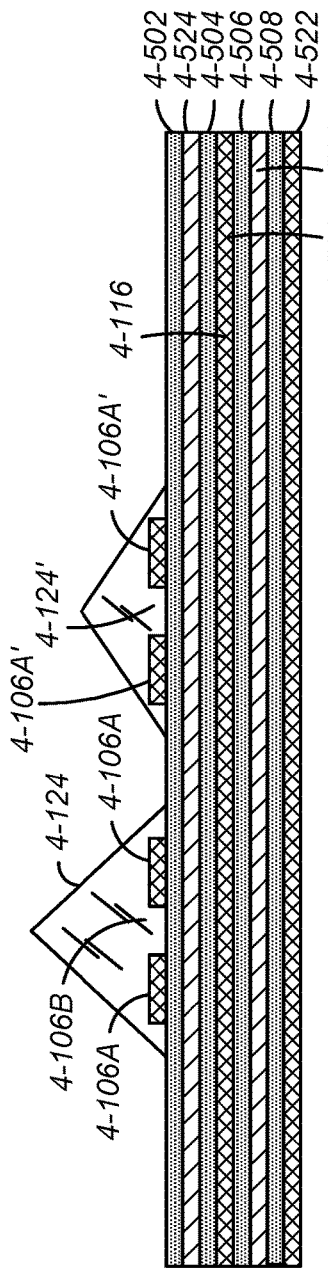
Figures 1A, 6:
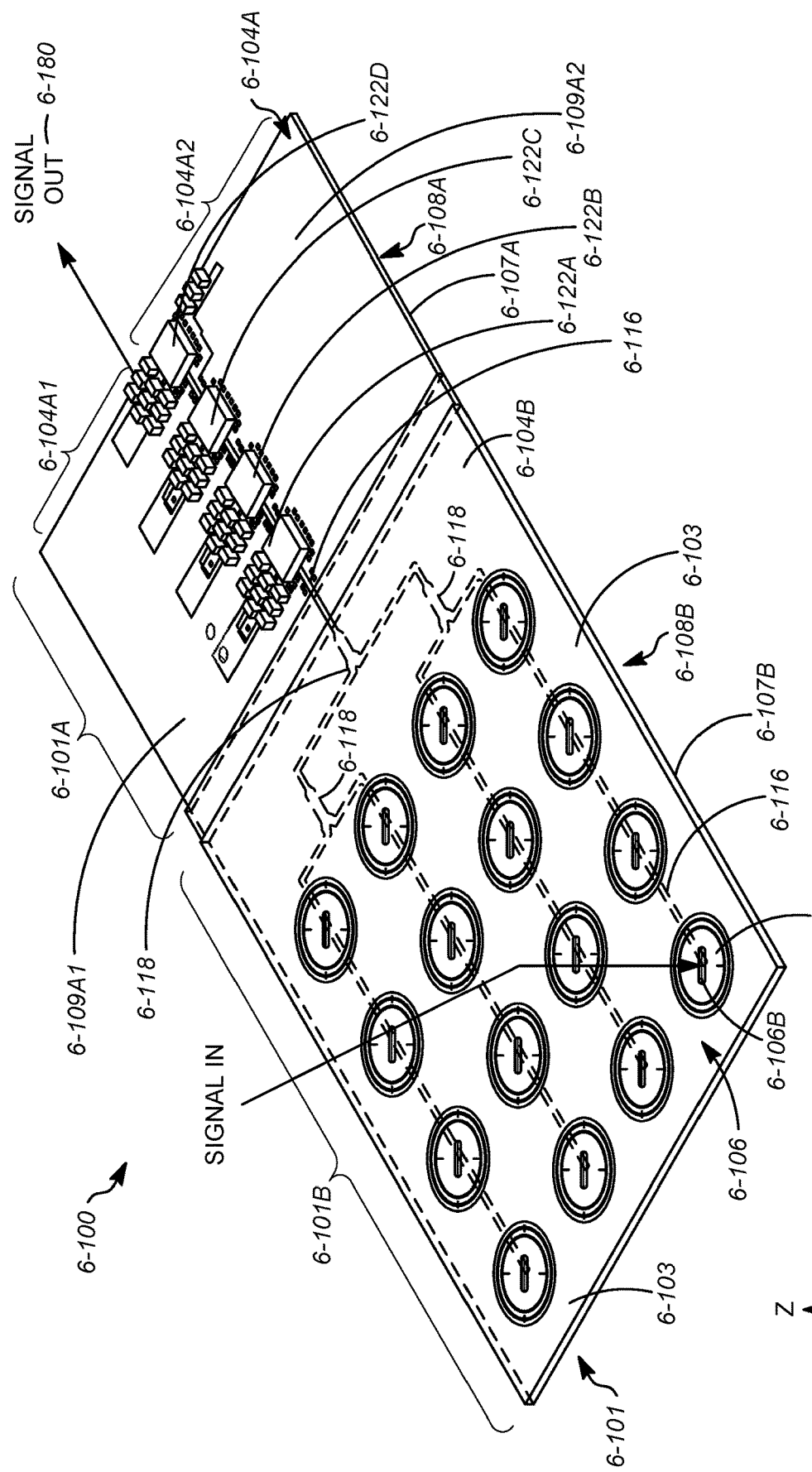
Figures 1B, 6:
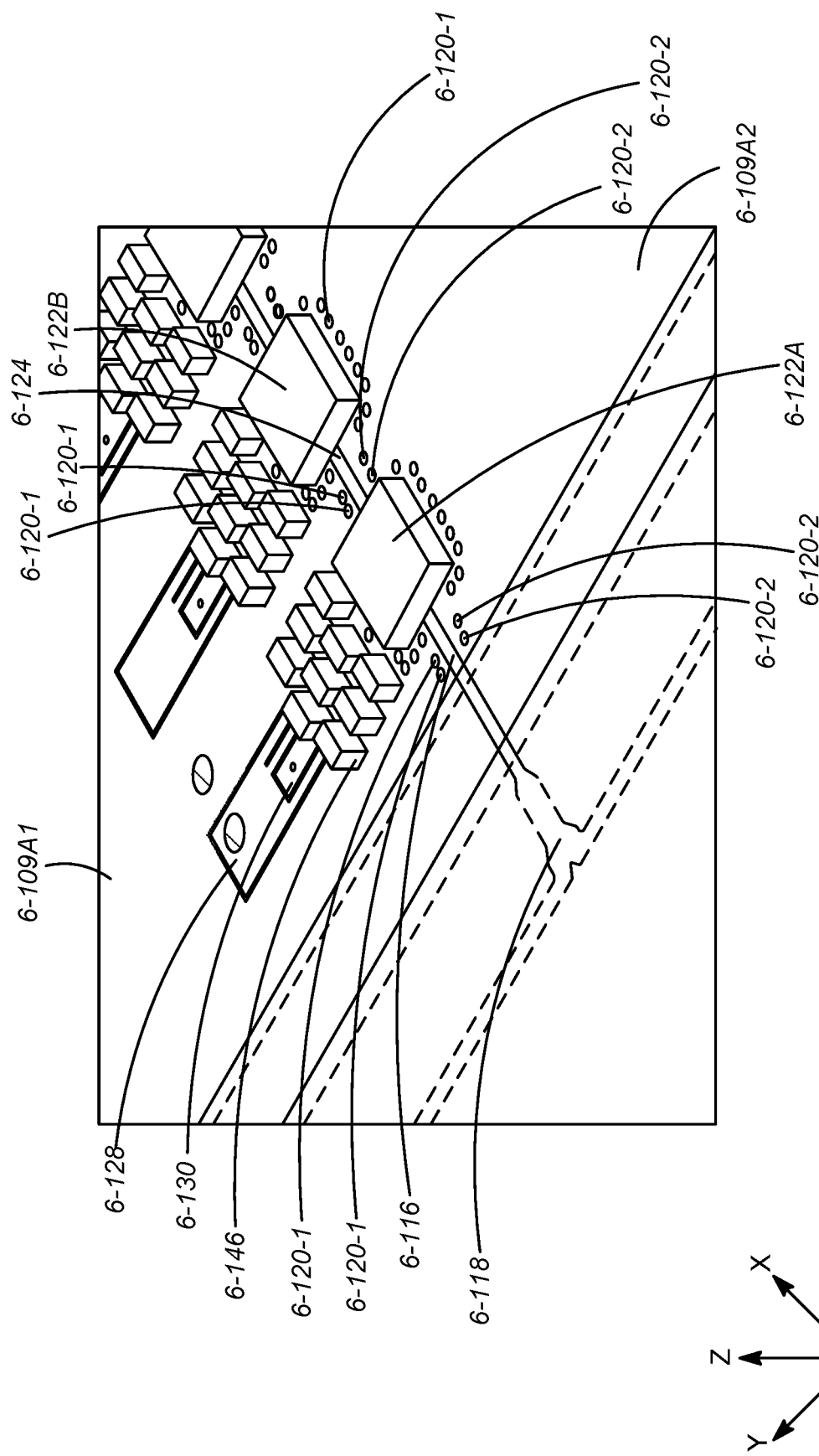
Figures 1C, 6:
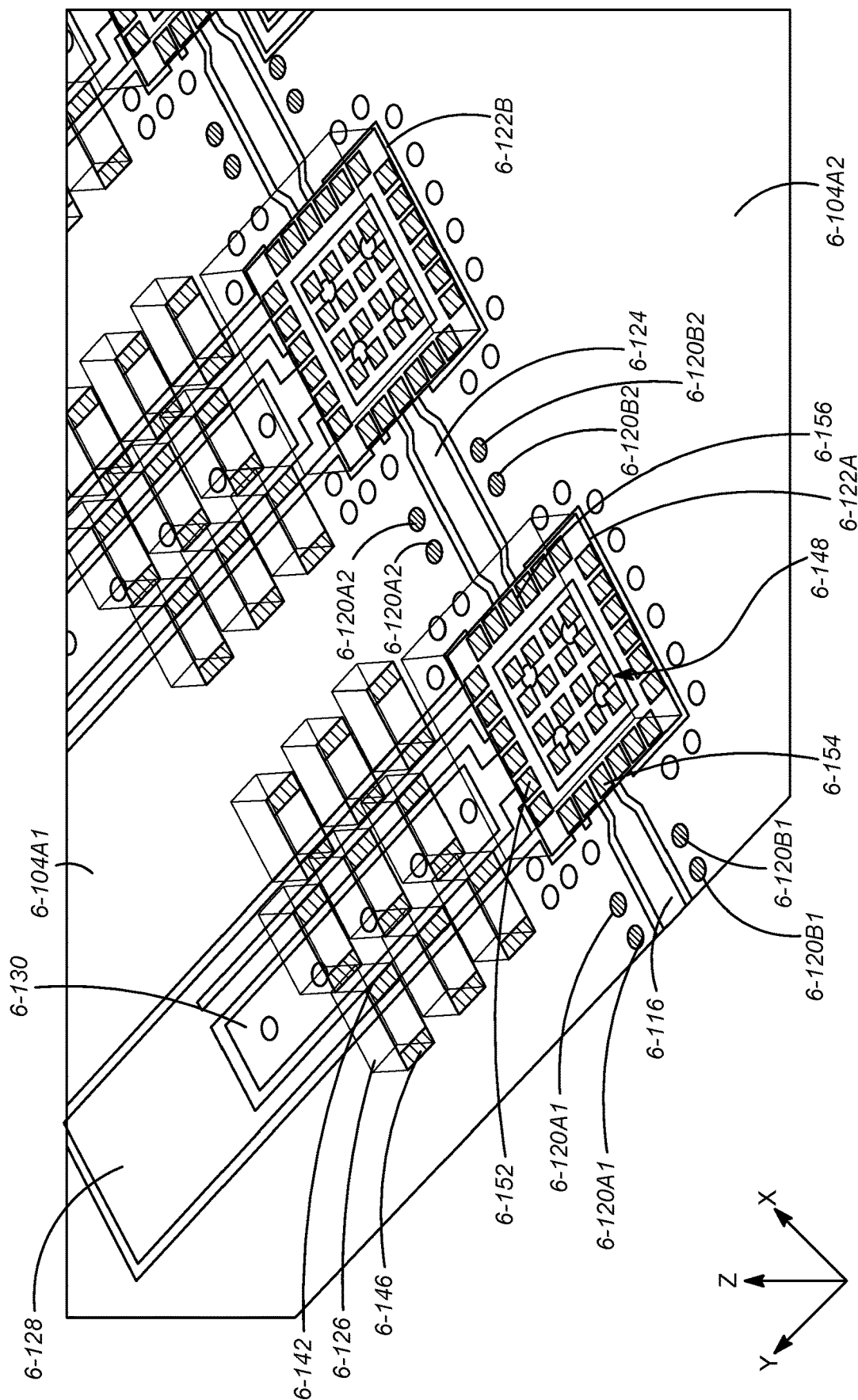
Figures 2A, 6:
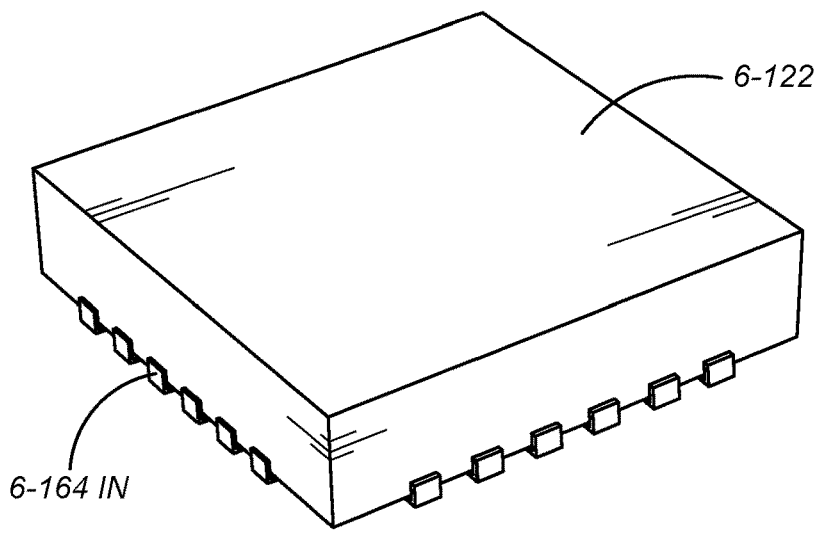
Figures 2B, 6:
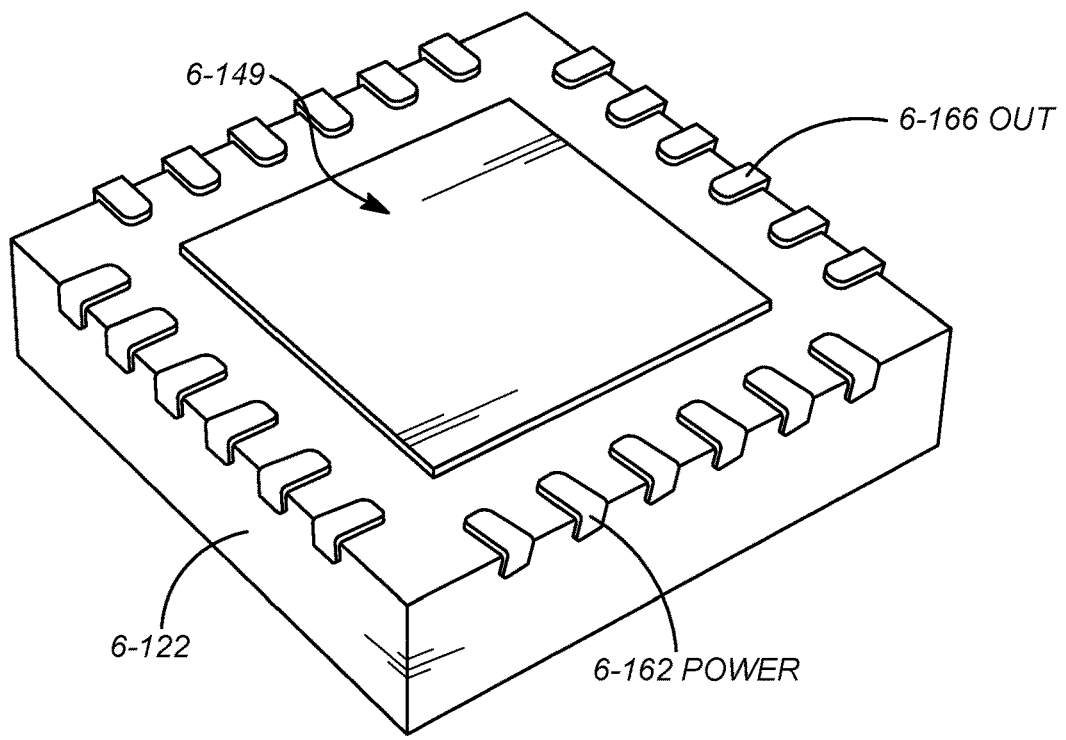
Figures 3A, 6:
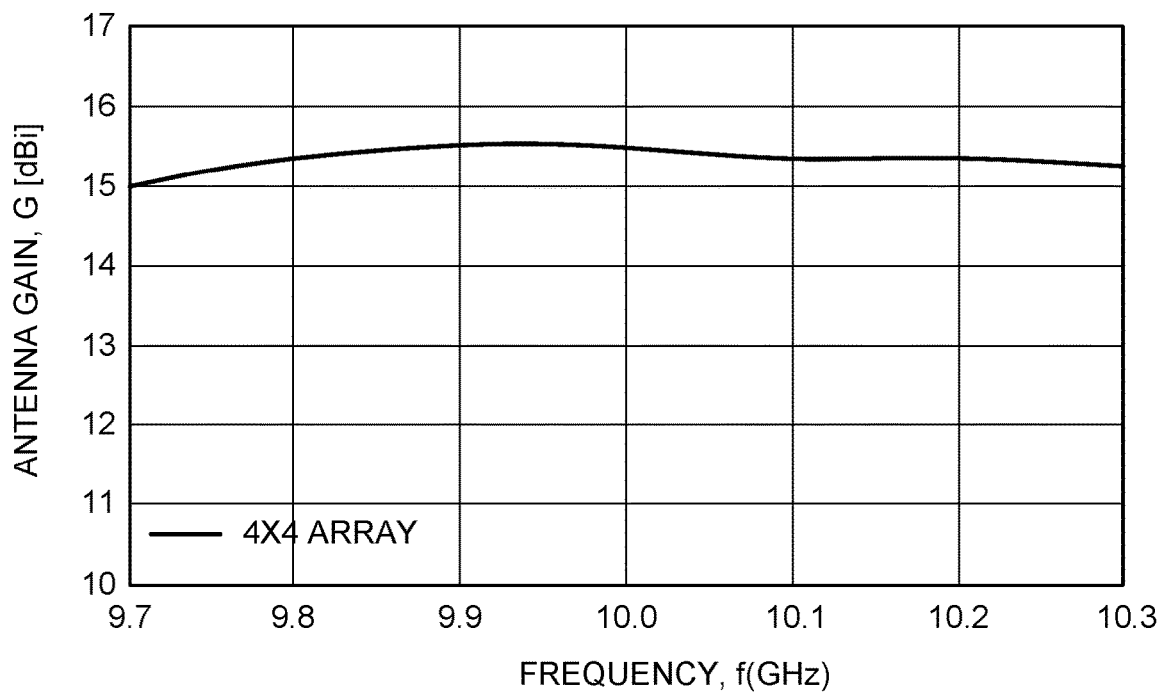
Figures 3B, 6:
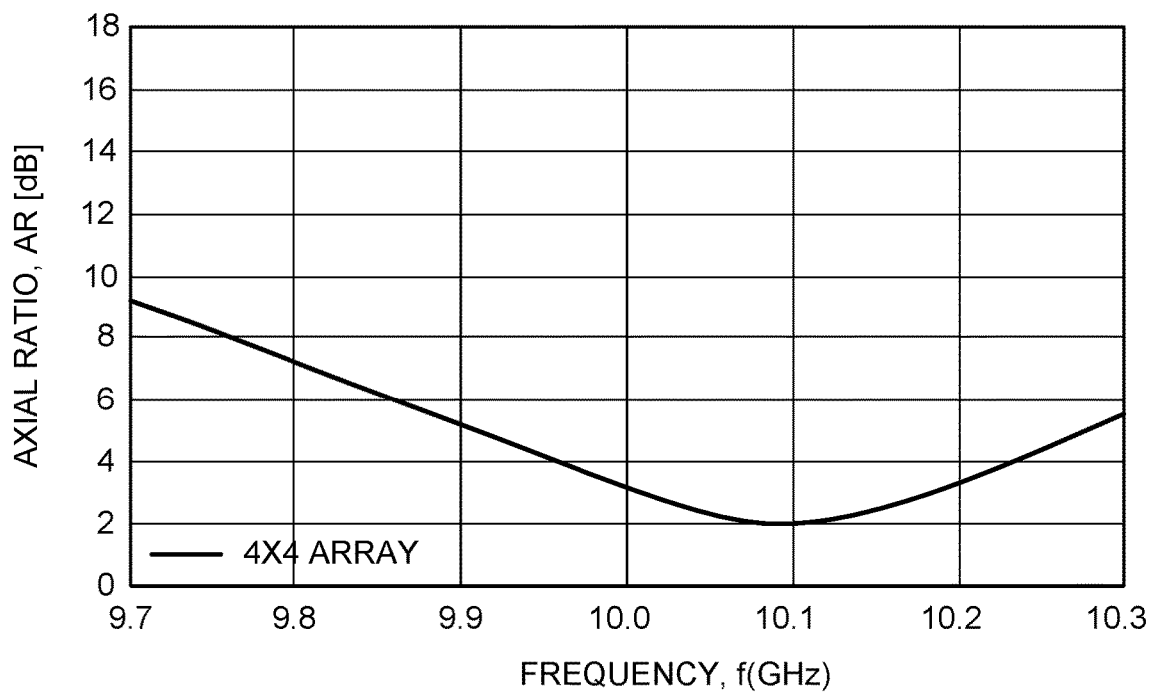
Figures 4, 6:
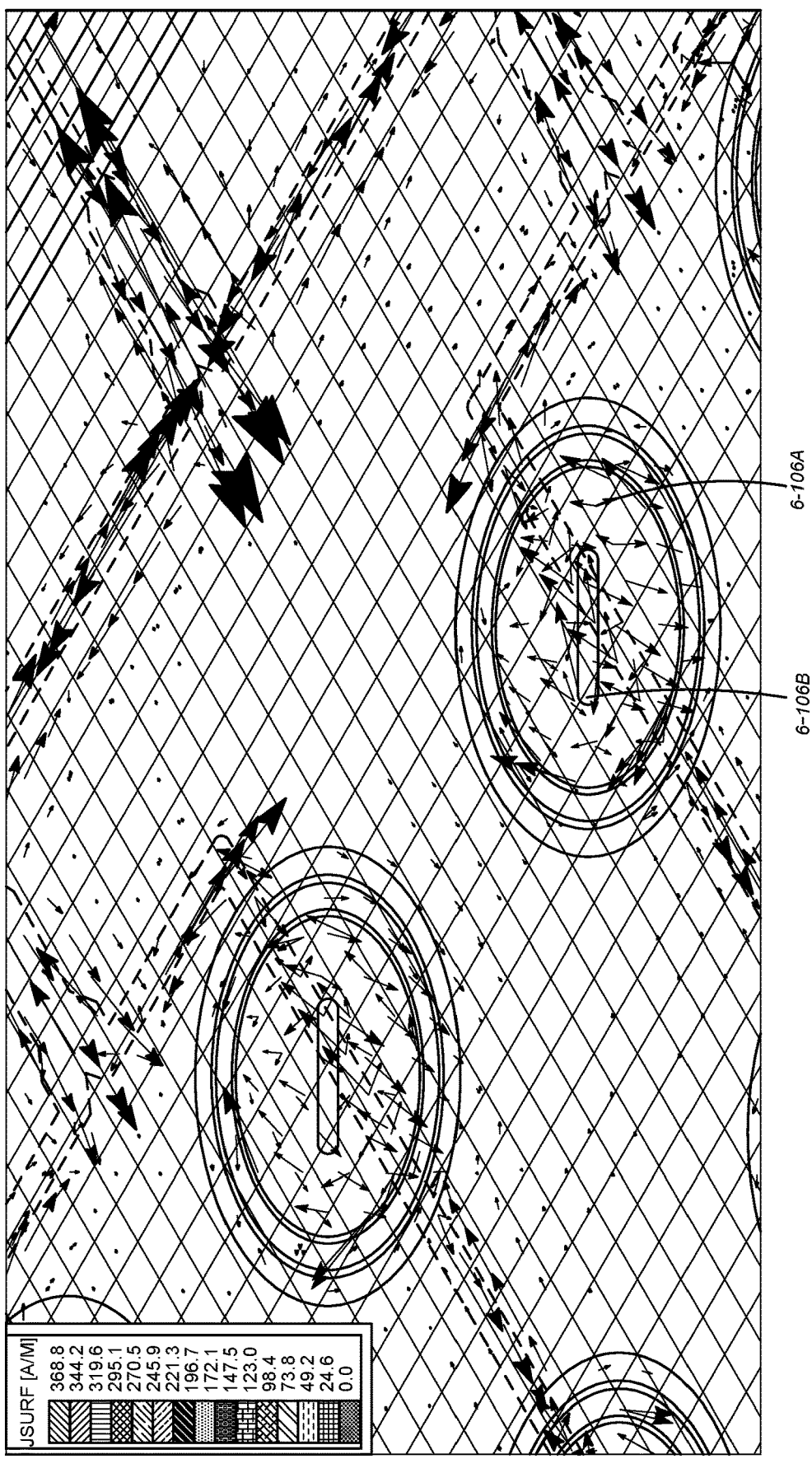
Figures 5A, 6:
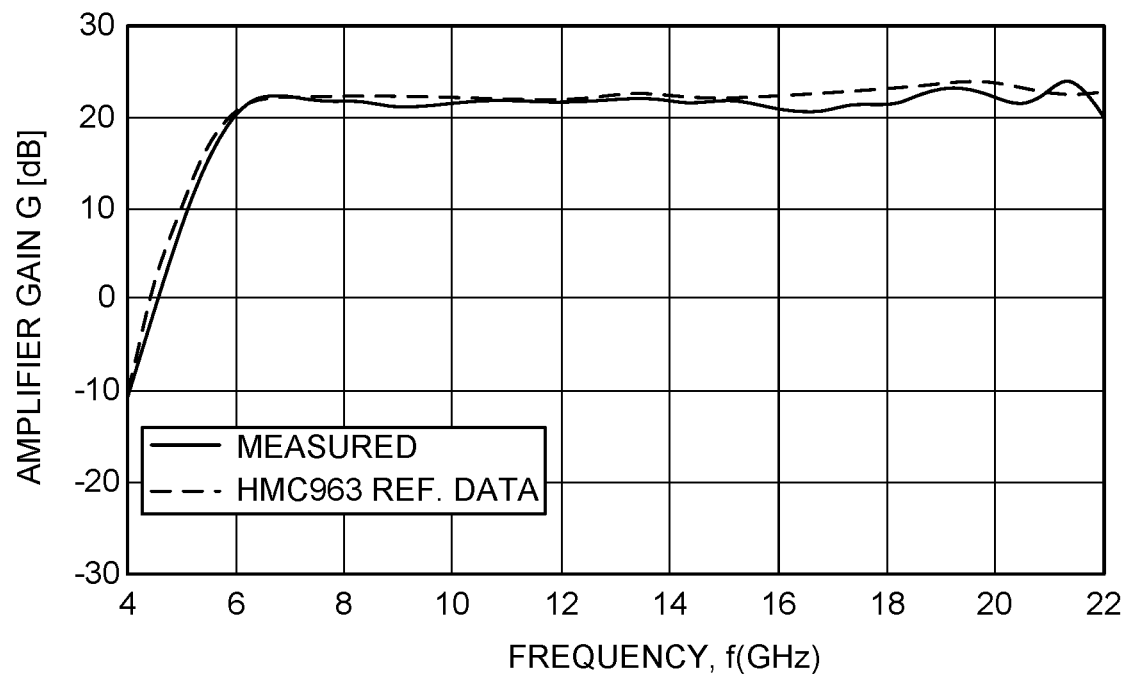
Figures 5B, 6:
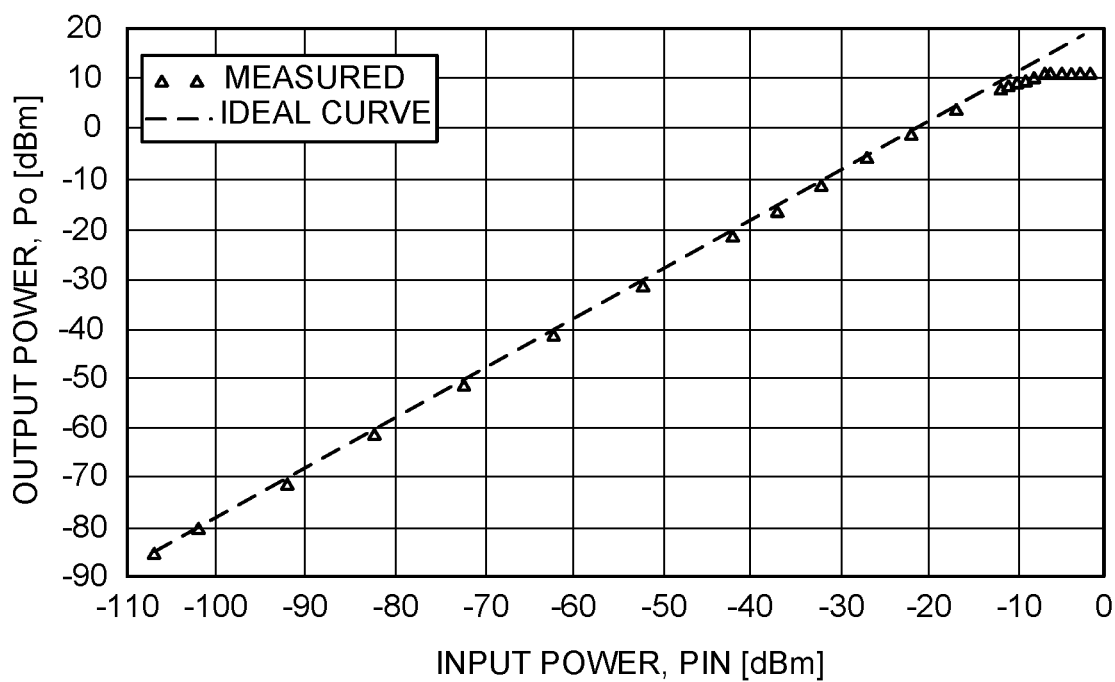
Figures 6, 6A:
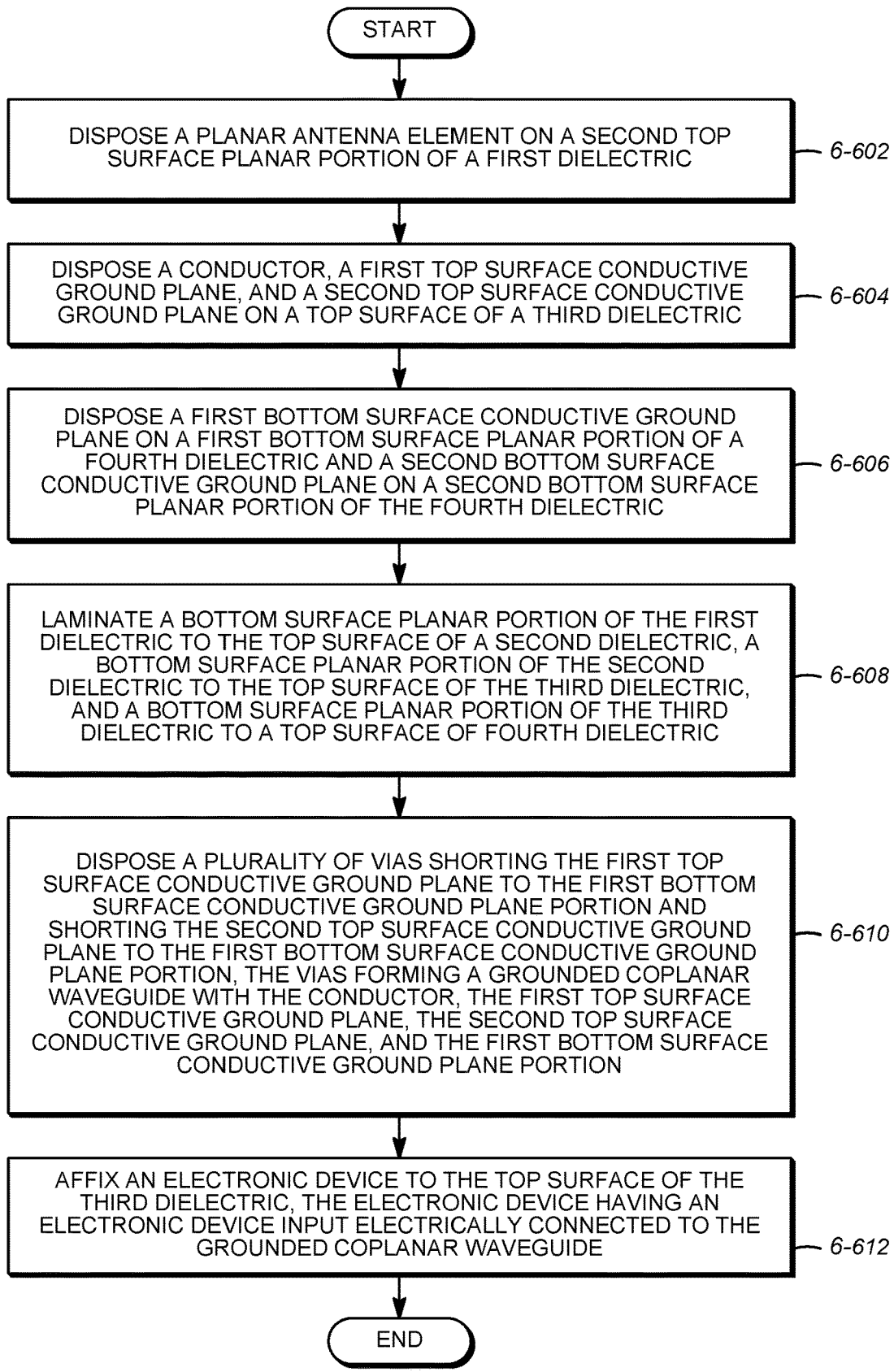
Figures 6, 6B:
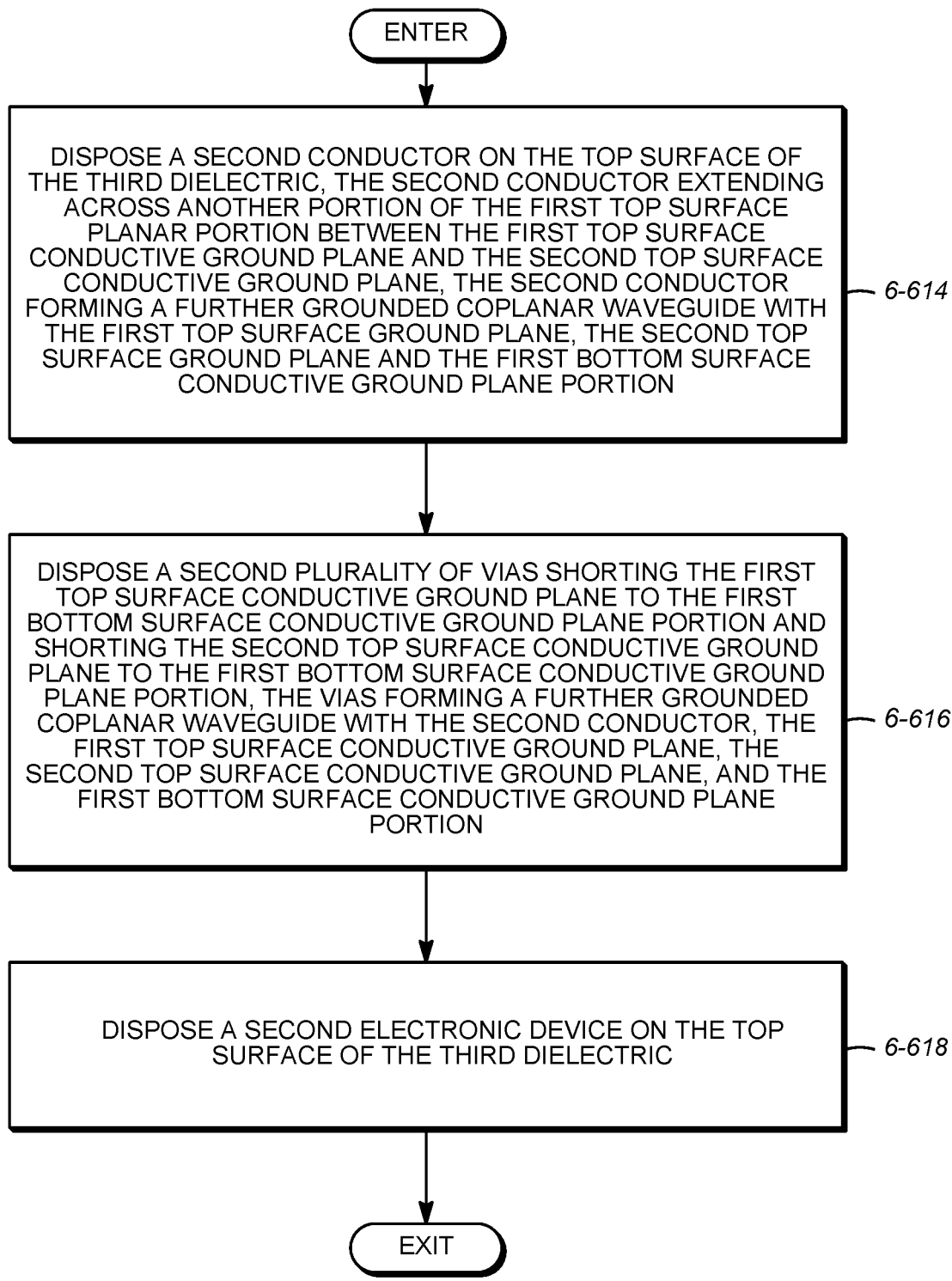
Figures 6, 6C:
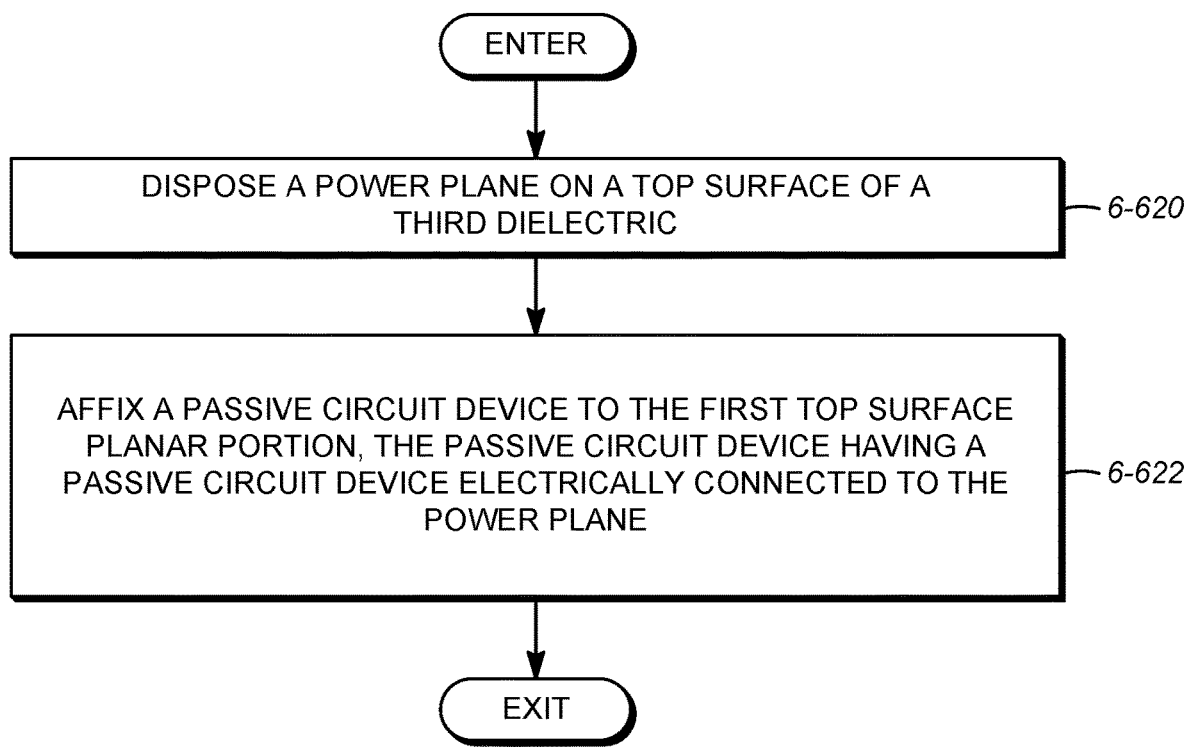
Figures 6, 7:
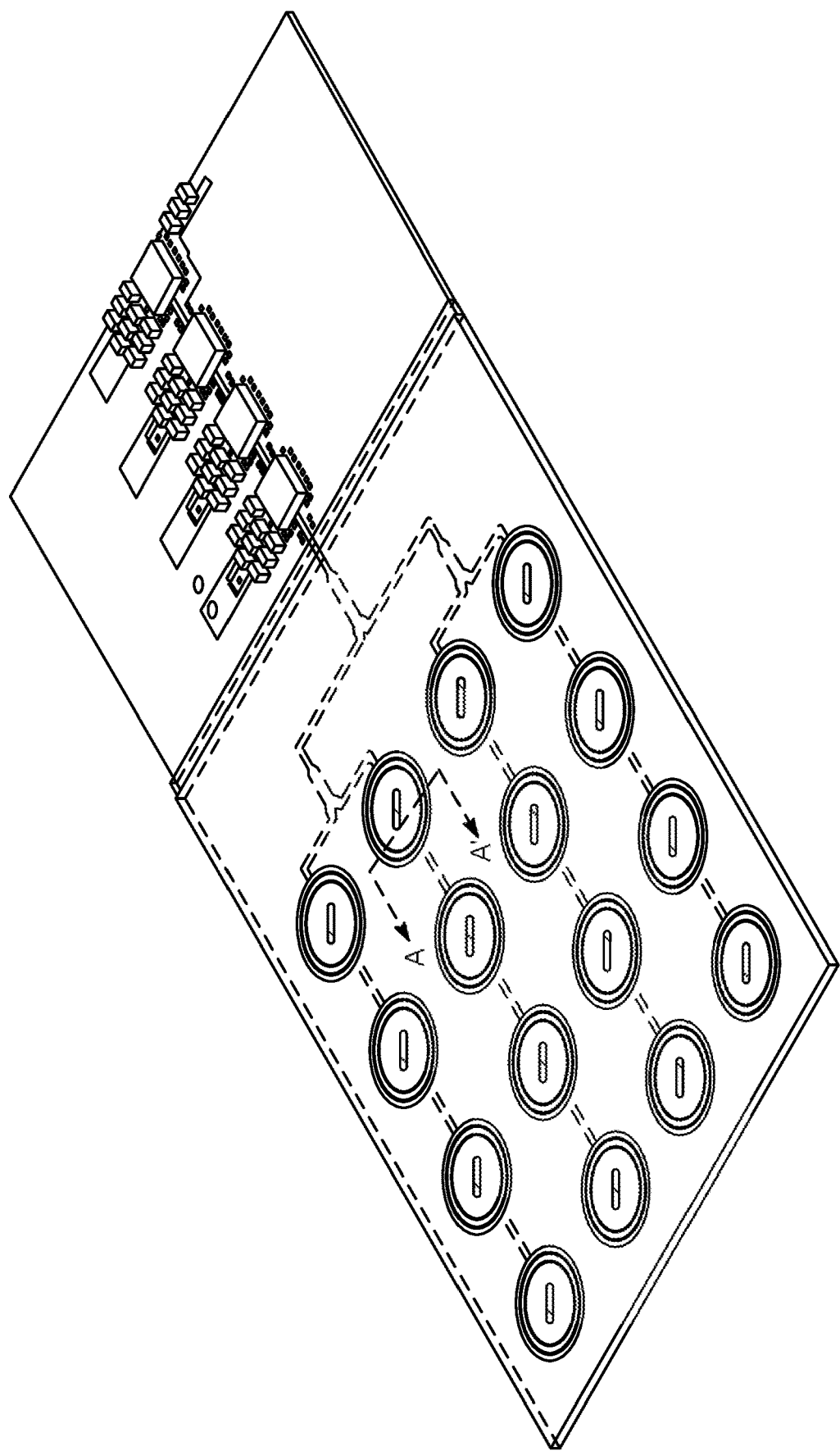
Figures 6, 7, 8, 9:
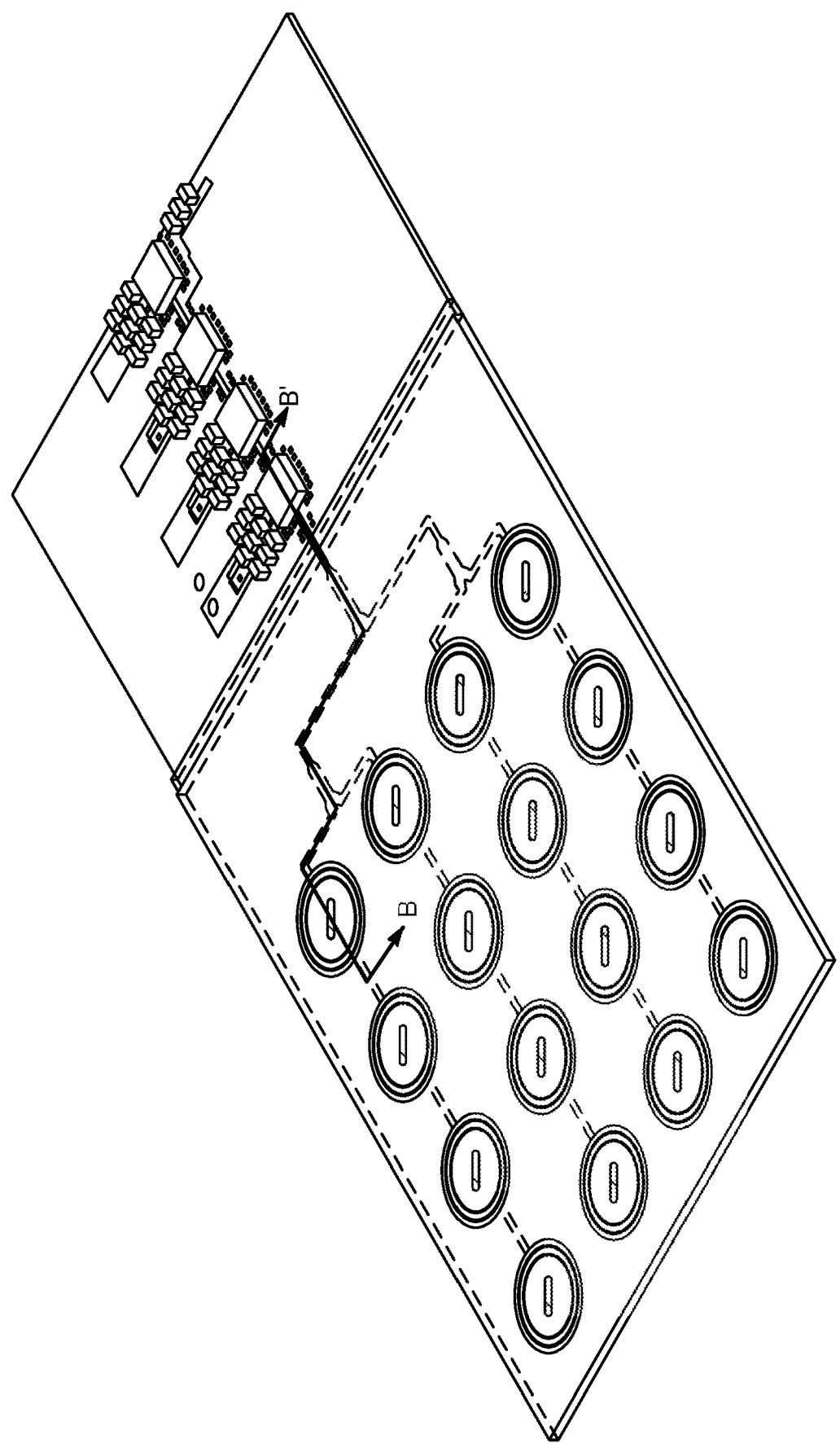
Figures 6, 7, 8, 9, 10, 11:
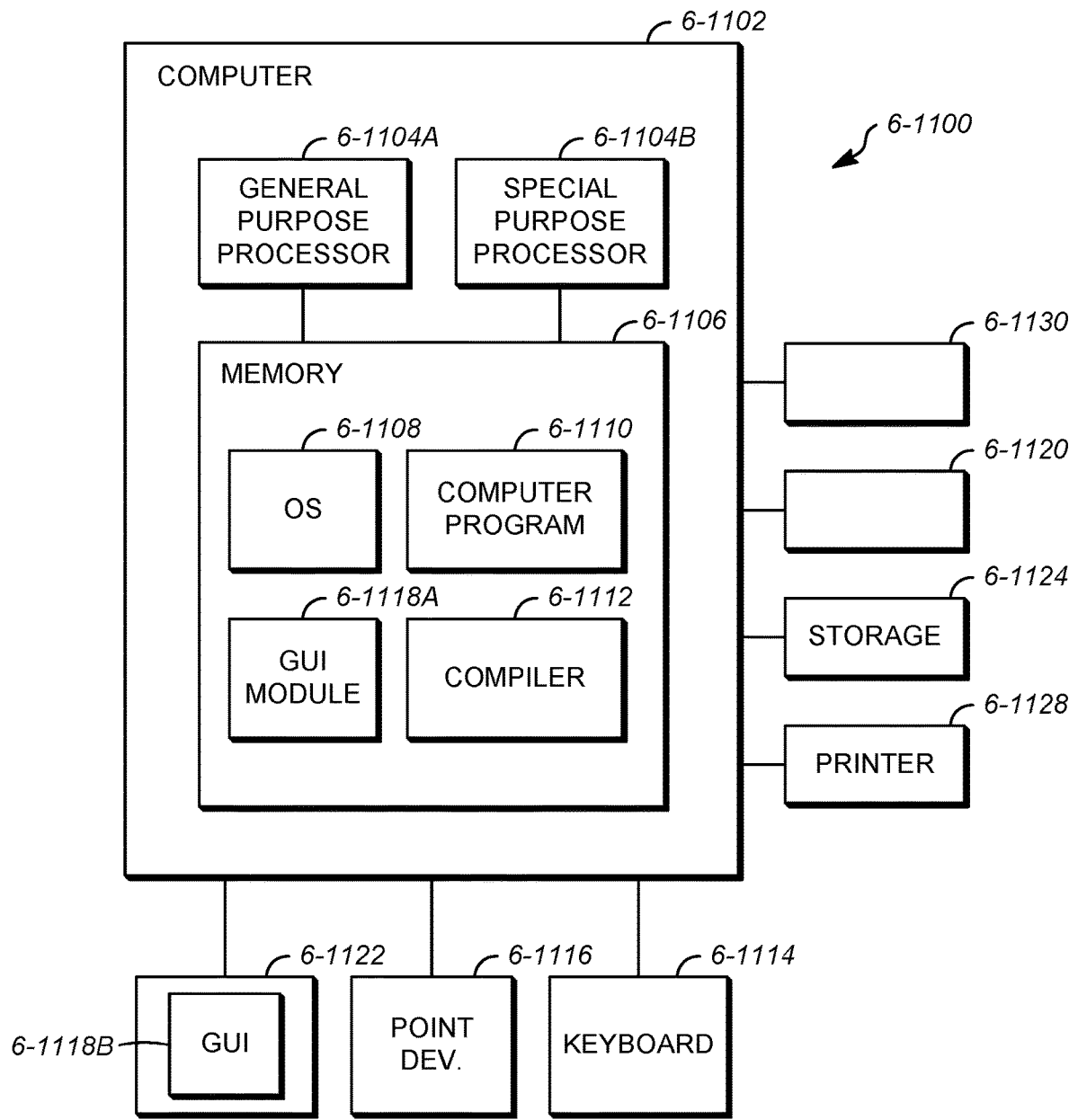

FIGS. 6-6A-6-6C are diagrams illustrating exemplary operations that can be used to produce the integrated antenna 6-100. FIGS. 6-6A-6-6C will be discussed in conjunction with FIGS. 6-7, FIGS. 6-8A-6-8G, FIG. 6-9, and FIGS. 6-10A-6-10H, which are diagrams depicting the antenna 6-100 at different stages of a representative production process. FIG. 6-7 is a diagram illustrating a cut A-A' of the antenna 6-100 depicted in FIGS. 6-8A-6-8G, while FIG. 6-9 is a diagram illustrating a cut B-B' of the antenna 6-100 depicted in FIGS. 6-10A-6-10H.

Turning now to FIG. 6-6A, an antenna element 6-106 is disposed on a second top surface planar portion 6-104B of a first dielectric 6-802 (also labeled D1), as shown in block 6-602. This is illustrated in FIGS. 6-8A and 6-10A. In block 6-604, a conductor 6-116, a first top surface conductive ground plane 6-109A1, and a second top surface conductive ground plane 6-109A2 are disposed on a top surface of a third dielectric 6-806 (also labeled D3). This is illustrated in FIGS. 6-8D and 6-10D. A bottom surface conductive ground plane 6-107 is then disposed on a bottom surface of a fourth dielectric 6-808 (also labeled D4), the bottom surface conductive ground plane having a first bottom surface conductive ground plane portion 6-107A and a second bottom surface conductive ground plane portion 6-107B, as shown in block 6-606. This is illustrated in FIGS. 6-8E and 6-10E. A composite dielectric 6-103 is formed by laminating a bottom surface planar portion of the first dielectric 6-802 to the top surface planar portion of a second dielectric 6-804, laminating a bottom surface planar portion of the second dielectric 6-804 to the top surface planar portion of the third dielectric 6-806, and laminating a bottom surface planar portion of the third dielectric 6-806 to a top surface planar portion of the fourth dielectric 6-808, as shown in block 6-608. This is shown in FIGS. 6-8G and 6-10G. Upon the completion of the foregoing lamination, the conductor 6-116 forms a microstrip with the second bottom surface conductive ground plane portion 6-107B and an aperture coupled microstrip feed with the planar antenna element 6-106.

Turning to block 6-610, a plurality of vias 6-120A1 and 6-120B1 are disposed in the composite dielectric 6-103. Vias 6-120A1 electrically short the first top surface conductive ground plane 6-109A1 to the first bottom surface conductive ground plane portion 6-107A and the vias 6-120B1 electrically short the second top surface conductive ground plane 6-109A2 to the first bottom surface conductive ground plane portion 6-107A. In the illustrated embodiment, the first set of vias 6-120A1 are disposed on the edge of the first top surface conductive ground plane 6-109A1 nearest the conductor 6-116, and the second set of vias 6-120B1 are disposed on the edge of the second top surface conductive ground plane 6-109A2 nearest the conductor 6-116, thus forming the grounded coplanar waveguide with the nearby conductors.

In block 6-612, at least one electronic device (e.g. 6-122A) is affixed to the first top surface planar portion 6-104A of third dielectric 6-806. The at least one electronic device 6-122A has an electronic device input 6-164 that is electrically connected to the grounded coplanar waveguide (e.g., by being conductively coupled to the conductor 6-116). This step is illustrated in FIG. 6-10H.

Some embodiments of the integrated antenna 6-100 include additional electronic devices (e.g. electronic devices 6-122A-6-122D), with each electronic device 6-122 performing a signal processing function on an input and providing the resulting output either to the next electronic device 6-122 in the processing path, or as a signal output 6-180.

FIG. 6-6B is a diagram illustrating exemplary operations performed to add additional electric/electronic devices to the integrated antenna 6-100. In block 6-614, a second conductor 6-124 is disposed on the top surface of the third dielectric. In the illustrated embodiment, the second conductor 6-124 is disposed in the same plane as the first conductor 6-116. This can be accomplished, for example, by disposing the second conductor 6-124 on the top surface of the third dielectric as a part of the operations performed in block 6-604 or by applying the second conductor to the stop surface of the third dielectric as a part of a separate process. The second conductor 6-124 extends across another portion of the first top surface planar portion 6-104A between the first top surface conductive ground plane 6-109A1 and the second top surface conductive ground plane 6-109A2. Further, this second conductor 6-124 forms a further grounded coplanar waveguide with the first top surface conductive ground plane 6-109A1, the second top surface conductive ground plane 6-109A2, and the first bottom surface conductive ground plane portion 6-107A.

In block 6-616, a second plurality of vias 6-120A2 and 6-120B2 are disposed in the composite dielectric 6-103. The second plurality of vias 6-120A2 and 6-120B2 also electrically short the first top surface conductive ground plane 6-109A1 to the first bottom surface conductive ground plane portion 6-107A and electrically short the second top surface conductive ground plane 6-109A2 to the first bottom surface conductive ground plane portion 6-107A. These second plurality of vias 6-120A1 and 6-120B2 form a further grounded coplanar waveguide with the second conductor 6-124, the first top surface conductive ground plane 6-109A1, the second top surface conductive ground plane 6-109A2 and the first bottom surface conductive ground plane portion 6-107A. Also as illustrated, further vias 6-120 may be placed in locations adjacent the periphery of the electronic device.

In block 6-618, a second electronic device (e.g. electronic device 6-122B) is disposed on the first top surface planar portion 6-104A of the third dielectric 6-806. The second electronic device 6-122B comprises an input (analogous to input 6-164 of electronic device 6-122A) that is electrically connected to the output of the first electronic device 6-122A (analogous to output 6-166 of electronic device 6-122B) by a further grounded coplanar waveguide formed by the second plurality of vias 6-120A2 and 6-120B2 with the second conductor 6-124, the first top surface conductive ground plane 6-109A1, the second top surface conductive ground plane 6-109A2 and the first bottom surface conductive ground plane portion 6-107A. The second electronic device 6-122B also comprises a second electronic device output (analogous to the output 6-166 of the first electronic device 6-122A) that can be provided to further stages of electronic devices 6-122 via further conductors forming further grounded coplanar waveguides.

As shown in FIGS. 6-1A-6-1C, the electronic devices 6-122A-6-122D can form a part of an electrical circuit having a variety of electrical components and interconnecting signal traces that together form a device for post-processing a signal received by the antenna 6-100, or pre-processing a signal provided to the antenna 6-100 for transmission. Such electrical circuit components may include passive devices 6-126 such as capacitors, inductors, and resistors. Circuits employing such devices and providing power and ground connections to other electronic devices 6-122 can include power planes 6-128 and additional ground planes 6-130.

FIG. 6-6C is a diagram illustrating exemplary operations to include power and/or circuit ground planes in the integrated antenna 6-100. In block 6-620, a power plane is disposed on a top surface of the third dielectric 6-806 on the top surface conductive ground plane 6-109A. This can be accomplished, for example, by disposing the power and/or ground plane on the top surface of the third dielectric as a part of the operations performed in block 6-604 or by applying the second conductor to the stop surface of the third dielectric 6-806 as a part of a separate process. In block 6-622, a passive circuit device is affixed to the first top surface planar portion 6-104A, so as to be electrically connected to the power plane 6-128 or circuit ground plane 6-126.

The foregoing steps illustrate the creation of one antenna element 6-106 with one (or more) electronic devices 6-122 on the RF circuit board 6-101. Typically, the antenna 6-100 comprises an array of antenna elements 6-106 such as the 4×4 array of elements illustrated in FIG. 6-1A. In such cases, the operations disclosed above include analogous operations as applied to any other desired antenna elements 6-106 in the array.

Furthermore, in any combination or all of the foregoing operations, the disposition of conductive material on the dielectric may be accomplished by additive methods such as printing, or film deposition of suitable conductive materials (e.g., silver, copper, etc.) to the appropriate surface of the dielectric. Deposition of conductive material may also be accomplished by combined additive and subtractive methods such as laser etching, milling, or wet etching. Hence, the conductive materials may be deposited on the entire surface of the dielectric layer(s) and unwanted portions etched away. For example, the top of the first dielectric layer 6-802 may be formed by disposing a conductive material along the entire top surface, then etching (or otherwise removing) the conductive material from the slot 6-106B and the area surrounding the conductive antenna element portion 6-106A.

The lamination of the first dielectric layer 6-802, the second dielectric layer 6-804, the third dielectric layer 6-806, and the fourth dielectric layer 6-808 can be accomplished by disposing a first adhesive film 6-824 between the first dielectric layer 6-802 and the second dielectric layer 6-804, disposing a second adhesive film 6-826 between the second dielectric layer 6-804 and the third dielectric layer 6-806, and disposing a third adhesive film 6-828 between the third dielectric layer 6-806 and the fourth dielectric layer 6-808. Portions of the adhesive films 6-824, 6-826, and 6-828 that must be removed to achieve the structure shown in FIGS. 6-8A-6-8G and 6-10A-6-10H may be removed before lamination or processed after lamination (e.g., using an etching technique). Further, dielectric layers 6-802, 6-804, 6-806 and 6-808 may be created in any order, but unless otherwise noted, should be layered as illustrated before lamination. Nominally, dielectric layers 6-802, 6-804, 6-806 and 6-808 are composed of a dielectric material having a relative permittivity (ratio of absolute permittivity to the permittivity of a vacuum) of approximately two to four.

Feature Combinations

The foregoing description presents embodiments of antenna structures organized for purposes of illustration into different chapters. In further embodiments, elements of the antennas described in each chapter are combined to form other embodiments which combine the features and benefits of the antenna structures for synergistic effect.

For example, in one such combined embodiment, the outer coupling antenna element components 1-106C discussed in connection with in the reconfigurable aperture-coupled patch antenna are used with the cavity structures 20120 of the electronically steerable antenna embodiment also described herein. In this case, the dimension of the outer coupling antenna element components 1-106C extend to that of the tunable cavity 2-120, or may extend only as far as the inner element 1-106A. Further, in another embodiment, the outer antenna element 1-106C components are used with the vias 3-120 and grounding pattern of the stripline conformal antenna described herein and/or the dielectric lenses 4-124 herein described. In still another embodiment, the outer antenna elements are used with the composite laminates constructed of magnetic material 5-103 to produce a more compact antenna structure.

In another embodiment combining the different elements of the foregoing antennas, the cavity structures 2-120 of the electronically steerable conformal antenna are used with the via grounding structures 2-120 and or the dielectric lens structures 4-124 of that chapter of this disclosure. Other embodiments include magnetic dielectric material 5-103 of the electrically small antenna described herein to provide for a more compact antenna.

In still another embodiment combining the foregoing teaching, the via grounding structures 2-120 of the stripline conformal patch antenna are utilized with the dielectric lens structures 4-124 and/or the magnetic dielectric 5-103. Still further embodiments include any of the foregoing combinations with further addition of the integrated low noise receiver disclosed in the associated chapter of this disclosure.

Hence any of the features of the reconfigurable aperture coupled patch antenna 1-100, the electronically steerable conformal antenna 2-100, the stripline conformal patch antenna 3-100, the conformal antenna with a dielectric lens 4-124, the electrically small antenna 5-100, and the planar antenna with an integrated low noise receiver 6-122 can be synergistically combined to produce antenna systems with the associated features and advantages. In the interest of brevity, such combinations are not illustrated in the Figures or individually described.

Hardware Environment

FIG. 6-11 is a diagram illustrating an exemplary computer system 6-1100 that could be used to implement processing elements of the above disclosure, including the defining of the conductive structures and etching of the dielectric layers. The computer 6-1102 comprises at least one processor 6-1104 such as a general purpose processor 6-1104A and/or a special purpose processor 6-1104B and a memory, such as random access memory (RAM) 6-1106. The computer 6-1102 is operatively coupled to a display 6-1122, which presents images such as windows to the user on a graphical user interface 6-1118B. The computer 6-1102 may be coupled to other devices, such as a keyboard 6-1114, a mouse device 6-1116, a printer, etc. Of course, those skilled in the art will recognize that any combination of the above components, or any number of different components, peripherals, and other devices, may be used with the computer 6-1102, including printer 6-1128.

Generally, the computer 6-1102 operates under control of an operating system 6-1108 stored in the memory 6-1106, and interfaces with the user to accept inputs and commands and to present results through a graphical user interface (GUI) module 6-1118A. Although the GUI module 6-1118B is depicted as a separate module, the instructions performing the GUI functions can be resident or distributed in the operating system 6-1108, the computer program 6-1110, or implemented with special purpose memory and processors. The computer 6-1102 also implements a compiler 6-1112 which allows an application program 6-1110 written in a programming language such as COBOL, C++, FORTRAN, or other language to be translated into processor 6-1104 readable code. After completion, the application 6-1110 accesses and manipulates data stored in the memory 6-1106 of the computer 6-1102 using the relationships and logic that was generated using the compiler 6-1112. The computer 6-1102 also optionally comprises an external communication device such as a modem, satellite link, Ethernet card, or other device for communicating with other computers.

In one embodiment, instructions implementing the operating system 6-1108, the computer program 6-1110, and the compiler 6-1112 are tangibly embodied in a computer-readable medium, e.g., data storage device 6-1120, which could include one or more fixed or removable data storage devices, such as a zip drive, floppy disc drive 6-1124, hard drive, CD-ROM drive, tape drive, etc. Further, the operating system 6-1108 and the computer program 6-1110 are comprised of instructions which, when read and executed by the computer 6-1102, causes the computer 6-1102 to perform the operations herein described. Computer program 6-1110 and/or operating instructions may also be tangibly embodied in memory 6-1106 and/or data communications devices 6-1130, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An integrated antenna, comprising
a circuit board comprising:
   a composite dielectric having:
      a top planar surface, having:
         a first top surface planar portion having:
            a first top surface conductive ground plane disposed on a first section of the first top surface planar portion; and
            a second top surface conductive ground plane disposed on a second section of the first top surface planar portion;
         a second top surface planar portion having at least one planar antenna element;
      a bottom planar surface, having:
         a first bottom surface planar portion;
         a second bottom surface planar portion;
         a first bottom surface conductive ground plane disposed on the first bottom surface planar portion; and
         a second bottom surface conductive ground plane disposed on the second bottom surface planar portion;
      a conductor, the conductor:
         extending through the composite dielectric between the second top planar portion and the second bottom surface conductive ground plane;
         extending across at least a portion of the first top surface planar portion between the first top surface conductive ground plane and the second top surface conductive ground plane;
         forming at least one grounded coplanar waveguide with the first top surface conductive ground plane, the second top surface conductive ground plane, and the first bottom surface conductive ground plane; and
         forming a microstrip extending from the planar antenna element to the grounded coplanar waveguide with the second bottom surface conductive ground plane;
   a plurality of vias electrically shorting the first top surface conductive ground plane to the first bottom surface conductive ground plane and electrically shorting the second top surface conductive ground plane to the first bottom surface conductive ground plane; and
   an electronic device, disposed on the first top surface planar portion, the electronic device having an electronic device input electrically connected to the conductor and an electronic device output.

2. The antenna of claim 1, wherein:
at least part of the first section of the first top surface planar portion and the second section of the first top surface planar portion comprises a power plane electrically connected to a power input of the electronic device.

3. The antenna of claim 2, wherein:
the circuit board further comprises a passive circuit device, electrically connected to the power plane and at least one of the first top surface conductive ground plane and second top surface conductive ground plane.

4. The antenna of claim 3, wherein the circuit board further comprises:
   a second conductor, extending across another portion of the first top surface planar portion between the first top surface conductive ground plane and the second top surface conductive ground plane, the second conductor forming a further grounded coplanar waveguide with the first top surface conductive ground plane, the second top surface conductive ground plane and the first bottom surface conductive ground plane; and
   a second electronic device, disposed on the first top surface planar portion, the second electronic device having:
      a second electronic device input electrically connected to the electronic device output by the further grounded coplanar waveguide; and
      a second electronic device output.

5. The antenna of claim 4, wherein the electronic device is a low noise amplifier and the second electronic device is a power detector.

6. The antenna of claim 1, wherein:
the planar antenna element comprises an antenna conductive surface having an aperture; and
the antenna conductive surface is aperture coupled to the microstrip.

7. The antenna of claim 6, wherein:
the antenna conductive surface comprises a slot; and
at least a portion of the conductor is disposed within the composite dielectric between the slot and the second bottom surface conductive ground plane.

8. The antenna of claim 7, wherein:
the second top surface planar portion comprises an array of a plurality of planar antenna elements, each comprising an associated slot; and
at least a portion of the microstrip is disposed within the composite dielectric between each of the antenna elements of the array and the second bottom surface conductive ground plane.

9. The antenna of claim 1, wherein:
the planar antenna element is formed by a first conductive material on a top surface of a first layer of the composite dielectric;
the conductor, the first top surface conductive ground plane and the second top surface conductive ground plane are formed by a second conductive material on a top surface of a third layer of the composite dielectric; and the first bottom surface conductive ground plane and the second bottom surface conductive ground plane is formed by a third conductive material on a bottom surface of a fourth layer of the composite dielectric.

10. The antenna of claim 9, wherein:
the planar antenna is formed by:
   disposing a first adhesive film between the first layer of the composite dielectric and a second layer of the composite dielectric;
   disposing a second adhesive film between the second layer and the third layer of the composite dielectric;
   disposing a third adhesive film between the third layer and the fourth layer of the composite dielectric;
   aligning the first, second, third, and fourth layers of the composite dielectric; and
   bonding together the first layer of the composite dielectric, the second layer of the composite dielectric, the third layer of the composite dielectric, and the fourth layer of the composite dielectric with the first adhesive film, second adhesive film, and the third adhesive film.

11. The antenna of claim 1, wherein:
the plurality of vias comprises:
   a first set of vias disposed adjacent the conductor, the first set of vias electrically shorting the first top surface conductive ground plane to the first bottom surface conductive ground plane; and
   a second set of vias disposed adjacent to the conductor, the second set of vias electrically shorting the second top surface conductive ground plane to the first bottom surface conductive ground plane.

12. A method of forming a planar antenna array, comprising:
   disposing a planar antenna element on a top surface planar portion of a first dielectric;
   disposing a conductor, a first top surface conductive ground plane, and a second top surface conductive ground plane on a top surface of a third dielectric;
   disposing a bottom surface conductive ground plane on a bottom surface of a fourth dielectric, the bottom surface conductive ground plane having a first bottom surface conductive ground plane portion and a second bottom surface conductive ground plane portion;
   forming a composite dielectric by:
      laminating a bottom surface planar portion of the first dielectric to a top surface of a second dielectric;
      laminating a bottom surface planar portion of the second dielectric to a top surface planar portion of the third dielectric;
      laminating a bottom surface planar portion of the third dielectric to a top surface planar portion of the fourth dielectric;
      wherein upon lamination, the conductor forms:
         a microstrip with the second bottom surface conductive ground plane portion; and
         a microstrip feed with the planar antenna element; and
   disposing a plurality of vias electrically shorting the first top surface conductive ground plane to the first bottom surface conductive ground plane portion and electrically shorting the second top surface conductive ground plane to the first bottom surface conductive ground plane portion, the vias forming a grounded coplanar waveguide with the conductor, the first top surface conductive ground plane, the second top surface conductive ground plane, and the first bottom surface conductive ground plane portion.

13. The method of claim 12, further comprising:
affixing an electronic device to the top surface of the third dielectric, the electronic device having an electronic device input electrically connected to the grounded coplanar waveguide.

14. The method of claim 13, wherein:
the conductor is disposed between the first top surface conductive ground plane and the second top surface conductive ground plane, and wherein:
disposing the conductor, a first top surface conductive ground plane, and a second top surface conductive ground plane on the top surface of the third dielectric further comprises:
   disposing a power plane on a top surface of the third dielectric.

15. The method of claim 14, further comprising:
affixing a passive circuit device to the top surface of the third dielectric, the passive circuit device having a passive circuit device electrically connected to at least one of the power plane and the bottom surface conductive ground plane.

16. The method of claim 15, wherein:
disposing the conductor, the first top surface conductive ground plane, and the second top surface conductive ground plane and the power plane on a top surface of the third dielectric further comprises:
   disposing a second conductor on the top surface of the third dielectric, the second conductor extending across another portion of the top surface of the third dielectric, the second conductor forming a further grounded coplanar waveguide with the first top surface conductive ground plane, the second top surface conductive ground plane and the first bottom surface conductive ground plane, the second conductor electrically isolated from the conductor;
the method further comprises:
   disposing a further plurality of vias electrically shorting the first top surface conductive ground plane to the first bottom surface conductive ground plane portion and electrically shorting the second top surface conductive ground plane to the first bottom surface conductive ground plane portion, the further plurality of vias forming a grounded coplanar waveguide with the second conductor, the first top surface conductive ground plane, the second top surface conductive ground plane, and the first bottom surface conductive ground plane portion;
   disposing a second electronic device on the top surface of the third dielectric, the second electronic device having:
      a second electronic device input electrically connected to an output of the electronic device by the further grounded coplanar waveguide; and
      a second electronic device output.

17. An integrated antenna, formed by steps comprising the steps of:
   disposing a planar antenna element on a top surface planar portion of a first dielectric;
   disposing a conductor, a first top surface conductive ground plane, and a second top surface conductive ground plane on a top surface of a third dielectric;
   disposing a bottom surface conductive ground plane on a bottom surface planar portion of a fourth dielectric, the bottom surface conductive ground plane having a first bottom surface conductive ground plane portion and a second bottom surface conductive ground plane portion;

forming a composite dielectric by:
laminating a bottom surface planar portion of the first dielectric to the top surface of a second dielectric;
laminating a bottom surface planar portion of the second dielectric to a top surface planar portion of the third dielectric;
laminating a bottom surface planar portion of the third dielectric to a top surface planar portion of the fourth dielectric;
wherein upon lamination, the conductor forms:
a microstrip with the second bottom surface conductive ground plane portion; and
a microstrip feed with the planar antenna element; and disposing a plurality of vias electrically shorting the first top surface conductive ground plane to the first bottom surface conductive ground plane portion and electrically shorting the second top surface conductive ground plane to the first bottom surface conductive ground plane portion, the vias forming a grounded coplanar waveguide with the first top surface conductive ground plane, the second top surface conductive ground plane, and the first bottom surface conductive ground plane portion.

18. The antenna of claim 17, wherein the steps further comprise:
affixing an electronic device to the top surface of the third dielectric, the electronic device having an electronic device input electrically connected to the grounded coplanar waveguide.

19. The antenna of claim 18, wherein the steps further comprise:
the conductor is disposed between the first top surface conductive ground plane and the second top surface conductive ground plane, and wherein:
disposing the conductor, a first top surface conductive ground plane, and a second top surface conductive ground plane on the top surface of the third dielectric further comprises:
disposing a power plane on a top surface of the third dielectric.

20. The antenna of claim 19, wherein the steps further comprise:
affixing a passive circuit device to the top surface of the third dielectric, the passive circuit device having a passive circuit device electrically connected to at least one of the power plane and the bottom surface conductive ground plane.

* * * * *